United States Patent [19]

Thompson et al.

[11] 4,398,273

[45] Aug. 9, 1983

[54] METHOD FOR INTERPRETING SEISMIC RECORDS TO YIELD INDICATIONS OF GAS/OIL IN AN EARTH FORMATION

[75] Inventors: Don D. Thompson, Corona Del Mar; Robert J. S. Brown, Fullerton; Richard J. Runge, Anaheim, all of Calif.

[73] Assignee: Chevron Research Company, San Francisco, Calif.

[21] Appl. No.: 322,509

[22] Filed: Nov. 18, 1981

Related U.S. Application Data

[63] Continuation of Ser. No. 81,292, Oct. 2, 1979, abandoned.

[51] Int. Cl.[3] .......................... G01V 1/32; G01V 1/34

[52] U.S. Cl. ........................................ 367/73; 367/75; 364/421

[58] Field of Search ..................... 367/73, 75; 364/421

[56] References Cited

U.S. PATENT DOCUMENTS 3,241,102 3/1966 Peterson ................................ 367/75

4,293,933 10/1981 Park et al. ............................ 367/73

OTHER PUBLICATIONS

Levitsova et al., "Razvedochnaya Geofizika", 1966, pp. 3-17, #15, G-222.

*Primary Examiner*—Nelson Moskowitz

*Attorney, Agent, or Firm*—H. D. Messner; Edward J. Keeling

[57] ABSTRACT

The present invention indicates that acoustic characteristics associated with gas/oil-containing strata of an earth formation, including reflectivity coefficients can be normalized (and favorably compared) with similar characteristics calculated and displayed by means of a machine-implemented data processing method in which well logging and geologic data are fed thereto to calculate such characteristics without the need for shear-wave velocities.

In more detail, in accordance with the invention brine-saturated bulk and shear moduli, (i.e., Kw* and Gw*) of the strata of interest can be predicted as a function of, say, brine-saturated P-wave modulus (Pw*) alone (independent of shear-wave velocity). In that way, resulting acoustic values including seismic velocities and amplitudes (also, reflectivities) as a function of saturation can ultimately be provided. Such values, when compared to actual field-generated characteristics, are surprisingly accurate predictors of the amount of gas/oil saturation in the zone of interest. The method has particular applicability to designating gas-sand zones within formations of interest.

25 Claims, 8 Drawing Figures

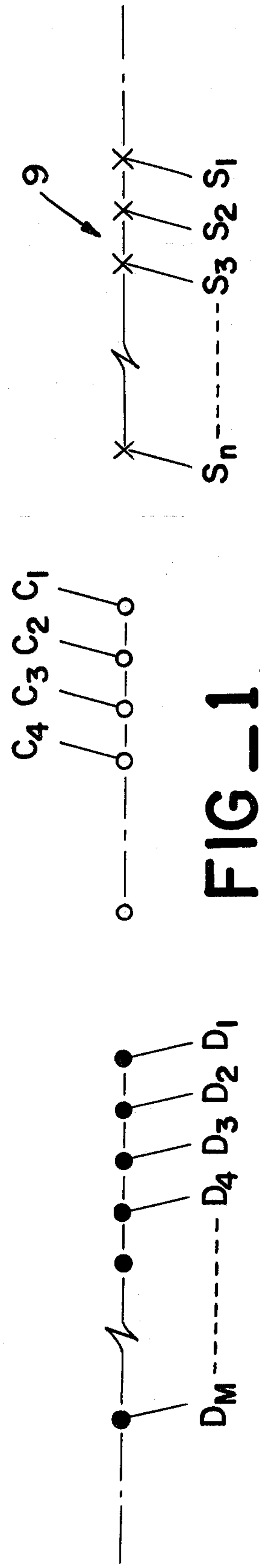
FIG_1
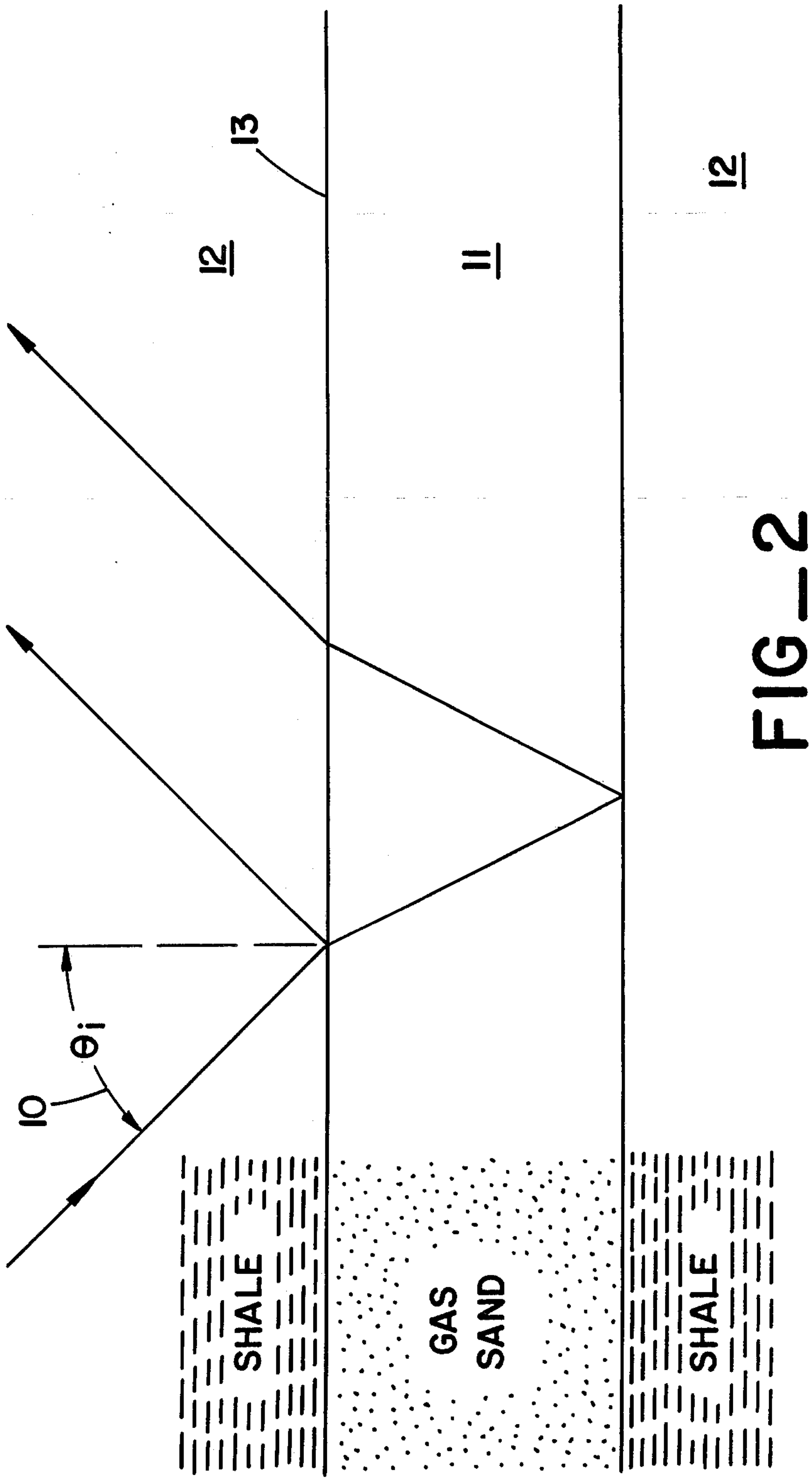
FIG_2

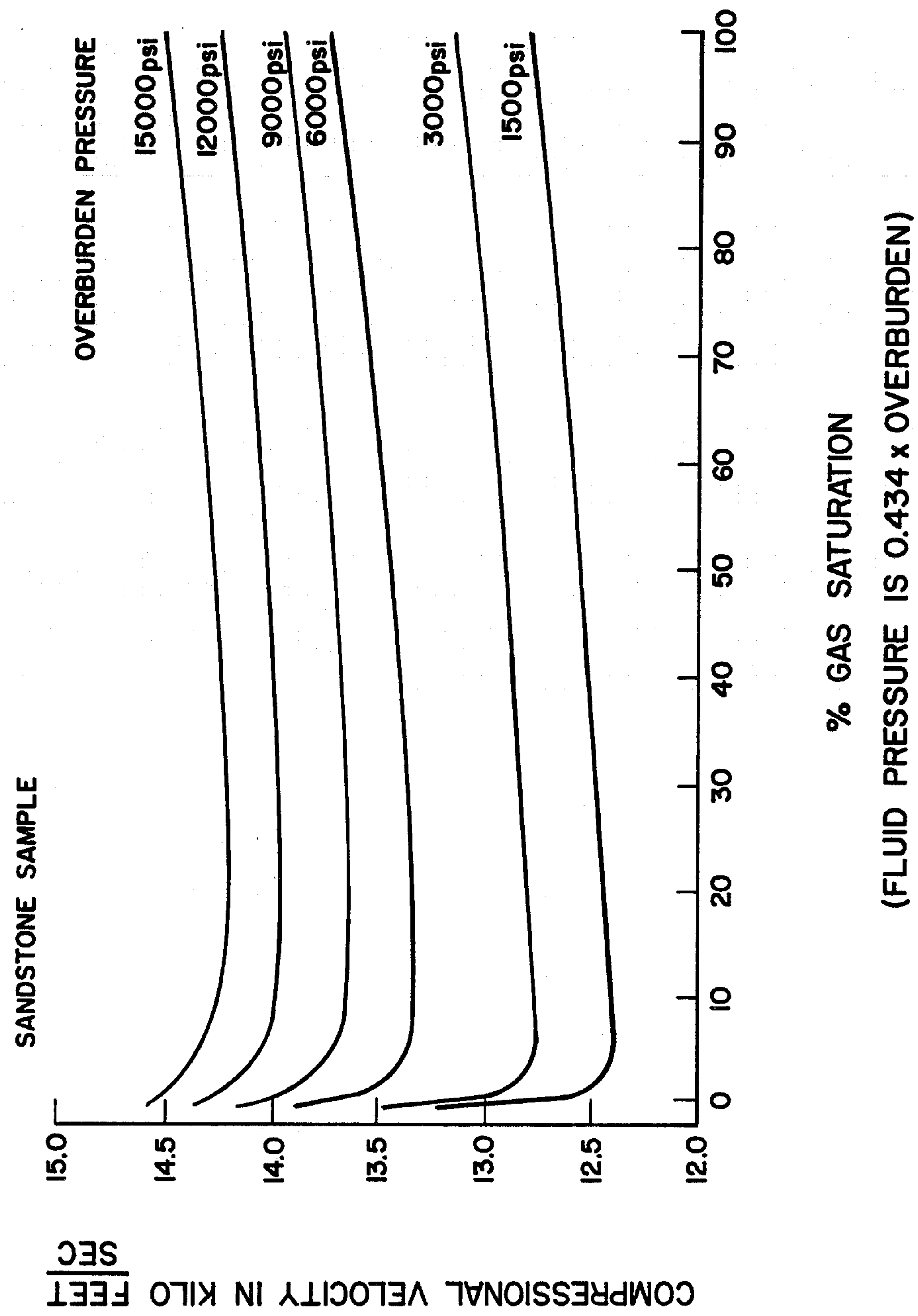
FIG_3

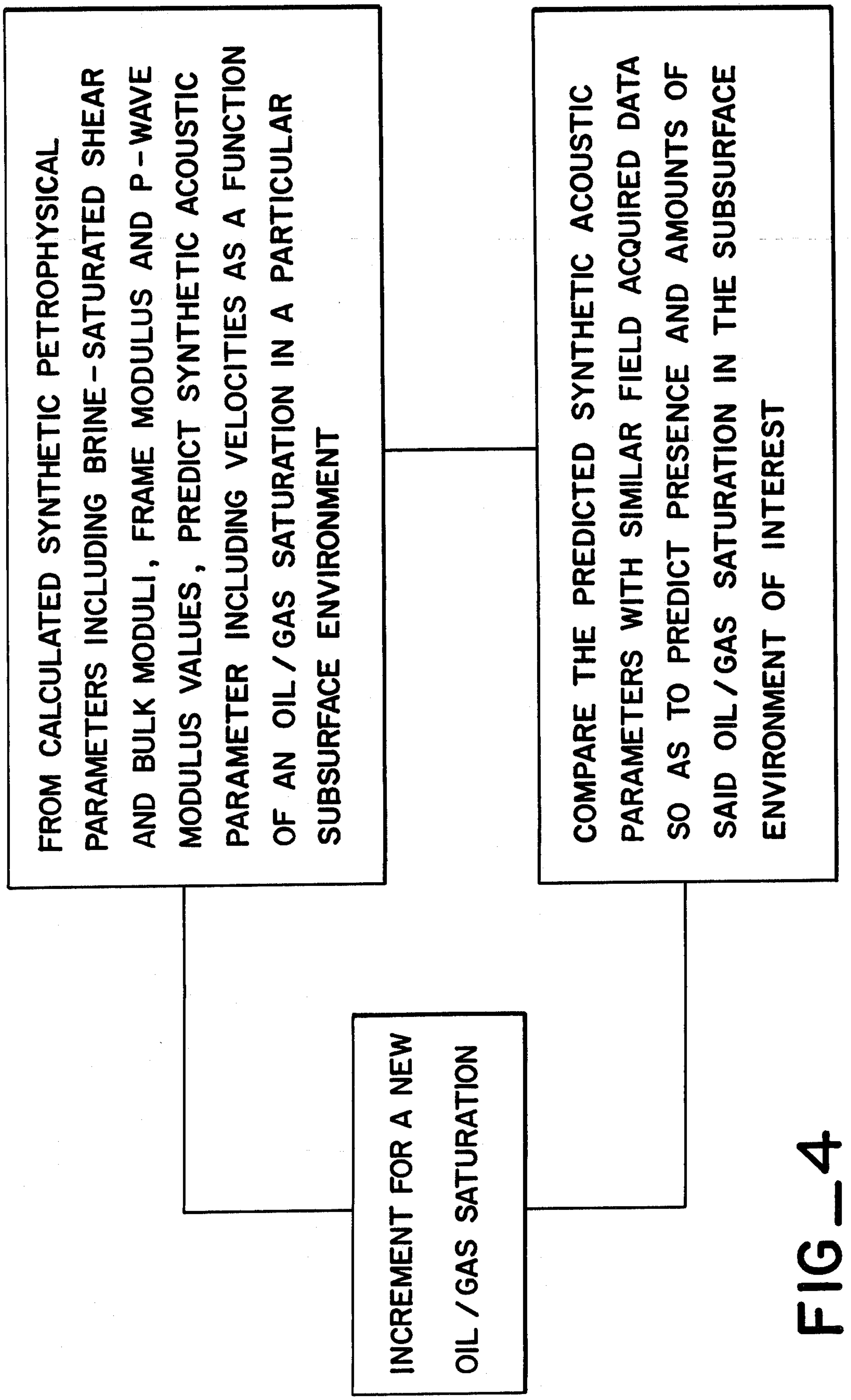
FIG_4

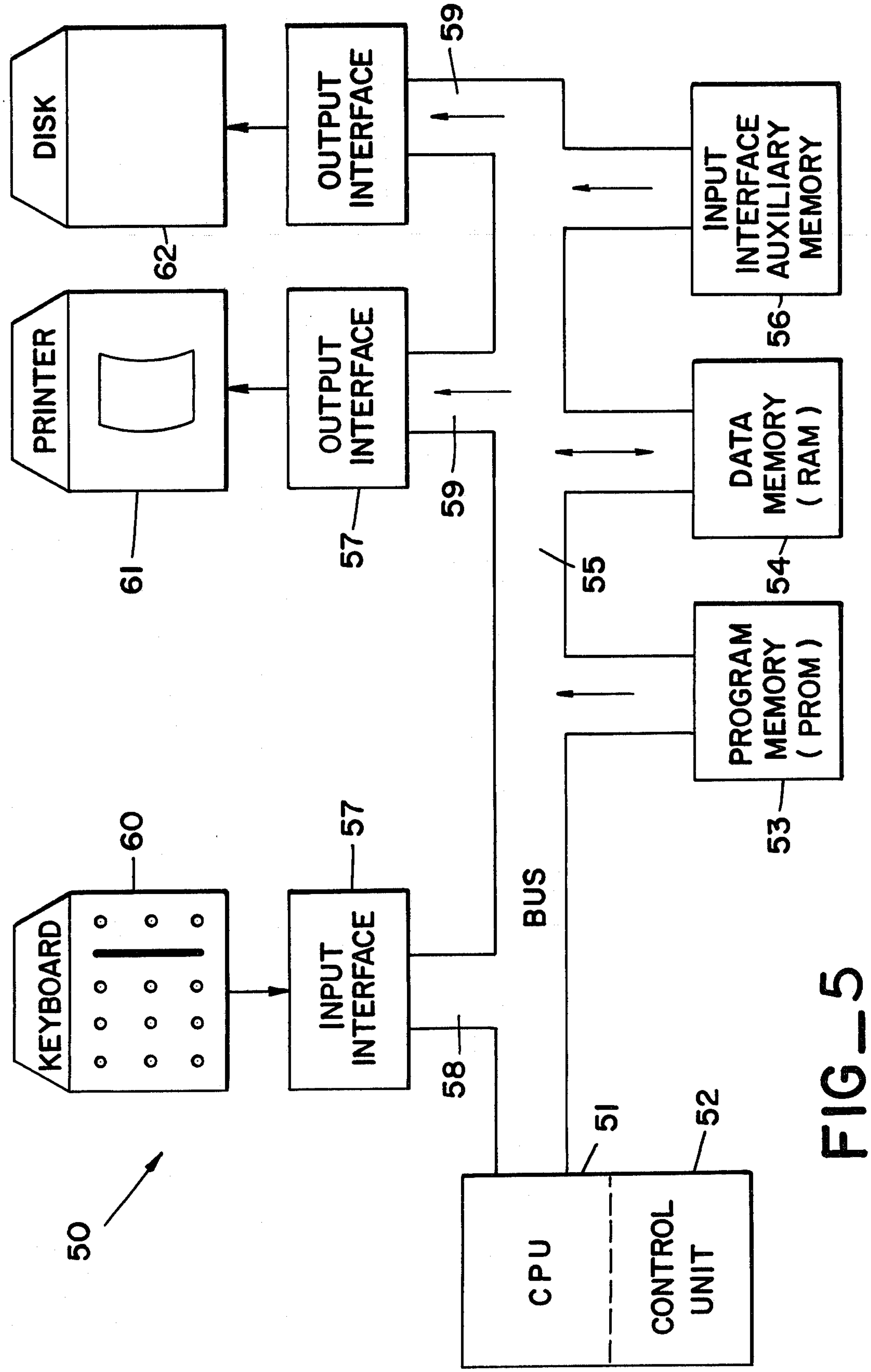
FIG_5

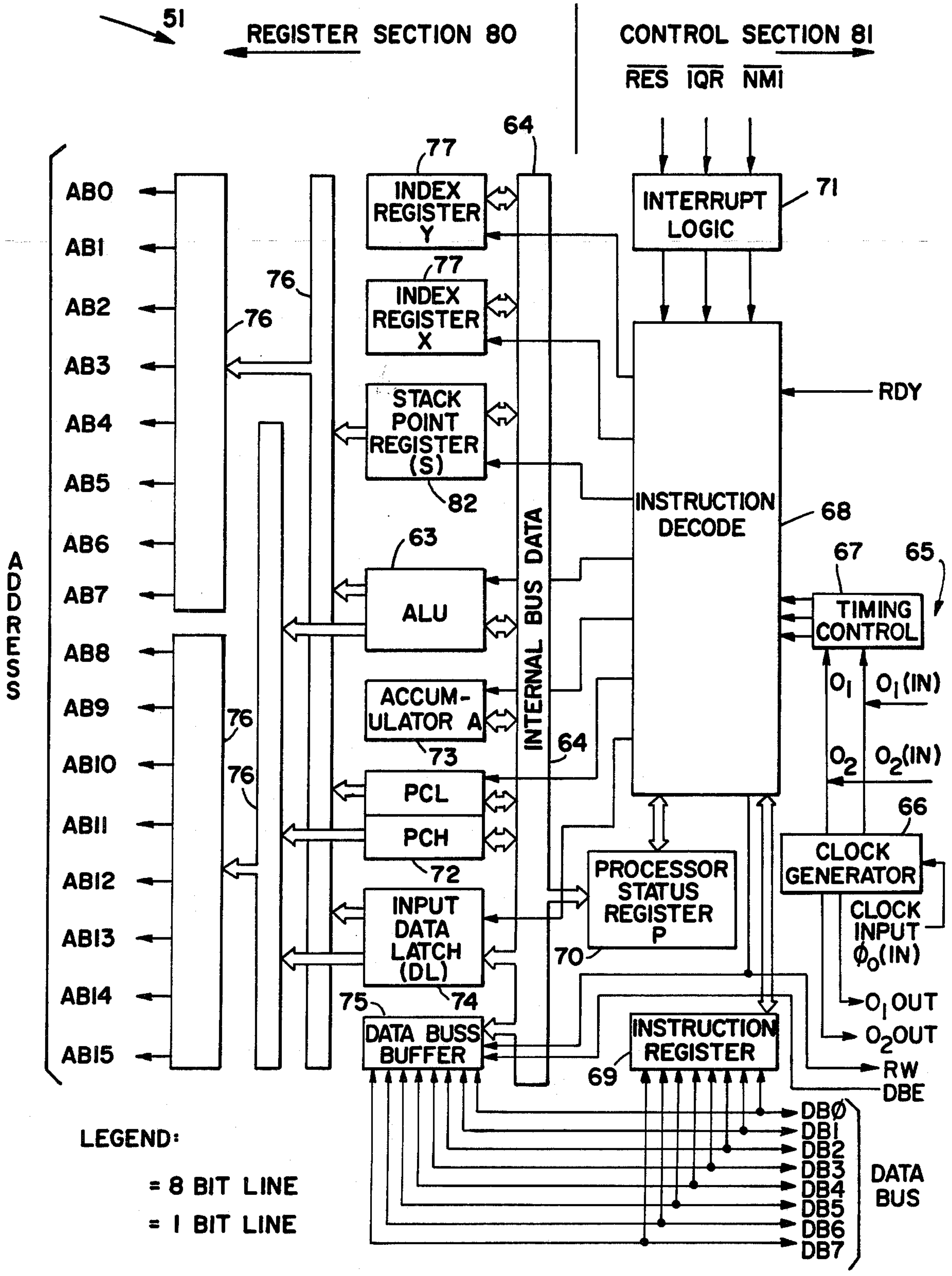
FIG_6

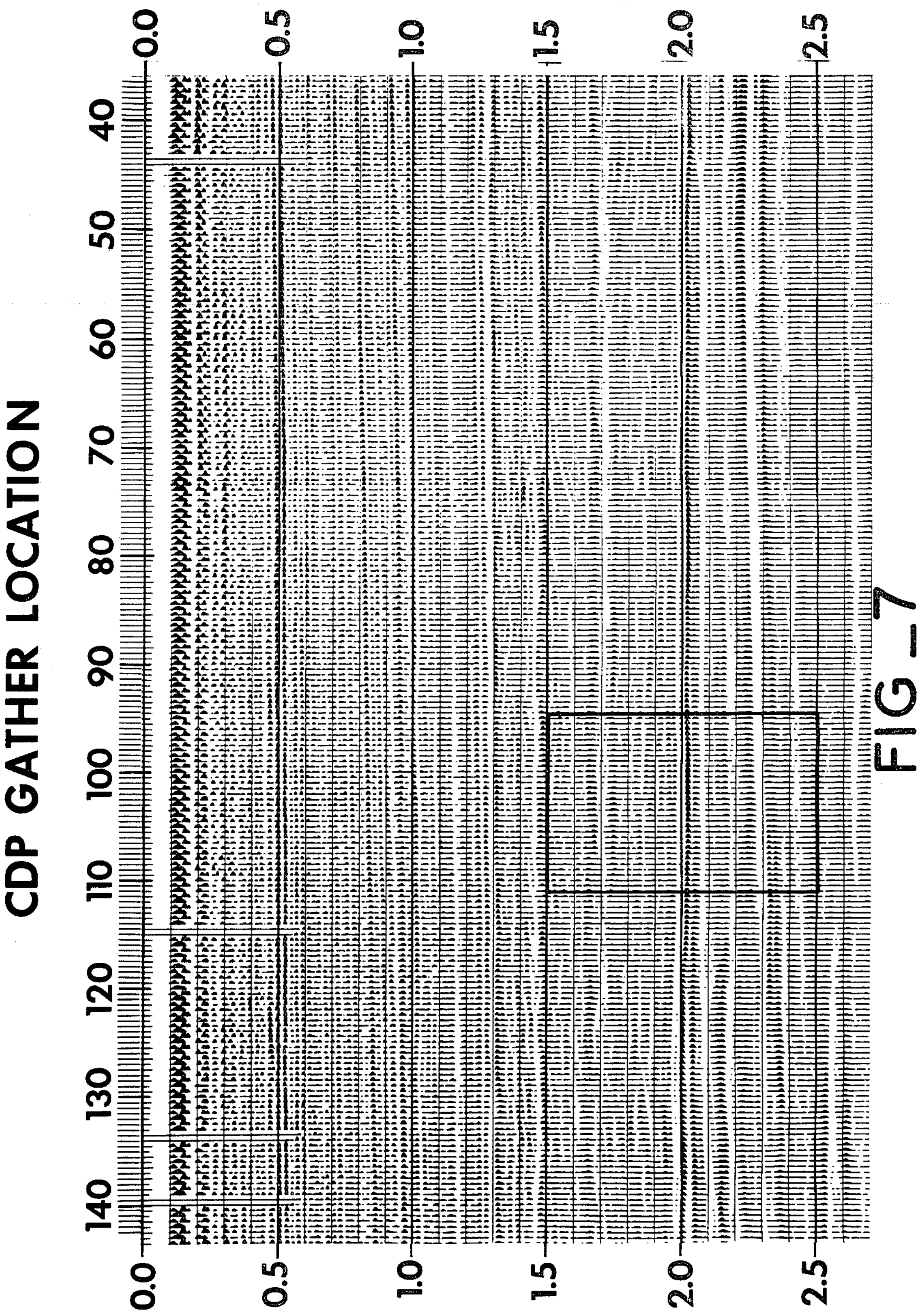
FIG_7

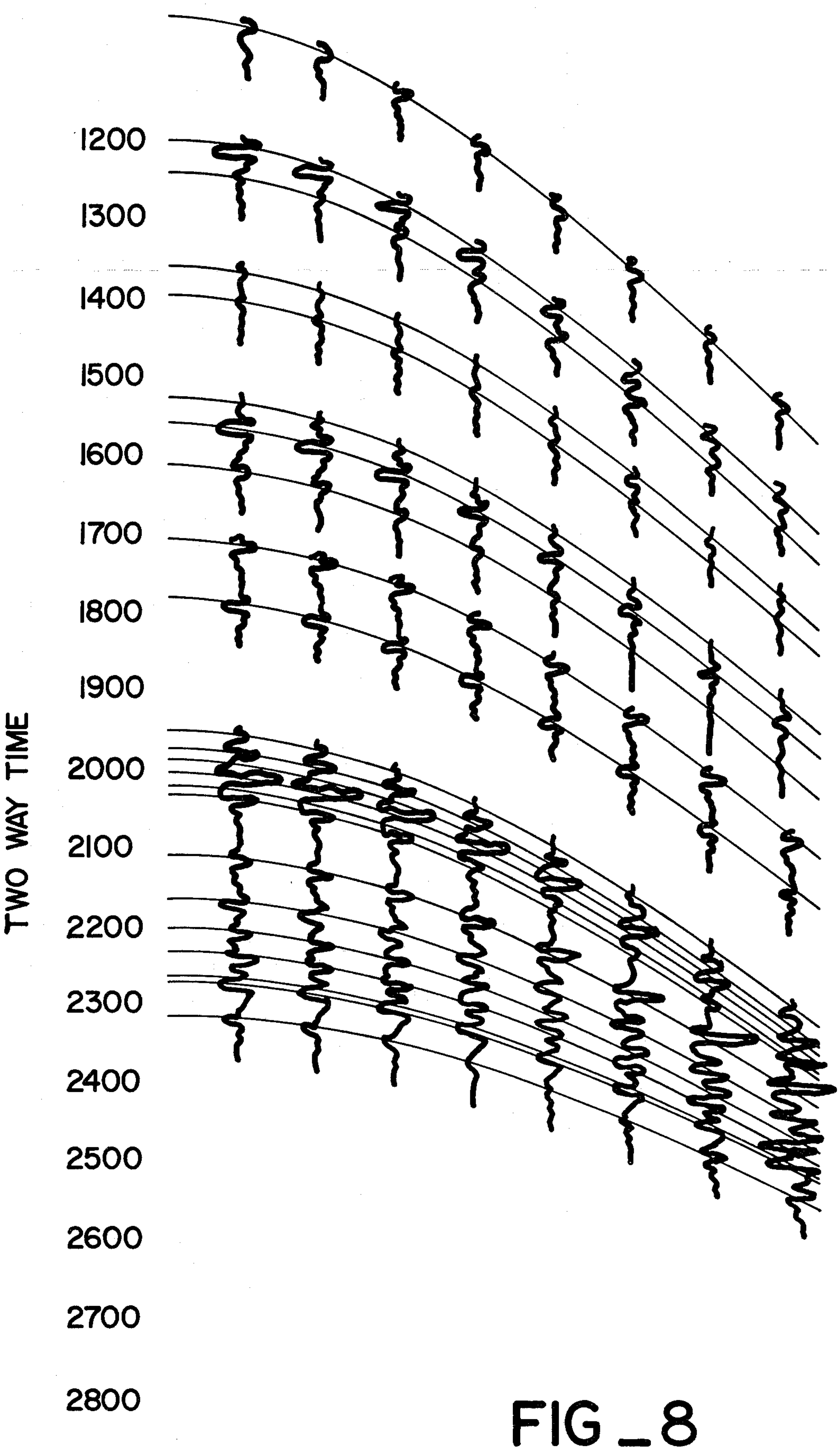
FIG_8

METHOD FOR INTERPRETING SEISMIC RECORDS TO YIELD INDICATIONS OF GAS/OIL IN AN EARTH FORMATION

This is a continuation of application Ser. No. 81,292, filed Oct. 2, 1979, now abandoned.

DISCLAIMER

While the Abstract, supra, has been carefully written, the purpose of such statements is to provide a non-legal description of the contents of this application as a searching, scanning and classification aid for technical persons. Accordingly, all hereinbefore-presented statements are not intended to be used in understanding or otherwise comprehending the principles of the invention hereinafter described in detail and are not, more particularly, to be used in interpreting or in any way limiting the scope or fair interpretation of the claims appended hereto.

FIELD OF THE INVENTION

The present invention pertains to the art of seismic prospecting for petroleum reservoirs, and more particularly to the art of interpreting high-intensity reflection amplitude anomalies observed on acoustic record traces into diagnostic indicators of the presence and amounts of gas/oil in the underlying subsurface strata.

BACKGROUND OF THE INVENTION

For several decades, seismic prospecting for petroleum has involved the creation of acoustic disturbances above, upon, or just below the surface of the earth, using explosives, air guns, or large mechanical vibrators. Resulting acoustic waves propagate downwardly in the earth, and are partially reflected back toward the surface when acoustic impedance changes within the earth are encountered. A change from one rock type to another, for example, may be accompanied by an acoustic impedance change, so that the reflectivity of a particular layer depends on the velocity and density content between that layer and the layer which overlies it, say according to the formula $$C\ \mathrm{Reflect}_T = Ar/Ai = \frac{V_2 d_2 - V_a d_a}{V_2 d_2 + V_a d_a}$$

where AR is the amplitude from the reflected signal and Ai is the amplitude of the incident signal; $V_1$ is the compressional velocity of the wave in the overlying medium 1; $V_2$ is the compressional velocity in the medium layer below the contact line; $d_1$ is the density of the overlying medium 1; and $d_2$ is the density of the underlying medium.

Today's seismic interpretors have made good use of ultra-high amplitude anomalies in seismic traces to infer the presence of natural gas in situ. So-called "bright-spot" analysis has been used to good advantage to indicate several large gas reservoirs in the world, especially in the Gulf Coast of the United States. Such analysis is now rather common in the oil industry, but it is not without its critics, especially in the area of predicting gas saturation based on the characteristics of the amplitude anomalies of the traces alone.

The present invention improves the ability of the seismologist to correctly interpret gas as well as gas/oil content of a formation normalized to (and comparable with) a series of patterned acoustic characteristics associated with zones of similar mineralogy and determinable gas or gas/oil saturations.

OBJECT OF THE INVENTION

An object of the invention is the provision of a novel method of correctly predicting gas and/or gas/oil saturations of hydrocarbon-bearing structures using at least in part high-intensity anomalies provided by traces, including seismic traces.

SUMMARY OF THE INVENTION

The present invention indicates that acoustic characteristics associated with gas/oil-containing strata of an earth formation can be normalized (and favorably compared) with similar synthetic values calculated and displayed by means of a machine-implemented data processing method in which well logging and geologic data are fed thereto to calculate such values.

In more detail, in accordance with the invention brine-saturated bulk and shear moduli, (i.e., Kw* and Gw*) of the strata of interest can be predicted, say, as a function of brine-saturated P-wave modulus (Pw*) (independent of shear-wave velocity), thereafter a surprisingly accurate estimation of bulk moduli of the fluid-filled pore spaces in the zone of interest can occur. In that way, various synthetic values (say velocities, amplitudes, etc.) as a function of depth and of gas/oil saturation can be provided. Ultimately, such values when compared to actual field-generated values have accurate prognostic capabilities as to the amount of gas/oil saturation in the zone of interest.

DESCRIPTION OF THE DRAWINGS

Further features of the invention will become more apparent upon consideration of the following detailed description of the invention when taken in connection with the accompanying drawings, wherein:

FIG. 1 is a plan view of a grid of centerpoints produced in the field by the systematic positioning and energization of an array of seismic sources and detectors whereby a series of locational traces associated with individual centerpoints between respective source-detector pairs are ultimately generated;

FIG. 2 is a model of typical reflecting horizons within an earth formation that can be associated with the characteristics of the locational traces of FIG. 1;

FIG. 3 is a plot of percentage of gas saturation vs. compressional velocity as a function of change in pressure (depth) of a particular subsurface material;

FIG. 4 is a diagram of process steps for carrying out the method of the present invention using, in at least part, programmed digital computing system;

FIGS. 5 and 6 are schematic diagrams of elements within the digital computing system of FIG. 4;

FIGS. 7 and 8 illustrate the diagnostic capability of the method of the present invention in predicting the presence of and amounts pertaining to gas strata in an actual field example.

PREFERRED EMBODIMENTS OF THE INVENTION

Before discussion of an embodiment of the invention with an actual field environment, a brief description of the mathematical and theoretical concepts behind the discovery may prove beneficial and are presented below.

Firstly, it may be of interest to indicate lithology limitations associated with the present invention. Anomalies associated with gas or gas/oil sands over shale rock cap are one example where the method of the present invention offers surprising predictive capabilities. Another example relates to gas-saturated limestone or gas/oil-saturated limestone over shale. Secondly, it should be pointed out that certain relationships of various petrophysical parameters are also of great importance, viz., bulk and shear moduli of a rock formation as a function of the P-wave modulus in the zone of interest.

Now, in more detail, attention should be directed to the Figures, particularly FIG. 1, in which the field-collection phase of the present invention is shown. Note that, inter alia, FIG. 1 illustrates in some detail how seismic multi-centerpoint data are collected in the field, and derivations of terms of interest in this application occur: e.g., the term "centerpoint" is a geographical location located midway between a series of sources $S_1, S_2 \ldots Sn$ of a geophysical field system 9 and a set of detectors $D_1, D_2 \ldots Dm$ at a datum horizon near the earth's surface. The centerpoints are designated $C_1, C_2 \ldots Cp$ in the Figure, and are associated with a trace derived by placement of a source at that centerpoint location followed immediately by relocating a detector thereat.

I.e., if the sources $S_1 \ldots Sn$ are excited in sequence at the source locations indicated, traces received at the different detector locations shown can be related to common centerpoints therebetween. If such traces are summed, a gather or group of traces is formed. I.e., if the reflecting interface is a flat sand horizon containing gas, or oil/gas fractions, the depth point where reflection occurs will define a vertical line which passes through the centerpoint of interest. Applying static and dynamic corrections to the field traces is equivalent (under the above facts) to placing the individual sources $S_1, S_2 \ldots Sn$ at the centerpoint in sequence followed by replacement with the detectors $D_1 \ldots Dm$ of interest at the same locations. If the traces associated with a common centerpoint are summed, a series of enhanced traces, sometimes called CDPS traces, is provided.

FIG. 2 illustrates reflection phenomena of a three-layer model typical of a young, shallow geologic section 10, such as found in the Gulf Coast, illustrating how reflection phenomena associated with traces of the field system 9 of FIG. 1 can be related to the presence of gas alone.

Section 10 includes a gas sand 11 embedded in a shale stratum 12. A 20% velocity reduction can occur at interface 13, say from 10,000'/sec to 8000'/sec, and a 10% density reduction from 2.40 g/cc to 2.16 g/cc, can likewise happen.

Actual P-wave reflection coefficient Apr of gas sand 11 can be calculated by Equation (1) below: also, P-wave transmission displacement amplitude coefficient Apt can similarly be related in accordance with Equation (2) below.

$$A_{Pr} = \frac{\bar{f} - \bar{\tau} - \bar{\chi}}{f + \tau + \chi} \qquad (1)$$

$$A_{Pt} = \frac{h_2 \cdot 2\alpha_1 k_1^2 (c_1 \nu + c_2 \xi)}{h_1 (f + \tau + \chi)} \qquad (2)$$

-continued $$\left.\begin{matrix}\bar{f}\\ f\end{matrix}\right\} = k_1^2 k_2^2 \delta(\alpha_1 c_2 \mp \alpha_2 c_1) \qquad (3)$$

$$\left.\begin{matrix}\bar{\tau}\\ \tau\end{matrix}\right\} = b^2 \eta^2 \mp \alpha_1 c_1 \nu^2 \qquad (4)$$

$$\left.\begin{matrix}\bar{\chi}\\ \chi\end{matrix}\right\} = \alpha_2 c_2 (\xi^2 \mp 4\alpha_1 c_1 \zeta^2 b^2) \qquad (5)$$

$$\eta = \delta\epsilon_2 - \epsilon_1 \qquad (6)$$
$$\zeta = \delta - 1 \qquad (7)$$
$$\nu = \delta\epsilon_2 + 2b^2 \qquad (8)$$
$$\xi = \epsilon_1 + 2\delta b^2 \qquad (9)$$
$$\epsilon_i = k_i^2 - 2b^2 \qquad (10)$$
$$\delta = \mu_2/\mu_1 \qquad (11)$$
$$\mu_i = \rho_i V_{si}^2 \qquad (12)$$
$$b = h_1 \sin\theta \qquad (13)$$
$$\alpha_i^2 = h_i^2 - b^2 \qquad (14)$$
$$c_1^2 = k_i^2 - b^2 \qquad (15)$$
$$h_i = 1/V_{Pi} \qquad (16)$$
$$k_i = 1/V_{si} \qquad (17)$$

$V_{Pi}$ = P-WAVE VELOCITY
$V_{si}$ = S-WAVE VELOCITY
$\rho_i$ = DENSITY
$i$ = SAVER INDEX
$\theta$ = ANGLE OF INCIDENCE Equations (1) and (2) are, of course, the two basic equations of wave travel in an earth formation and are for isotropic media with the layer index being i=1 for the incident medium and i=2 for the underlying medium. Equations (3) through (17) simple define intermediate variables.

As an example of calculations associated therewith, if $\theta - = 0°$ (normal incidence), the P-wave reflection coefficient Apr is equal to about −0.16 and +0.16, respectively, assuming a Poisson's ratio of 0.1 for sand 11 and 0.4 for the shale 12 of FIG. 2. Such values are larger, of course, than reflections from barren strata.

And how various gas fractions affect elastic moduli and seismic velocity, which can be of monumental interest to seismologists, is depicted in FIG. 3.

FIG. 3 also illustrates to some degree the complexity that is involved in relating various petrological parameters one to the other to the elastic moduli in the presence of gas. E.g., FIG. 3 shows that very small gas saturations cause nearly as much reduction in moduli of compression as do larger gas saturations. In highly porous sandstone a very small gas saturation may lead to a substantial reduction in compressional wave velocities, especially at low differential pressures. However, an increased gas saturation leads to a density decrease which may cause a velocity increase, partly offsetting the initial velocity decrease. Also, effects of gas saturation are greatest for rocks of highly compressable elastic framework: Thus, in most low-porosity carbonates of high differential pressure, the effect of gas saturation is minimal.

Briefly, the present invention shows that appropriate expressions can, in fact, be provided for calculating the elastic moduli of competent and incompetent strata based on reasonable assumptions, followed by a determination of synthetic characteristics as a function of oil/gas saturations. Comparison techniques with actual field-collected data then can be utilized. Result: accurate estimations of gas/oil saturations for the zones of interest occur. The expressions for providing such data are derived, in part, from surprising laboratory measurements to be described below. Also, well logging and other geologic data of the zone of interest are involved to some degree.

GENERAL PRINCIPLES

Expressions shown below relate densities, velocities and elastic moduli. First, in accordance with theory:

$$\rho_b V_p^2 = P^* = K^* + (4/3)G^* \quad (18)$$

and $$\rho_b V_s^2 = G^* \quad (19)$$

Here, ρb is the bulk density (including contributions of pore fluids; Vp is the P-wave velocity, or plane-compressional-wave velocity; Vp is the shear-wave velocity; p* is the P-wave elastic modulus; K* is the compressional modulus (reciprocal of the compressibility) and G* is the shear modulus, or modulus of rigidity.

General Definitions

The rocks in these equations are assumed to be macroscopically homogeneous and isotropic. In fact, macroscopic isotropy and homogeneity are assumed to exist when petrological parameters are represented by only density and two other parameters, such as Vp and Vs or else G* and K*. The asterisk superscript (*) applied to an elastic modulus indicates reference to porous rock with fluid (any mixture of brine, oil and gas) in the pores. By measurement of ρb, Vp and Vs, other parameters such as P*, K*, G*, Young's modulus or Poisson's ratio can be imparted.

Two additional macroscopic elastic moduli, the solid-material elastic modulus Km or Gm and the solid-frame modulus Ka, can be used.

If the solid material of a porous rock is reassembled in such a manner that there is no pore space, the resulting elastic moduli depend on the manner in which the material is assembled. However, upper and lower limits to the moduli can be computed. For such hypothetical rocks without pore space, upper and lower limits are not widely separated, and the means between these limits will be indicated by subscripts "m". Thus, Km and Gm are solid-material moduli. These quantities are set forth below in Table I.

TABLE I

Elastic Data and References for Some Sedimentary Minerals

| Mineral | Bulk Modulus in Kbars | Shear Modulus in Kbars | Grain Density | References |
|---|---|---|---|---|
| Quartz | 380 | 444 | 2.65 | (1) |
| Calcite | 767 | 323 | 2.71 | (2) |
| Dolomite | 948 | 457 | 2.87 | (2) |
| Biotite ("Clay") | 504 | 275 | 2.68 | (1) |
| Anhydrite | 563 | 291 | 2.98 | (3) |
| Siderite | 1240 | 510 | 3.96 | (4) |
| Barite | 546 | 238 | 4.51 | (1) |
| Hematite | 978 | 931 | 5.24 | (1) |
| Pyrite | 1581 | 1487 | 5.02 | (1) |
| Rutile | 2230 | 1035 | 4.26 | (1) |
| Halite | 252 | 153 | 2.16 | (1) |

(1) G. Simmons, J. Grad. Res. Center, Vol. 39, 3/65, SMU Press
(2) P. Humbert & F. Plicque, Compt. Rendus B275, 391 (1972)
(3) W. Schwerdtner, Can. J. Earth Sci., 2, 673 (1965)
(4) N. Christensen, J. Geophys. Res. 77, 369 (1972)

But if the pore space in a porous rock is all connected, and if the differential pressure in the fluid in the pores is held constant during a small change in the externally applied pressure, the ratio of the pressure change to the relative change in the bulk volume is the solid-frame modulus of compressibility, Ka. This modulus is sometimes referred to as the modulus of compressibility of the rock with the pore system empty. However, many oilfield rocks contain clays which may be altered by actually drying the rocks to empty the pore system. It is also possible that certain surface forces may be different when all water is removed from the pore system of a rock. It is also possible that there are several different possibilities for finding values of Ka.

If all pore space is connected, and if the rock is macroscopically homogeneous and isotropic, a change in the pore pressure cannot lead to macroscopic shear strains, since excluded from the specification of the system is anything which could define direction. Therefore, the compressibility of the fluid cannot influence the macroscopic shear modulus of the rock. Thus, G*=Ga for a rock satisfying the above conditions.

Note, however that the dynamic elastic moduli of rocks usually depend on the static stresses and therefore on the fluid pressure in the pore system. This, in turn, affects the differential pressure, or the pressure supported by the elastic framework of the rock. Furthermore, note the requirement that there be time for the fluid pressure to equalize throughout the pore system. If the pore space is not connected, this cannot happen at all. If there are localized regions of low permeability, there may not be enough time for pressure equalization in the pore system if pressure changes are applied at high frequency. The time required for pressure equalization depends not only on the local permeability of the material but on the microscopic distribution of the pore fluid components. This consideration applies, for example, if the pore fluid is a mixture of brine and gas. The higher the seismic or sonic frequency, the finer must be the mixture of brine and gas.

However, in estimating gas/oil-saturation effects in accordance with the present invention, input parameters can be limited to compressional velocity, density and porosity, as set forth below.

The Effect of Gas Saturation

Gassmann derived an equation (Gassmann, F., "Elasticity of Porous Media" in Vierteljahrschrift der Naturforshenden Gesellschaft in Zürich, Heft I, 1951) and given also in a book by White (J. E. White, "Seismic Waves: Radiation, Transmission and Attenuation", McGraw-Hill, N.Y., 1965), relating K* and Ka.

$$K^* = K_a + K_f \frac{(1 - K_a/K_m)^2}{(1 - K_f/K_m)\phi + (K_f/K_m)(1 - K_f/K_m)} \quad (20a)$$

or the equivalent, $$K_a = K^* - K_f \frac{(1 - K^*/K_m)^2}{(1 - K_f/K_m)\phi - (K_f/K_m)(1 - K^*/K_m)} \quad (20b)$$

or another equivalent, $$\frac{1}{K_m - K^*} - \frac{1}{K_m - K^{*\prime}} = \frac{1}{\phi}\left[\frac{1}{K_m - K_f} - \frac{1}{K_m - K'_f}\right] \quad (20c)$$

or still another equivalent, $$(K^* - K_a)/K_m = K_{fc}/K_m = b - a = \quad (20d)$$

-continued $$\frac{(1-a)^2}{f\phi + (1-a)} = \frac{(1-b)^2}{f\phi - (1-b)}$$

where a=Ka/Km; b=K*/Km; g=G*/Gm=Ga/Gm; f=(Km/Kf)−1.

Here $\phi$ is the fractional porosity, Kf is the compressibility modulus of the fluid in the pores, and the primes (′) indicate values for a different pore fluid system. Thus, if Kf′=0, the K*′ becomes Ka. If the pore fluid is a multiphase system, such as any mixture of brine, oil and gas, Kf can be calculated by noting that the compressibility of a fluid mixture is the volume-weighted average of the compressibilities of the components. Thus, for a gas-brine mixture, $$\frac{1}{K_f} = \frac{S_{gas}}{K_{gas}} + \frac{(1 - S_{gas})}{K_{brine}} \quad (39)$$

where Sgas is the fractional gas saturation.

It can be seen from Equations 19 and 20a–20e that, if G*, P*, Km, Kf and $\phi$ are known, calculations are straightforward. But since G* and Km are not known, simultaneous solutions of equations is a distinct possibility and is set forth in detail below. If K* for two different values of Kf is measured, two equations with two unknowns are provided and both Ka and Km can be determined. Km may be computed with adequate accuracy from estimates of the composition of the solid framework of the rock, as set forth below, in which case measurements of K* and $\phi$, together with knowledge or estimates of Kf and Km give values of Ka.

Equations 18, 19 and 20a–20e are rigorously true if the rock is macrohomogeneous, macroisotropic, all pore space connected, time is allowed for pressure equalization in the pore fluid, and the material of the solid framework is microhomogeneous and microisotropic. The assumptions of microisotropy and microhomogeneity are not satisfied rigorously for real rocks. The lack of microisotropy is probably well accounted for by the spatial averaging employed in the determination of the "isotropized" values of the compressional moduli of the rock-forming minerals given in Table I, supra. It is highly probable that anisotropic mineral grains are deposited more or less randomly. Even if they are not, the directions of the stress vary greatly in a granular rock, justifying the spatial averaging.

The effects of microhomogeneity of the solid material of the rock may affect the strict validity of Equations 20a–20e supra if one or the components of the solid framework does not carry its share of the load and if that component has a compression modulus substantially different from those of other components. A candidate would be a sand consisting of a quartz framework with a large amount of clay or other materials with higher compressional moduli and attached in such a manner that it does not significantly share the stress.

It should be noted that if shear-wave logs would be available for the basin of interest, the bulk modulus can be calculated from the P- and S-wave transit times in the density of the zone of interest in accordance with Equations 18 and 19, supra. Unfortunately, the shear-wave logs needed for direct measurement of K* are not available for most basins.

Hence, a method is needed for accurately determining bulk and shear moduli of rock formations in such basins, these moduli being needed for use in the Biot-Gassmann relationship, i.e., the Equations 20a–20d supra, to model the influences of pore fluids on the bulk modulus, and therefore on the compression wave velocity. While these fluids may be either brine, liquid, hydrocarbon or gas or any combination thereof, the present invention relates to brine-gas mixtures principally but not exclusively.

In accordance with the present invention, only compressional velocity of the brine-saturated material, its brine-saturated density and porosity measurements are needed to estimate bulk and shear moduli for the zone of interest as functions of pressure, temperature and fluid content (gas saturation).

These equations which are set forth below and above permit an in-situ estimate of K* and G* as defined above, which may be based on measurement of the P-wave modulus of the aggregate (i.e., Pw*) only, and do not require the need for shear-wave velocity. Also, a gas correction term applies only to well-consolidated sandstones, not to sand packs or loosely or poorly consolidated sands, as set forth in detail and discussed below.

A key to the above discovery that Pw* can be used to estimate the elastic moduli of the formation of interest on the basis of empirical expressions of the form $$\hat{G}^* = f_1(P^*_{ol}) \quad (21)$$

where G* is the shear modulus, and the bulk modulus by the form $$\hat{K} = f_2(P^*_{ol}) \quad (22)$$

where Po1* is the P-wave modulus. The subscript "ol" means "observed in the laboratory". Of course, the subscript "ow" is also operative in this context: in circumstances where P-wave modulus is "observed from well log data", as explained below.

The empirical coefficients for the above Equations 21 and 22 have been found for sands without performing undue experimentation and, moreover, produce correlation coefficients in a range of 0.927 to 0.962.

In general, Equations 21 and 22 are proven excellent predictors. E.g., the above equations have been found to give correlation coefficients of 0.96 and 0.93 respectively at the highest pressure conditions. A standard acoustic measurement system (AMS) can be used to determine densities, porosities and three moduli (P*, K* and G*) as a function of pressure of known materials to predict the coefficients of the above equations.

Note also that values of P-wave modulus estimated from well logs is in accordance with $$P_{ow}^* = \rho_b V_p^2 \quad (35)$$

where ρb is the density and Vp is the compressional velocity from such logs, as explained below.

However, mineralogy can also be a determining factor.

The limestone equations have practical validity in areas well represented by that particular sampling used above. Experience has shown that such data are particularly good predictors of velocity and porosity values in the Ardmore and Arcoma basins in the Midcontinent of the United States of America. However, the Biot-Gassmann relationship as set forth in Equation 20b should be used:

$$K_a = K^* - K_f \frac{(1 - K^*/K_m)^2}{(1 - K_f/K_m)\phi - (K_f/K_m)(1 - K^*/K_m)} \quad (20b)$$

where

Ka=frame modulus (the bulk modulus with empty pores)

Km=bulk modulus of the solid material

Kf=bulk modulus of the fluid (including the gas) in the pores.

The second term of the right-hand member of Equation 20d is referred to as the fluid correction term, Kfc, so that K*=Ka+Kfc, as previously indicated.

Mathematical Modeling of Gas in Sandstone Formations

Equations 21 and 22 are assumed to be applicable in the area under study, as determined from well logs via equation 35. Without this assumption, calculation of fluid saturation effects on the P-wave modulus is not possible.

Parenthetically, there must be available from well logs $+\rho b$, $\phi$ and Vp, from which the observed P-wave modulus, Pow*, is calculated ("ow" means "observed from well logs") by equation 35, supra. These data must come from a section of the well known to be 100% brine saturated. From these steps, the elastic moduli can be calculated.

FIG. 4 is a flow diagram of the data transformation process of the present invention.

Briefly, in the initial step, predicted shear modulus, $\hat{G}w^*$, for the depth (pressure) is calculated from the predictor Equation 21 supra, i.e., $$\hat{G}^* = f_1(P^*_{ol})$$

In step (2), there is the calculation of the predicted bulk modulus, $\hat{K}w^*$, for the depth (pressure) from the predictor Equation 22 supra, i.e., $$\hat{K} = f_2(P^*_{ol})$$

In step (3), to model gas-saturated formations, there is next calculated Ka via Equations 20a–20d. In these statistical terms, Equations should be modified to read $$\hat{K}_a = \hat{K}^*_w - \frac{K_{br}(1 - K^*_w/K_m)^2}{(1 - K_{br}/K_m)\phi - K_{br}/K_m(1 - K^*_w/K_m)} \quad (20e)$$

where Kbr is the bulk modulus of brine. Assume a pressure-independent value of 25 Kbar. The bulk modulus of the solid material, Km, is also assumed to be pressure-independent.

From the several sandstone samples, a means Km of 393 Kbar is noted with a standard deviation of less than 10%. This value can be used as a starting point if one has no other data.

It is physically impossible for $\hat{K}w^*$ to exceed Km. However, the predicted modulus, $\hat{K}w^*$, can exceed the mean value of Km. In that event, either:

1. abort the method for that set of data, or
2. independently determine the true value of Km.

Errors in Ka are apt to be largest for porosities less than about 5%. Above that value, we had no problems in this step of the calculation.

In step (4), calculation of Kgas*, the predicted bulk modulus with gas present, in accordance with:

$$\hat{K}^*_{gas} = \hat{K} + \frac{(1 - \hat{K}_a/K_m)^2}{\phi/K_{fg} + (1 - \phi)/K_m - \hat{K}_a/K_m^2} \quad (23)$$

where Kfg equals the bulk modulus of a liquid-gas mixture. It is equal to $$1/K_{fg} = S_g/K_g + (1 - S_g)/K_{br} \quad (24)$$

where Sq is the fractional gas saturation and Kg is the bulk modulus of methane. The latter is both temperature- and pressure-dependent.

Estimation of the dynamic bulk modulus of natural gas can be more rigorous. Approximate methods to estimate the fluid modulus, Kf, for use in the Gassmann relations can be used, and are set forth supra.

Attempts to estimate the dynamic bulk modulus of a gas component, Kdgas, from either the isothermal or adibatic perfect gas laws are inadequate for some applications, but results set forth below in Table III can be useful to obtain the speed of sound in methane over a range of pressure and temperature conditions of interest in accordance with:

$$K_{gas}{}^d = \rho_{gas} V_p{}^2 \quad (25)$$

where $\rho$gas is the density and Vp is the compressional velocity.

Methane compressibilities can be obtained from solutions of the Benedict, Webb and Rubin equations of state (see Journal of Petroleum Technology, Vol. 22, 1970, pp 889–895), or from conventional empirical gas equations equivalent thereto.

Table V shows a constituent analysis of gas from a typical South Louisiana well. The gas gravity is 0.6995 with a 44,000 G.O.R. Table V indicates that methane and ethane are the predominant components and, hence, the use of the methane equations presented here seems justified for use in Gulf Coast estimations of reflectivities.

TABLE V

| Component | % by Volume |
|---|---|
| Methane | 92.19 |
| Ethane | 2.87 |
| $CO_2$ | 1.6 |
| Propane | 0.98 |
| Isobutane | 0.25 |
| n-Butane | 0.29 |
| Isopentane | 0.15 |
| n-Pentane | 0.13 |
| Hexane | 0.19 |
| Heptane plus | 1.17 |
| Nitrogen | 0.18 |

In step (5), equations 21 and 23 are used to obtain Pgas*. Since Gw*=Ggas*, according to the Biot-Gassmann theory, $$\hat{P}_{gas}{}^* = \hat{K}_{gas}{}^* + (4/3)\hat{G}_w{}^* \quad (30)$$

Pgas* is the predicted P-wave modulus with gas present.

In step 6, to convert the moduli to velocities, use:

$$\rho_m = 2.65 \text{ g/cm}^3$$

$$\rho_{br} = 1.05 \text{ g/cm}^3$$

and the density equations, assuming a value for Sg, $$\rho_b = \phi \rho_{fg} + (1-\phi)\rho_m, \quad (31)$$

where $\rho_{fg} = S_g \rho_g + (1-S_g)\rho_{br}$, to obtain the predicted value of $V_p$, i.e., $\hat{V}_p$ with gas present.

$$\hat{P}_{gas}{}^* = \rho_b \hat{V}_p{}^2 \quad (32)$$

In step 7, seismic characteristics of interest are calculated as a function of different gas saturations and compared with actual values until a pattern match occurs. The amount of gas saturation is then evident.

DESCRIPTION OF EMBODIMENT

Having now established a firm mathematical and theoretical basis for the process of the present invention, perhaps a description for a system for carrying out the invention is in order. In this regard, reference again should be made to FIG. 4, which is a flow diagram for such a system. From the above descriptions, it is evident that displays ultimately will be provided which indicate both presence and amounts of gas/oil-bearing strata within a zone of interest.

It should be pointed out that while theoretical acoustic characteristics can be provided using the expressions and descriptions set forth above, actual acoustic data must be available from the field; such data are initially collected, say, using one of today's conventional techniques, e.g., involving seismic multiple-area coverage. One of the better field-gathering techniques is a conventional form of recording seismic data using what is called common-depth-point gathers (CDP). From such data, characteristics of events associated with gas/oil-bearing strata can be normalized and then compared with the theoretical data predicted by the method involving the present invention, such values being variable as a function of gas/oil saturation, inter alia.

Note further in returning to FIG. 4 that it can be assumed that a section of data has been analyzed for "bright spots" related to, say, gas-bearing strata alone, such events being known by geographic location and/or time-depth basis and the traces have been dynamically and statically corrected.

The steps of FIG. 4 include calculation of synthetic acoustic values of interest, as a function of gas saturation, and comparing these values with actual field values obtained using conventional field-gathering techniques.

Such comparison will include calculations of the theoretical data values as a function of gas saturation; then the pattern of such values as a function of gas saturation can be analyzed so that an interpreter can compare actual field data therewith and therefore estimate the gas saturation in the zone of interest.

Comparison Techniques

The comparison of such values can occur within (or without) the particular computing system to be adopted. If internal comparison techniques are used, the nature of the results (to be equated in a comparison sense) must be taken into account:

(i) for velocity comparisons, an array comparison technique can be used within the system to be adopted in which dimensions of the array include: velocity amplitudes (both synthetic and actual) as a function of geometrical location, depth (or equivalent time) values, and gas/oil saturation.

While either the synthetic or actual values can serve as the primary selector values, it is perhaps better to use the latter to compare with the former. In that way, the array addresses associated with individual velocity values can be incremented in sequence (in one or more dimensions) and the results compared. The best match becomes apparent from a reading or listing of all comparisons made, or from a designation of the best match on a GO-NO GO basis. In this regard, some preliminary processing analysis of the seismic record is in order to establish the active seismic velocity deducible from the record as a function of time or depth. A technique well known in the art to reconcile theory and data, uses an iterative technique in which a stacking velocity for a set of traces (corrected) is associated. Hereafter, the set of corrected traces (all associated with a common centerpoint) is stacked and coherency of the data noted. Then the process is repeated with a different stacking velocity; the most coherent of the stacked data allows a "best" stacking velocity determination to be deduced.

(ii) for amplitude comparisons, an array technique similar to that previously described can be used; but conversely an auxiliary comparitor could also be implemented to function with disk data provided from the computing system to be described hereinafter. In the former, dimensions of the array would include: actual and synthetic amplitude values as a function of geometrical centerpoint location, time (or migrated equivalent depth) values and gas/oil saturation values. Incrementing of the array (in one or more dimensions) allows for a determination of "best" match of the data. In the latter, "best" match statistics can be developed after a synthetic amplitude-versus-time trace has been generated. Of course, such a synthetic trace requires amplitude values to be established, say based on the relationship $$Ar = \left[ \frac{V_2 d_2 - V_1 d_1}{V_2 d_2 + V_1 d_1} \right] Ai$$

where Ar is the amplitude from the reflected signal and Ai is the amplitude of the incident signal; $V_1$ is the compressional velocity of the wave in an overlying medium 1; $V_2$ is the compressional velocity $d_2$ is the density of the underlying medium below the contact reflection line; $d_1$ is the density of the overlying medium 1. Also, the above data must be migrated to the time dimension as such information is initially associated with established depth values within the earth. Thereafter the original seismic record (usually in a composite trace basis) is cross-correlated with the various synthetic traces (each of the latter being associated with different gas/oil saturation values so that the best match therebetween becomes easily established.

FIG. 5 illustrates particular elements of a computing system for carrying out the steps of FIG. 4, including certain aspects related to the comparison of data.

The System

While many computing systems are available to carry out the process of the present invention, to best illustrate operations a microcomputing system 50 of FIG. 5 is didactically best and is presented in detail below.

System 50 of FIG. 5 can be implemented on hardware provided by many different manufacturers, and for this purpose elements provided by MOS Technology, Norristown, Pa. 19401, may be preferred.

Such a system 50, which can be an MCS-6500 system from the above corporation, can include a CPU 51 controlled by a control unit 52 in conjunction with signals from external devices (one or more), not shown. Two memory units 53 and 54 connect to CPU 51 through bus 55. Program memory unit 53 (ROM) stores instructions for directing the activities of the CPU 51, while data memory 54 (RAM) contains data as data words related to logging and other geologic data provided by field acquisition systems. Since the logging and geologic data banks comprise large amounts of big-bit data, an auxiliary memory unit 56 may also be useful in carrying out the method of the present invention. Inputting and accessing such information is usually via peripheral interfaces 57. To rapidly input or access data, the CPU 51 addresses a particular port (say at input port 58, output ports 59). Such ports are addressed to receive or access information as required, such information being fed say via keyboard 60 or outputted or storable on usual external equipment known in the art, e.g., printer 61, floppy disks 62, paper-tape readers, etc.

The number and type of peripheral devices needed to carry out the method of the invention can generally be estimated very accurately. However, it is important to keep in mind that such estimates must be subject to review after a full analysis of system performance is completed. The seismic-interpreter-designer may find it necessary to use a special-purpose interface part or to redesign the I/O structure if the evaluation of total system performance reveals that the system performance reveals that the system cannot operate at the required speed. Use of special-purpose peripheral interface parts will reduce the number of tasks which must be handled by the CPU 51 and consequently can increase the over-all system speed, but this generally involves additional component cost.

Likewise, the use of a fully vectored interrupt can lead to increased performance at increased cost. The goal of any program must be to meet all the system performance at the minimum possible cost.

After the various peripheral devices in the system have been evaluated to determine the number of inputs and outputs required, the total required by all peripherals can be divided by 16 to determine the number of devices required. This is a good first approximation which will be reevaluated as the system development progresses.

Evaluation of the amount of RAM required by the system is a somewhat more difficult problem than estimation of peripheral devices. This is due primarily to the fact that much of the RAM is required by the system software as working storage, such as storage of immediate results in arithmetic operations. Since the machine-implemented program will probably not be written when these estimates are first attempted, the probability of error in this portion of the estimate may be fairly high.

In addition to working storage, the RAM must provide storage for:

1. The Stack (to be described below);
2. Peripheral input data storage;
3. Peripheral output data storage.

Items 2 and 3, above, can be evaluated quite accurately, since a detailed analysis of the peripheral devices has usually been completed when these estimates are first attempted. In general, a block of RAM must be made available for each peripheral device. The amount of RAM required for each is a function of the type of peripheral device being interfaced and just how the device is to be controlled.

The amount of RAM required by the stack is a function of both the interrupt structure and the system software. As a result, an estimate of this requirement must be based on the system programmer's best estimates of his requirements. This should be combined with an estimate of the required working storage and the peripheral data storage requirements to obtain an estimate of the total system RAM.

Amount of ROM required in a system cannot be determined accurately until the system program is completed. However, by partitioning the system program into definable pieces, an estimate can be made of each task and the total can be obtained of the ROM required by each section.

Most programs consist of easily defined sections such as the software for each peripheral device, arithmetic routines, etc. These are the pieces which should be examined separately to estimate the ROM required by each.

For outputting information, system 50 can be included with printer 61, again accessed through a particular interface 57 at an output port 59, whereby the operations in accordance with the present invention are printable. Of more use as an outputting unit, however, would be a disk unit which would temporarily store the accumulated data after the latter had again been accessed through a different interface 57 at another output port 59. In that way, the information on the disk unit can be used in conjunction with an off-line digital plotter capable of generating proper side-by-side displays of the data for use in conjunction with typical seismic data sections for comparisons and interpretation, as explained below. Such plotters are available in the art. One proprietary model that we are familiar with uses a computer-controlled CRT for optically merging onto photographic paper as a display mechanism the data provided by the present invention. Briefly, in such a plotter, the data are converted to CRT deflection signals; the resulting beam is drawn on the face of the CRT and the optically merged record of the events recorded, say via photographic film. After a predetermined number of side-by-side lines have been drawn, the film is processed in a photography laboratory and hard copies returned to the interpreters for their review.

Of course, the CPU 51 of FIG. 5 is the key to the operation in accordance with the present invention. As a general matter, it controls the functions performed by the other components, including addressing all input and output ports. It also fetches instructions from program memory unit 53, decodes their binary content and executes them. It also references data memory unit 54 (and/or other auxiliary memory units) and other interface ports as required in the execution of the instructions. It also recognizes and responds to certain control signals as set forth below.

FIG. 6 illustrates CPU 51 in more detail.

As shown, the CPU 51 includes an array of registers surrounding but operatively tied to an arithmetic logic unit (ALU) 63 through an internal data bus 64, all under control of a control unit generally indicated at 65. As indicated, the control unit includes clock generator 66, timing control unit 67 and instruction decoder 68. Note that the instruction decoder 68 is also operatively timed to the following units for control purposes: an instruction register 69, processor status register 70 and interrupt logic circuit 71, operating as set forth below. While instruction register 69 and program counters 72 have dedicated uses, an array of other registers, such as accumulator 73 and index registers 77 have more general uses.

The accumulator 73 usually stores one of the seismic operands to be manipulated by the ALU 63. E.g., in the summation of two or more numbers, the instruction may direct the ALU 63 to not only add in sequence the contents of the temporary registers containing predetermined values of logging or geologic data in the accumulator, but also store the result in the accumulator itself. Hence the accumulator 73 operates as both a source (operand) and a destination (result) register. Additional registers such as input data latch 74, data bus buffer 75 and address latches and buffers 76 are useful in manipulation of other seismic results and data, since they eliminate the need to shuffle results back and forth between the external memory units of FIG. 5 and accumulator 73.

The internal organization of the CPU 51 can be split into two sections. In general, the instructions obtained from the program memory 54 (FIG. 5) are executed by implementing a series of data transfers in the register section indicated at 80. The control lines which actually cause the data transfers to take place are generated in the control section generally indicated at 81. Instructions enter the CPU 51 on the bus 55 (FIG. 5), are latched into instruction register 69 and are then decoded along with timing signals at instruction decoder 68 to generate the register control signals to the various other elements of the system.

The control unit 65, including timing controller 67, keeps track of the specific cycle being executed. These units are set to "T0" for each instruction fetch cycle and are advanced at the beginning of each "Phase One" clock pulse. Each instruction starts in T0 and goes to T1, T2, T3, etc., for as many cycles as are required to complete execution of the instruction. Each data transfer, etc., which takes place in the register section 80 is caused by decoding the contents of both the instruction register 69 and the timing control unit 65.

Additional control lines which affect the execution of the instructions are derived from the interrupt logic unit 71 and from the process status register 70. The interrupt logic unit 71 controls the CPU interface to the interrupt inputs to assure proper timing, enabling, sequencing, etc., which the CPU 51 recognizes and services.

The processor status register 70 also can contain a set of latches which serve to control certain aspects of the CPU operation, say to indicate the results of CPU arithmetic and logic operations, and to indicate the status of data either generated by the CPU or transferred into the CPU from outside.

Since the real work of the CPU is carried on in the register section 80 of the CPU, perhaps a detailed study is in order. The components of section 80 include:

Data Bus Buffers 75
Input Data Latch (DL) 74
Program Counter (PCL, PCH) 72
Accumulator (A) 73
Arithmetic Logic Unit (ALU) 63
Stack Pointer (S) 82
Index Registers (X, Y) 77
Address Bus Latches/Buffers 76
Process Status Register (P) 70

Again referring to FIG. 5, at 1 mHz the data which come into the CPU from the program memory 54, the data memory 53 or from peripheral devices appears on the bus 55 during the last 100 nanoseconds of Phase Two. No attempt is made to actually operate on the data during this short period. Instead, it is simply transferred into the input data latch 74 (FIG. 6) for use during the next cycle. The data latch 74 serves to trap the data on the bus during each Phase Two pulse. It can then be transferred onto one of the internal buses, say bus 64, and from there into one of the internal registers. For example, data being transferred from memory into the accumulator 73 will be placed on the internal data bus 64 and will then be transferred from the internal data bus 64 into the accumulator 73. If an arithmetic or logic operation is to be performed, say using the data from a memory unit and the contents of the accumulator 73, data in the input data latch 74 will be transferred onto the internal data bus 64 as before. From there, it will be transferred into the ALU 63. At the same time, the contents of the accumulator 73 will be transferred onto a bus in the register section 80 and from there into the second input to the ALU 63. The results of the arithmetic or logic operation will be transferred back to the accumulator 73 on the next cycle by transferring first onto the bus and then into the accumulator 73. All of them data transfers take place during the Phase One clock pulse.

The program counter (PCL, PCH) 72 provides the addresses which step the CPU through sequential instructions to the program. Each time the CPU fetches an instruction from program memory, the contents of PCL 72 are placed on the low-order 8 bits of the address bus and the contents of PCH 72 are placed on the high-order 8 bits. The counter 72 is incremented each time an instruction or data is fetched from program memory.

Accumulator 73 is a general-purpose 8-bit register which stores the results of most arithmetic and logic operations. In addition, the accumulator 73 usually contains one of the two data words used in these operations.

All logic and arithmetic operations take place in the ALU 63. This includes incrementing and decrementing of internal registers (except PCL and PCH 72). However, the ALU 63 cannot store data for more than one cycle. If data are placed on the inputs to the ALU 63 at the beginning of one cycle, the result is always gated into one of the storage registers or to external memory during the next cycle. Each bit of the ALU 63 has two inputs. These inputs can be tied to various internal buses or to a logic zero; the ALU 63 then generates the SUM, AND, OR, etc., function using the data on the two inputs.

Stack pointer (S) 82 and the two index registers (X and Y) 77 each consist of 8 simple latches. These registers store data which are to be used in calculating addresses in data memory.

Address bus buffers 76 consist, in part, of a set of latches and TTL compatible drivers. These latches store the addresses which are used in accessing the peripheral devices (ROM, RAM, and I/O's of FIG. 5.

Table VI illustrates the total CPU instructions which must be used to carry out the method of the present invention.

In brief, the CPU instruction set is divided into three basic groups. The first group has the greatest addressing flexibility and consists of the most general-purpose instructions such as Load, Add, Store, etc. The second group includes the Read, Modify, Write instructions such as Shift, Increment, Decrement and the Register X movement instructions. The third group contains all the remaining instructions, including all stack operations, the register Y, compares for X and Y and instructions which do not fit naturally into Group One or Group Two.

There are eight Group One instructions, eight Group Two instructions, and all of the 39 remaining instructions are Group Three instructions.

The three groups are obtained by organizing the OP CODE pattern to give maximum addressing flexibility (16 addressing combinations) to Group One, to give 8 combinations to Group Two instructions and the Group Three instructions are basically individually decoded.

Group One Instructions

These instructions are: Add With Carry (ADC), (AND), Compare (CMP), Exclusive Or (EOR), Load A (LDA), or (ORA), Subtract With Carry (SBC), and Store A (STA). Each of these instructions has a potential for 16 addressing modes, although usually in practice only 8 of the available modes are used.

Addressing modes for Group One are: Immediate, Zero Page, Zero Page Indexed by X, Absolute, Absolute Indexed by X, Absolute Indexed by Y, Indexed Indirect, Indirect Indexed. The unused 8 addressing modes are used to allow, possibly, addressing of additional on-chip registers, of on-chip I/O ports, and to allow two-byte word processing.

Group Two Instructions

Group Two instructions are primarily Read, Modify, Write instructions. There are really two subcategories within the Group Two instructions. The components of the first group are shift and rotate instructions and are: Shift Right (LSR), Shift Left (ASL), Rotate Left (ROL), and Rotate Right (ROR).

The second subgroup includes the Increment (INC) and Decrement (DEC) instructions and the two index register X instructions, Load X (LDX) and Store X (STX). These instructions would normally have 8 addressing modes available to them because of the bit pattern. However, to allow for upward expansion, only the following addressing modes have been defined: Zero Page, Zero Page Indexed by X, Absolute, Absolute Indexed by X, and a special Accumulator (or Register) mode. The four shift instructions all have register A operations; the incremented or decremented Load X and Store X instructions also have accumulator modes, although the Increment and Decrement Accumulator has been reserved for other purposes. Load X from A has been assigned its own mnemonic, TAX. Also included in this group are the special functions of Decrement X which is one of the special cases of Store X. Included also in this group in the X decodes are the TXS and TSX instructions.

All group One instructions have all addressing modes available to each instruction. In the case of Group Two instructions, another addressing mode has been added; that of the accumulator and the other special decodes have also been implemented in this basic group. However, the primary function of Group Two instructions is to perform some memory operation using the appropriate index.

It should be noted for documentation purposes that the X instructions have a special mode of addressing in which register Y is used for all indexing operations; thus, instead of Zero Page Indexed by X, Y instructions have Zero Page Indexed by Y, and instead of having Absolute Indexed by X, X instructions have Absolute Indexed by Y.

Group Three Instructions

There are really two major classifications of Group Three instructions; the modify Y registers instructions, Load Y (LDY), Store Y (STY), Compare Y (CPY), and Compare X (CPX), instructions actually occupy about half of the OP CODE space for the Group Three instructions. Increment X (INX) and Increment Y (INY) are special subsets of the Compare X and Compare Y instructions and all of the branch instructions are in the Group Three instructions.

Instructions in this group consist of all of the branches: BCC, BCS, BEQ, BMI, BNE, BPL, BPC and BPS. All of the flag operations are also devoted to one addressing mode—they are: CLC, SEC, CLD, SED, CLI, SEI and CLV. All of the push-and-pull instructions and stack operation instructions are Group Three instructions. These include: BRK, JSR, PHA, PHP, PLA and PLP. The JMP and BIT instructions are also included in this group. There is no common addressing mode available to members of this group. Load Y, Store Y, BIT, Compare X and Compare Y have Zero Page and Absolute, and all of the Y and X instructions allow Zero Page Indexed operations and Immediate.

Returning to FIG. 5, the total CPU instruction set of Table VII which controls CPU 51 is stored in the program memory unit 53. The CPU 51 references the contents of the memory unit 53 in order to determine appropriate processing steps.

In operations, the addresses of the instruction set, in order, are numerically adjacent, the lower addresses containing the first instructions to be executed and the higher addresses containing later instructions.

The only time the program violates the sequential rule previously mentioned is when the instruction in one section of memory is a "jump" instruction to another section of memory.

A jump instruction can also contain the address of the instruction which is to follow it. The next instruction may be stored in any location in memory unit 53, FIG. 5, as long as the programmed jump specifies the correct address.

A special kind of program jump occurs when the stored program "calls" a subroutine. In this kind of jump, the CPU 51 is required to "remember" the contents of the program counter at the time that the jump occurs. This enables the CPU 51 to resume execution of the main program which it is finished with the last instruction of the subroutine.

A "subroutine" is a program within a program. Usually it is a general-purpose set of instructions that must be executed repeatedly in the course of a main program.

The CPU 51 has a special way of handling subroutines in order to insure an orderly return to the main program. When the CPU receives a call instruction, it increments the program counter and notes the counter's contents in a reserved memory area of the memory unit known as the stack area, which includes Such an instruction need specify no address. When the CPU 51 fetches a return instruction, it simply replaces the current contents of the program counter with the address on the top of the stack. This causes the CPU 51 to resume execution of the calling program at the point immediately following the original call instruction.

Subroutines are often "nested", that is, one subroutine will sometimes call a second subroutine. The second may call a third, and so on. This is perfectly acceptable, as long as CPU 51 has enough capacity to store the necessary return addresses, and the logical provision for doing so. In other words, the maximum depth of nesting is determined by the depth of the stack. If the stack has space for storing three return addresses, then three levels of subroutines may be accomplished.

CPU's have different ways of maintaining stack contents. Some have facilities for the storage of return addresses built into the CPU itself. Other CPU's use a reserved area of external memory as the stack area and simply maintain a stack "pointer" register, such as pointer register 82, FIG. 6, which contains the address of the most recent stack entry. The external stack hence allows virtually unlimited subroutine nesting. In addition, if the processor provides instructions that cause the contents of the accumulator 73 and other general-purpose registers to be "pushed" onto the stack or "pulled" off the stack via the address stored in the stack pointer 82, multilevel interrupt processing (as described later) is possible. The status of CPU 51 (i.e., the contents of all the registers) can be saved in the stack when an interrupt is accepted and then restored after the interrupt has been serviced. This ability to save the CPU's status at any given time is possible, even if an interrupt service routine itself is interrupted.

Each operation that the CPU can perform is identified by a unique byte of data known as an "operation code". An 8-bit word used as an operation code can distinguish between 256 alternative actions, more than adequate for most processors.

In general, all instructions begin with T0 and the fetch of the OP CODE and continue through the required number of cycles until the next T0 and the fetch of the next OP CODE. Basic terminology used in conjunction with the Figures and is as defined below, for ease of reference.

OP CODE—The first byte of the instruction containing the operator and mode of address.

OPERAND—The data on which the operation specified in the OP CODE is performed.

BASE ADDRESS—The address in Indexed addressing modes which specifies the location in memory to which indexing is referenced. The high order of byte of the base address (AB08 to AB15) is BAH (Base Address High) and the low order of the base address (AB00 to AB07) is BAL (Base Address Low).

EFFECTIVE ADDRESS—The destination in memory in which the data are to be found. The effective address may be loaded directly as in the case of page Zero and Absolute Addressing or may be calcined as in Indexing operations. The high order byte of the effective address (AB08 to AB15) is ADH and the low order byte of the effective address (AB00 to AB07) is ADL.

INDIRECT ADDRESS—The address found in the operand of instructions utilizing (Indirect), Y which contains the low order byte of the base address. IAH and IAL represent the high and low order bytes.

JUMP ADDRESS—The value to be loaded into Program Counter as a result of a Jump Instruction.

During operation, the CPU 51 fetches an instruction in two distinct operations. First, CPU 51 transmits the address in its program counter 72 of FIG. 6 to the memory. Then the memory returns the addressed byte to CPU 51, viz. to the instruction decoder 68, and uses it to direct activities during the remainder of the execution.

The mechanism by which the CPU translates an operation code into specific processing actions requires some elaboration. The 8 bits stored in the instruction decoder 68 can be decoded and used to selectively activate one of a number of output lines, in this case up to 256 lines. Each line represents a set of activities associated with execution of a particular operation code. The enabled line can be combined with selected timing pulses, to develop electrical signals that can then be used to initiate specific actions. This translation of code into action is also aided by the control circuitry associated therewith, as previously explained.

An 8-bit operation code is often sufficient to specify a particular processing action. There are times, however, when execution of the instruction requires more information than 8 bits can convey, e.g., say when the instruction references a memory location. The basic instruction code identifies the operation to be performed, but cannot specify the object address as well. In a case such as this, a 2- or 3-byte instruction must be used. Successive instruction bytes are stored in sequentially adjacent memory locations, and the CPU performs two or three fetches in succession to obtain the full instruction. The first byte retrieved from memory is placed in the CPU's instruction 66 and subsequent bytes are placed in temporary storage; the CPU then proceeds with the execution phase.

CPU 51 usually uses register-pairs to hold the address of a memory location that is to be accessed for data. If the address register is programmable (i.e., if there are instructions that allow the programmer to alter the contents of the register), the program can "build" an address in the address register prior to executing a memory reference instruction (i.e., and instruction that reads data from memory, writes data to memory or operates on data stored in memory).

ALU 63, as previously mentioned, is that portion of the CPU performing the arithmetical and logical operations on the binary data.

The ALU 63 must contain an adder which is capable of combining the contents of registers of array, the register of the CPU and accumulator 73 in accordance with the logic of binary arithmetic. This provision permits the CPU to perform arithmetical manipulations on the data it obtains from memory and from its other inputs.

Using only the basic adder, routines can subtract, multiply and divide, giving the machine complete arithmetical capabilities. In practice, however, most ALU's provide other built-in functions, including hardware subtraction, boolean logic operations and shift capabilities in conjunction with index registers 77.

As previously indicated, interrupt provisions are included on many central processors as a means of improving the CPU's efficiency. Consider the case of a computer that is processing a large volume of data, portions of which are to be output to a printer. The CPU 52 can output a byte of data within a single machine cycle, but it may take the printer the equivalent of many machine cycles to actually print the character specified by the data byte. The CPU 51 could then remain idle, waiting until the printer can accept the next data byte. If an interrupt capability is implemented to the computer, the CPU can output a data byte, then return to data processing. When the printer is ready to accept the next data byte, it can request an interrupt. When the CPU 51 acknowledges the interrupt, it suspends main program execution and automatically branches to a routine that will output the next data byte. After the byte is output, the CPU 51 continues with main program execution. Note that this is, in principle, quite similar to a subroutine call, except that the jump is initiated externally rather than by the program.

More complex interrupt structures are possible, in which several interrupting devices share the same processor but have different priority levels. Interruptive processing is an important feature that enables maximum utilization of a processor's capacity for high system throughput.

Another important feature than improves the throughput of a CPU is the hold. The hold provision enables direct memory access (DMA) operations.

In ordinary input and output operations, the CPU 51 supervises the entire data transfer. Information to be placed in memory is transferred from the output device to the CPU, and then from the CPU to the designated memory location. In similar fashion, information that goes from memory to output devices goes by way of the CPU.

Some peripheral devices, however, are capable of transferring information to and from memory much faster than the CPU itself can accomplish the transfer. If any appreciable quantity of data must be transferred to or from such a device, then system throughput will be increased by having the device accomplish the transfer directly. The CPU 51 must temporarily suspend its operation during such a transfer, to prevent conflicts that would arise if the CPU and peripheral device attempted to access memory simultaneously. It is for this reason that a hold provision is provided.

TABLE VI

Summary of Processor Instructions by Hexadecimal Sequence

| Hexadecimal | Mnemonic |
|---|---|
| ØØ | BRK |
| Ø1 | ORA - (Indirect,X) |
| Ø5 | ORA - Zero Page |
| Ø6 | ASL - Zero Page |
| Ø8 | PHP |
| Ø9 | ORA - Immediate |
| ØA | ASL - Accumulator |
| ØD | ORA - Absolute |
| ØE | ASL - Absolute |
| 1Ø | BPL |
| 11 | ORA - (Indirect),Y |
| 15 | ORA - Zero Page,X |
| 18 | CLC |
| 19 | ORA - Absolute,Y |
| 1D | ORA - Absolute,X |
| 1E | ASL - Absolute,X |
| 2Ø | JSR |
| 21 | AND - (Indirect,X) |
| 24 | BIT - Zero Page |
| 25 | AND - Zero Page |
| 26 | ROL - Zero Page |
| 28 | PLP |
| 29 | AND - Immediate |
| 2A | ROL - Accumulator |
| 2C | BIT - Absolute |
| 2E | ROL - Absolute |
| 3Ø | BMI |
| 31 | AND - (Indirect),Y |
| 35 | AND - Zero Page,X |
| 36 | ROL - Zero Page,X |
| 38 | SEC |
| 39 | AND - Absolute,Y |
| 3D | AND - Absolute,X |
| 3E | ROL - Absolute,X |
| 4Ø | RTI |
| 41 | EOR - (Indirect,X) |
| 45 | EOR - Zero Page |
| 46 | LSR - Zero Page |
| 48 | PHA |

TABLE VI-continued

Summary of Processor Instructions by Hexadecimal Sequence

| Hexadecimal | Mnemonic |
|---|---|
| 49 | EOR - Immediate |
| 4A | LSR - Accumulator |
| 4C | JMP - Absolute |
| 4D | EOR - Absolute |
| 4E | LSR - Absolute |
| 5Ø | BVC |
| 5Ø | BVC |
| 51 | EOR - (Indirect),Y |
| 55 | EOR - Zero Page,X |
| 56 | LSR - Zero Page,X |
| 58 | CLI |
| 59 | EOR - Absolute,Y |
| 5D | EOR - Absolute,X |
| 5E | LSR - Absolute,X |
| 6Ø | RTS |
| 61 | ADC - (Indirect,X) |
| 65 | ADC - Zero Page |
| 66 | ROR - Zero Page |
| 68 | PLA |
| 69 | ADC - Immediate |
| 6A | ROR - Accumulator |
| 6C | JMP - Indirect |
| 6D | ADC - Absolute |
| 6E | ROR - Absolute |
| 7Ø | BVS |
| 71 | ADC - (Indirect),Y |
| 75 | ADC - Zero Page,X |
| 76 | ROR - Zero Page,X |
| 78 | SEI |
| 79 | ADC - Absolute,Y |
| 7D | ADC - Absolute,X |
| 7E | ROR - Absolute,X |
| 81 | STA - (Indirect,X) |
| 84 | STY - Zero Page |
| 85 | STA - Zero Page |
| 86 | STX - Zero Page |
| 88 | DEY |
| 8A | TXA |
| 8C | STY - Absolute |
| 8D | STA - Absolute |
| 8E | STX - Absolute |
| 9Ø | BCC |
| 91 | STA - (Indirect),Y |
| 94 | STY - Zero Page,X |
| 95 | STA - Zero Page,Y |
| 98 | TYA |
| 99 | STA - Absolute,Y |
| 9A | TXS |
| 9D | STA - Absolute,X |
| AØ | LDY - Immediate |
| A1 | LDA - (Indirect,X) |
| A2 | LDX - Immediate |
| A4 | LDY - Zero Page |
| A5 | LDA - Zero Page |
| A6 | LDX - Zero Page |
| A8 | TAY |
| A9 | LDA - Immediate |
| AA | TAX |
| AC | LDY - Absolute |
| AD | LDA - Absolute |
| AE | LDX - Absolute |
| BØ | BCS |
| B1 | LDA - (Indirect),Y |
| B4 | LDY - Zero Page,X |
| B5 | LDA - Indirect,X |
| B6 | LDX - Indirect,Y |
| B8 | CLV |
| B9 | LDA - Absolute,Y |
| BA | TSX |
| BC | LDY - Absolute,X |
| BD | LDA - Absolute,X |
| BE | LDX - Absolute,Y |
| CØ | CPY - Immediate |
| C1 | CMP - (Indirect,X) |
| C4 | CPY - Zero Page |
| C5 | CMP - Zero Page |
| C6 | DEC - Zero Page |
| C8 | INY |
| C9 | CMP - Immediate |

TABLE VI-continued

| Summary of Processor Instructions by Hexadecimal Sequence | |
|---|---|
| Hexadecimal | Mnemonic |
| CA | DEX |
| CC | CPY - Absolute |
| CD | CMP - Absolute |
| CE | DEC - Absolute |
| DØ | BNE |
| D1 | CMP - (Indirect),Y |
| D5 | CMP - Zero Page,X |
| D6 | DEC - Zero Page,X |
| D8 | CLD |
| D9 | CMP - Absolute,Y |
| DD | CMP - Absolute,X |
| DE | DEC - Absolute,X |
| EØ | CPX - Immediate |
| E1 | SBC - (Indirect,X) |
| E4 | CPX - Zero Page |
| E5 | SBC - Zero Page |
| E6 | INC - Zero Page |
| E8 | INX |
| E9 | SBC - Immediate |
| EA | NOP |
| EC | CPX - Absolute |
| ED | SBC - Absolute |
| EE | INC - Absolute |
| FØ | BEQ |
| F1 | SBC - (Indirect),Y |
| F5 | SBC - Zero Page,X |
| F6 | IQC - Zero Page,X |
| F8 | SED |
| F9 | SBC - Absolute,Y |
| FD | SBC - Absolute,X |
| FE | INC - Absolute,X |

MODIFICATION

To repeat, in estimating gas-liquid saturation effects in sands having any degree of consolidation, inputting only compressional-wave velocity, density and porosity is all that is required in order to provide estimates of the compression (or bulk) moduli, K*, of fluid-saturated sands; the compression moduli, Ka, of sands with empty pores (or with pore-fluid pressures held constant Kfc=K*−Ka; and the shear moduli, G* of fluid-saturated sands (or Ga, of empty sands).

And for an isotropic and homogeneous medium, the velocity, density and moduli are as related above:

$$\rho_b V_p^2 = P^* = K^* + (4/3)G^* \qquad (18)$$

$$\rho_b V_s^2 = G^* \qquad (19)$$

where $\rho_b$ is the bulk density of the formation.

If both compressional- and shear-wave velocities are known, of course, Equation 18 gives K* directly. But no shearwave logs exist for most basins under study; furthermore, if they exist, the results are unreliable in loose (unconsolidated) sands.

For convenience and brevity, a program listing has been formulated to ease the solution of the above equations and is set forth below in the Appendix. In such listing, several lower-case symbols will represents dimensionless ratios of moduli where a=Ka/Km, b=K*/Km, g=G*/Gm=Ga/Gm, and F=(Km/Kf)−1. Gassmann's Equation 20d results:

$$(K^* - K_a)/K_m = K_{fc}/K_m = b - a = \frac{(1-a)^2}{f\phi + (1-a)} = \frac{(1-b)^2}{f\phi - (1-b)} \qquad (20d)$$

If G*, P*, Km, Kf and $\phi$ are known, calculation of Ka through 18 and 20d is of course possible. To calculate P* for a pore fluid other than brine only, i.e., for gas (or oil) and brine, a value of K with the new value of Kf in Equations 18 and 20d is used. But since G* and Km are not usually known, the algorithm provided in the listing uses density, porosity, and compressional-wave velocity data from well logs in the manner previously discussed. It has been proven to be surprisingly accurate in computing the change in compressional-wave velocity due to a change in pore fluids.

EXAMPLES

Let us assume P* and $\phi$ for a brine-saturated sand without large amounts of carbonate or high-elastic-modulus iron minerals, i.e., P* is available from compressional-wave velocity, density, and Equation 18 above. To estimate the other elastic parameters and the compressional-wave velocity, variations in brine-oil-gas saturations must be accounted for.

For the assumed conditions, the modulus Kf=25 Kbar (to be within the accuracy needed) and is pressure-independent. However, an estimate of Km, Gm, and a relationship between a and g are also needed.

To estimate Km and Gm, all information on rock composition of a given area (basin, formation, well, etc.) must be used, i.e., using samples or logs (nuclear, etc.). But mean values for Km and Gm are fairly accurate for many sands, consolidated or not, viz:

$$Km = 393 \text{ Kbar};\ Gm = 361 \text{ Kbar} \qquad (33)$$

The standard deviations of the above quantities for several samples measured were 7% and 12% respectively. Extensive calculations with and without physical models, with sandstone data, produced an acceptable empirical relationship between a and g:

$$a - g = f_3(c,\ a+g) \qquad (34)$$

where c is an adjustable empirical parameter, a and g are as described above, and $f_3$ is a functional operator which relates to the variables of interest in an empirical fashion. It was surprising found by minimizing the rms error between predicted and measured moduli values and is pressure-independent in the above approximation. The correlation coefficients for estimating K* and G* using Equation 34 are both over 0.95.

Final data base includes suites of "hard" sandstones and "soft" sands, with densities and porosities measured and with all compressional-wave and shear-wave velocities measured as functions of pressure. In addition, compositions were determined by an overlapping suite of measurements to give estimates of Km and Gm. Equation 18 supra gives G*, P* and K*; with values of Km and Gm, a and g can then be provided. Equation 34 then gives a c-value for each sample. Such c-values were found not to be significantly correlated with either G, $\phi$, Km/Gm, Gm, or some other pertinent parameters.

Samples containing substantial amounts of carbonates or high-elastic-modulus iron minerals, e.g., had somewhat negative correlations of c with Km. Deleting such samples from the data base reduced the suite of hard sandstones slightly. A slight negative correlation also existed between c and pressure.

By adopting Equations 33 and 34 and the value Kf=25 Kbar, all the information needed to use Equations 18 and 20d become available. The computation, however, is easy to do only "backwards"; that is, by starting with some value of (a+g) and computing (a−g), a and g. Then Equation 20d gives b, and finally, Equation 18 gives P*. Of course, use of the definitions of the various quantities as indicated above is mandatory.

To use P* and $\phi$ to compute K*, Ka, G*, etc., one approach is to program an interative solution as set forth below. But also, another approach would be to start with various values of (a+g) and construct plots or of the desired quantities as functions of P* for various values of $\phi$, as also indicated below.

The complete algorithm of the program listing set forth below was used to compute Ka and G*, using P* brine values only.

The observed or calculated quantities in Table X can then be used to compute seismic velocities in gas and water sands with good accuracy, using steps and equations previously mentioned. Such operations indicate that Equations 18, 20d, 33 and 34 are valid to estimate gas-sand velocities, if Vp, $\phi$ and $\rho$b for a corresponding 100% brine-saturated section are known, in accordance with above assumptions.

Data banks for the process of the invention, of course, must come from a 100%-brine-saturated section of a well. If Km and Gm are known from mineralogical analysis, such values are used. If not, the assumed values of 393 and 361 Kbar, respectively, are available. The solution to Gassmann's equation is very sensitive to errors in Km only when the porosity is low. As the major application of these equations is intended to be in high-porosity "soft" rocks, errors in Km are not apt to be a major drawback.

The process by which the above calculation of the aspects of the present invention were used is as set forth below in steps I-III. Thereafter, velocities, amplitudes, reflectivities, etc. of the strata of interest were calculated in the manner previously mentioned.

Step I

Calculated the observed P-wave modulus from the well, Pow*, in kilobars. 1 Kbar$=10^{\circ}$ dynes/cm$^2$, or $1.45\times10^4$ psi $$P_{ow}{}^* = \rho_v V_p{}^2 \quad (35)$$

STEP II

Compute Ka and G*, using the above algorithm. (The caret sign refers to a predicted quantity, as previously indicated).

STEP III

Use Equations 18, 20d, 33 and 34 to obtain a general expression for Vp for any fluid saturant:

$$V_p = \left[1/\rho_b\left\{\hat{K}_a + \frac{(1-\hat{K}_a/K_m)^2}{\phi/K_{fg} + (1-\phi)/K_m - \hat{K}_a/K_m{}^2} + (4/3)\hat{G}^*\right\}\right]^{\frac{1}{2}} \quad (36)$$

where Kfg equals the bulk modulus for a brine-gas mixture. It is given by Equation 24, supra, $$1/Kfg = Sg/Kg + (1-Sg)/Kbr \quad (24)$$

where Sg is the fractional gas saturation, Kg is the bulk modulus of the gas, and Kbr is the bulk modulus of the brine. In this approximation, Kbr=25 Kbar and may be assumed pressure- and temperature-independent; Kg is both temperature- and pressure-dependent. Estimate for both Kg and $\rho$g for methane, as set forth above.

Correction must be made to $\rho$b for gas saturation and density:

$$\rho b = \phi\rho fg + (1-\phi)\rho m \quad (37)$$

where $$\rho fg = Sg\rho g + (1-Sg)\rho br \quad (38)$$

Use for most cases. Incorrect estimation of $\rho$g and Kg may cause serious errors.

There is some evidence of changes in seismic response for some "soft" rocks when the fluid changes from brine to highly compressible liquid hydrocarbons. The range of Kf is from about 25 Kbar for brines to about 15 for most crude oils to about 5 or 3 for liquid hydrocarbons containing much dissolved gas (but no free gas); and from about 2 to 0.001 Kbar for gases, depending on pressure and temperature. Thereafter, synthetic seismic values can be established and compared with field records in the manner previously described.

Iterative Method in Detail

The objective is to start with assumed values of Km, Gm, and Kf, and the measured values of P* and $\phi$; and then to use the empirical relationship in Equation 34 and Gassmann's Equation 20d supra to estimate Ka, K*, Kfc and G*. A simple iterative calculation with interval-halving to update the variable (a+g) of Equation 34 is available, and such sequence is as follows:

(1) From the current value of (a+g), calculate (a−g); then solve for a and g, and use Gassmann's equation 20d to get b. Use Equations 33 and 18 and the definitions of the quantities to get trial values of K*, G* and finally $\rho$*. Let the trial value of P* be P'; the error in P* is then P'−P*.

(2) If the sign of the error is opposite to that of the preceding error, divide the increment for updating (a+g) by −2. That is, if (P'−P*) has crossed zero, reverse directions and use steps only half as large.

(3) Update (a+g) by adding the current size and sign of the increment, as mentioned above.

(4) If the increment [or (P'−P*)] is satisfactorily small, terminate the iteration. Otherwise, repeat from Step (1).

Suitable starting values are (a+g)=0, increment=+0.4, and negative (P'−P*). The results for (a+g), (a−g) and K* are easily used to calculate the various parameters.

APPENDIX

Having now briefly described the operation of the CPU 51 and of an instruction set for operation of a particular type microprocessor system, e.g. MGS 6500, the program listing for carrying out, in the main, the method of the present invention is of consequence and is set forth below in detail.

The listing is divided into two sections: Section A contains comments as to the purpose and scope of the method. E.g., Steps 00015–00020 detail the purpose and limitations of the method; Steps 00022–00083 indicate the form and nature of the input data; Steps 00085–00098 state the form the nature of the output information; Steps 00100–00105 indicate what error messages are to be expected; Step 00107 indicates the nature and scope of subroutines, etc.

Section B describes the method in detail for calculating various petrophysical parameters of interest. Note that each instruction number that is followed by a ";" describes the particular operation that is carried by the subsequent instructions. E.g., the Step 00116 is "SG(1)=FLOAT(0)" and the Steps 00117–00130 show the detailed steps for carrying out that command; similar circumstances occur at Steps 00131; 00146; 00161, etc. These commands provide in sequence form the operations previously described with reference to FIGS. 5 and 6. Comparison of actual versus synthetic values then occurs on a separate internal (or external) basis as previously described.

SECTION A

```
00014 :: C     ---------------------------------------------------       00000400
00015 :: C     PURPOSE-THIS PROGRAM TAKES BRINE SATURATED PETROPHYSICAL   00000500
00016 :: C     PARAMETERS FOR A ROCK SAMPLE OR EARTH SECTION AND COMPUTES 00000600
00017 :: C     FOR A RANGE OF GAS SATURATIONS THE P-WAVE VELOCITY,VCP, THE SHE00000700
00018 :: C     WAVE VELOCITY VCS, THE POISSON'S RATIO AND THE CALCULATED BULK00000800
00019 :: C     DENSITY RHOBC AND LISTS THEM IN A TABLE. THE PROGRAM MAY OR MAY00000900
00020 :: C     NOT HAVE MINERALOGICAL INPUTS X(I),I=1,13.                 00001000
00021 :: C                                                                00001100
00022 :: C     THIS PROGRAM TAKES AS INPUT:                               00001200
00023 :: C     1. 3 HEADING CARDS PER SUITE OF PROBLEMS,ALPHAMERIC COLS.1..80.00001300
00024 :: C     2. A PARAMETER CARD:                                       00001400
00025 :: C       TGRAD=DEG.F TEMP GRADIENT.  DEFAULT=15 DEG.F PER KILOFT.  00001500
00026 :: C       FGRAD=FLUID PRESSURE GRADIENT.                           00001600
00027 :: C       CO=THOMPSON RHOAN EQN. COFF.                             00001700
00028 :: C       RHOLIQ=LIQUID BULK DENSITY(GM/CM**3).                    00001800
00029 :: C       TOL=T-B FOR HALVING SEARCH TOLERANCE.                    00001900
00030 :: C       WT=GAS MOLECULAR WT.  DEFAULT=16(METHANE).               00002000
00031 :: C       TO=SURFACE TEMP.DEG.F. DEFAULT=74 DEG. F.                00002100
00032 :: C       TST=TOLERANCE OF COMPUTED VS. OBSERVED BULK DENSITY VARIATIO00002200
00033 :: C       IN %.           . APPLIES WHEN MINERALS ARE KNOWN (MIN.>000002300
00034 :: C       WBUG=SPECIAL (RESEARCH) DEBUG PARAMETER WHEN>0.. DEFAULT=0.00002400
00035 :: C       NSG=NO. OF GAS SATURATION ,SG,VALUES. (CURRENTLY LIMITED TO 00002500
00036 :: C       12 VALUES(SEE ARRAYS BELOW).                             00002600
00037 :: C     3. RM,RM DEFAULT VALUES (RHODF,GMDEF) CARD. IF BLANK,DEFAULTS A00002700
00038 :: C       TAKEN AS SHOWN BELOW (2F10.0)         COLS.1..20.        00002800
00039 :: C       THESE CONTAIN:                                           00002900
00040 :: C     A.OBSERVED P-WAVE VELOCITY IN FT.SEC(OR SONIC LOG MICRSEC./FT.00003000
00041 :: C       NOTE: IF SONIC =0.0, VELOCITY. IF SONIC. GE.0.0 CONVERTS  00003100
00042 :: C       SONIC LOG TO FT./SEC..            ORIGINALLY VP=DELTAT,    00003200
00043 :: C       WHERE DELTAT IS IN MICROSEC./FT.  COLS.1..10.            00003300
00044 :: C     B.BULK DENSITY IN GM/CM**3          COLS.11..20.           00003400
00045 :: C     C.POROSITY IN %                     COLS.21..30.           00003500
00046 :: C     D.DEPTH IN FT.                      COLS.31..40.           00003600
00047 :: C     E.TEMPERATURE(DEG.F) COMPUTED IF .LE.0   COLS.41..50.       00003700
00048 :: C   1 FORMAT(1H1  ///)                                           00003800
00049 :: C       DEFAULT=0. COLS.51..55.                                  00003900
00050 :: C    G.SONIC. IF=0,P-WAVE VELOCITY. IF .NE.0,MICROSEC/FT IN COLS. 00004000
00051 :: C      1...10, WHICH IS CONVERTED TO FT./SEC.(INDICATES SONIC LOG). 00004100
00052 :: C     . DEFAULT=0.0.                      COLS.56..65.           00004200
00053 :: C     H.SAMP(J),COL(J)=A8,A2 SAMPLE ID COLS. 71...80.            00004300
00054 :: C     I. TERMINATED BY END FLAG CARD(COLS.1..20 BLANK)           00004400
00055 :: C     FORMAT IS (5F10.0,I5,F10.0,5X,A8,A2)                       00004500
00056 :: C     WHEN MIN =0 NO MINERALS ASSUMED AND RM,GM DEFAULTS TAKEN.  00004600
00057 :: C     ALSO RHOBC=MEASURED BULK DENSITY AND RHOM(J) IS COMPUTED TO BE00004700
00058 :: C     COMPATIBLE WITH THIS.                                      00004800
00059 :: C     WHEN MIN>0, A MINERAL CARD ,FORMAT(13F5.0) FOLLOWS THE GENERAL00004900
00060 :: C     PHYSICAL PARAMETER CARD A---G WITH SAME ID IN COLS. 71..80.  00005000
00061 :: C     (SAMP,COL)AND WITH MINERALS X(1)...X(13) IN 13 5 COL. FIELDS.00005100
00062 :: C     THESE ARE:                                                 00005200
00063 :: C     1.  QUARTZ=X(1)                                            00005300
00064 :: C     2.  CALCITE=X(2)                                           00005400
00065 :: C     3.  DOLOMITE=X(3)                                          00005500
00066 :: C     4   CLAYS=X(4)                                             00005600
00067 :: C     5.  SILICA=X(5)                                            00005700
00068 :: C     6.  FELDSPARS=X(6)                                         00005800
00069 :: C     7.  ANHYDRITE=X(7)                                         00005900
00070 :: C     8.  SIDERITE=X(8)                                          00006000
00071 :: C     9.  HALITE=X(9)                                            00006100
00072 :: C     10. PYRITE=X(10)                                           00006200
00073 :: C     11. WUSTITE=X(11)                                          00006300
00074 :: C     12. HALITE=X(12)                                           00006400
00075 :: C     13. MICAS=X(13). ALL IN PERCENT AND NORMALIZED.            00006500
00076 :: C     IF NOT NORMALIZED, PROGRAM WILL DO SO.                     00006600
00077 :: C     A BLANK OR 0 X(I) CARD WILL DEFAULT TO MIN=0.              00006700
00078 :: C     (THIS CARD MUST FOLLOW THE GENERAL PHYSICAL PARAMETER CARD) 00006800
00079 :: C     IF MIN NOT < OR = 0.                                       00006900
00080 :: C     THE ELASTIC PARAMETERS K(I),G(I) THE SHEAR & BULK MODULI FOR 00007000
00081 :: C     EACH OF THE 13 MINERALS AND THE BULK DENSITY,RHO(I), ARE GIVE00007100
00082 :: C     AS FIXED DATA IN THE PROGRAM, FROM WHICH VRH AVERAGES AND AN 00007200
00083 :: C     AVERAGE FOR RHOM(J) CAN BE BE COMPUTED WHEN MIN>0.          00007300
00084 :: C                                                                00007400
00085 :: C     OUTPUT PRINTOUT:                                           00007500
00086 :: C     1. HEADING CARD INFORMATION.                               00007600
00087 :: C     2.GASTYPE                                                  00007700
00088 :: C     3.PARAMETER CARD INFO.                                     00007800
```

```
:: C      4.NO. OF OBSERVATIONS(SAMPLES)                                    00007900
:: C      5.PROBLEM NO. AND SAMPLE ID.                                      00008000
:: C      6. BRINE SATURATED INPUTS, THEN KM,GM,POROSITY AND SONIC.         00008100
:: C      7.MINERAL CARD DUPLICATE IF MIN>0.                                00008200
:: C      8.TABLE (L-R)SG,CALCVP,CALCVS,POISSON'S RATIO AND CALC. BULK DE00008300
:: C        AS A FUNCTION OF 1R SG=GAS SATURATIONS.                         00008400
:: C                                                                        00008500
:: C      THE ABOVE IS FOR DEFAULT RBUG=0. IF RBUG=1, WE GET ADDITIONALLY00008600
:: C      ABOVE THE TABLE(R, VALUES OF A=KA/KM,B=K*/KM,G=G*/GM,K*,G* AND 00008700
:: C      AND VALUES OF RHOGAS,KGAS AND THE LOCAL TEMERATURE DEG. F        00008800
:: C                                                                        00008900
:: C      ERROR MESSAGES INDICATING EITHER ZERO POROSITY(UNITENABLE) OR    00009000
:: C      PARASNIS SHIRIKMAN LOWER BOUND=PLUS ARE ALSO POSSIBLE.           00009100
:: C      WHEN MINERALS ARE KNOWN(MIN.GT.0) THE BULK DENSITY, RHOBC IS     00009200
:: C      CALCULATED. IF ABS(BULKD-RHOBC)/BULKD(I)>TST(I) AN ERROR IS      00009300
:: C      INDICATED. ONLY ZERO POROSITY TERMINATES THE PROBLEM AND GOES 00009400
:: C      TO THE NEXT. ALL OTHER ERRORS ARE PASSIVE MESSAGES.              00009500
:: C                                                                        00009600
:: C      SUBROUTINES: NAME,RCKA,FLRMOD,GASMOD,FLUID,CALQ.                 00009700
:: C                                                                        00009800
:: C                                                                        00009900
```

SECTION B

```
:: C      *                                                                 00010000
::        IMPLICIT REAL(K)                                                  00010100
::        DIMENSION VP(200),BULKD(200),DEPTH(200),POR(200),X(15),AU(65), 00010200
::       *FTEMP(200),KM(200),GM(200),RHOW(200),COL(200),KIRR(200)          00010300
::        REAL*8 SAMP(200),SPP                                              00010400
::        REAL*8 SG(18)                                                     00010500
::        SG(1)=FLOAT(0)                                                    00010600
:          LDA   #1
:          ASL   A
:          ASL   A
:          CLC
:          ADC   #(SG****01-4) MOD .M
:          STA   .T000005
:          LDA   #0
:          ADC   #(SG****01-4)/256
:          STA   .T000005+1
:.MFFLOAT  SET   1
:          JSR   .FFLOAT
:          .BYTE 0
:          .WORD .C000003
:          .WORD -.T000005
::        SG(2)=FLOAT(1)                                                    00010601
:          LDA   #2
:          ASL   A
:          ASL   A
:          CLC
:          ADC   #(SG****01-4) MOD .M
:          STA   .T000005
:          LDA   #0
:          ADC   #(SG****01-4)/256
:          STA   .T000005+1
:.MFFLOAT  SET   1
:          JSR   .FFLOAT
:          .BYTE 0
:          .WORD .C000002
:          .WORD -.T000005
::        SG(3)=FLOAT(2)                                                    00010602
:          LDA   #3
:          ASL   A
:          ASL   A
:          CLC
:          ADC   #(SG****01-4) MOD .M
:          STA   .T000005
:          LDA   #0
:          ADC   #(SG****01-4)/256
:          STA   .T000005+1
:.MFFLOAT  SET   1
:          JSR   .FFLOAT
:          .BYTE 0
:          .WORD .C000006
:          .WORD -.T000005
::        SG(4)=FLOAT(3)                                                    00010603
:          LDA   #4
:          ASL   A
:          ASL   A
:          CLC
:          ADC   #(SG****01-4) MOD .M
:          STA   .T000005
:          LDA   #0
:          ADC   #(SG****01-4)/256
:          STA   .T000005+1
:.MFFLOAT  SET   1
:          JSR   .FFLOAT
```

```
00173 :              .BYTE 0
00174 :              .WORD .C00000?
00175 :              .WORD -.1000005
00176 ::     SG(5)=FLOAT(0)                                              00010604
00177 :       LDA   #5
00178 :       ASL   A
00179 :       ASL   A
0017A :       CLC
00180 :       ADC   #(SG----01-0) MOD .M
00181 :       STA   .1000005
00182 :       LDA   #0
00183 :       ADC   #(SG----01-0)/256
00184 :       STA   .1000005+1
00185 :.MFFLOAT SET  1
00186 :       JSR   .FFLOAT
00187 :       .BYTE 0
00188 :       .WORD .C000008
00189 :       .WORD -.1000005
00190 ::     SG(6)=FLOAT(5)                                              00010605
00191 :       LDA   #6
00192 :       ASL   A
00193 :       ASL   A
00194 :       CLC
00195 :       ADC   #(SG----01-0) MOD .M
00196 :       STA   .1000005
00197 :       LDA   #0
00198 :       ADC   #(SG----01-0)/256
00199 :       STA   .1000005+1
00200 :.MFFLOAT SET  1
00201 :       JSR   .FFLOAT
00202 :       .BYTE 0
00203 :       .WORD .C000009
00204 :       .WORD -.1000005
00205 ::     SG(7)=FLOAT(10)                                             00010606
00206 :       LDA   #7
00207 :       ASL   A
00208 :       ASL   A
00209 :       CLC
00210 :       ADC   #(SG----01-0) MOD .M
00211 :       STA   .1000005
00212 :       LDA   #0
00213 :       ADC   #(SG----01-0)/256
00214 :       STA   .1000005+1
00215 :.MFFLOAT SET  1
00216 :       JSR   .FFLOAT
00217 :       .BYTE 0
00218 :       .WORD .C000012
00219 :       .WORD -.1000005
00220 ::     SG(8)=FLOAT(15)                                             00010607
00221 :       LDA   #8
00222 :       ASL   A
00223 :       ASL   A
00224 :       CLC
00225 :       ADC   #(SG----01-0) MOD .M
00226 :       STA   .1000005
00227 :       LDA   #0
00228 :       ADC   #(SG----01-0)/256
00229 :       STA   .1000005+1
00230 :.MFFLOAT SET  1
00231 :       JSR   .FFLOAT
00232 :       .BYTE 0
00233 :       .WORD .C000014
00234 :       .WORD -.1000005
00235 ::     SG(9)=FLOAT(20)                                             00010608
00236 :       LDA   #9
00237 :       ASL   A
00238 :       ASL   A
00239 :       CLC
00240 :       ADC   #(SG----01-0) MOD .M
00241 :       STA   .1000005
00242 :       LDA   #0
00243 :       ADC   #(SG----01-0)/256
00244 :       STA   .1000005+1
00245 :.MFFLOAT SET  1
00246 :       JSR   .FFLOAT
00247 :       .BYTE 0
00248 :       .WORD .C000016
00249 :       .WORD -.1000005
00250 ::     SG(10)=FLOAT(25)                                            00010609
00251 :       LDA   #10
00252 :       ASL   A
00253 :       ASL   A
00254 :       CLC
00255 :       ADC   #(SG----01-0) MOD .M
00256 :       STA   .1000005
00257 :       LDA   #0
00258 :       ADC   #(SG----01-0)/256
```

```
:              STA    .T000005+1
:.MFFLOAT      SET    1
:              JSR    .FFLOAT
:              .BYTE  0
:              .AWRD  .C000017
:              .AWRD  -.T000005
::             SG(11)=FLOAT(30)                          00010610
:              LDA    #11
:              ASL    A
:              ASL    A
:              CLC
:              ADC    #(SG****01-4) MOD .M
:              STA    .T000005
:              LDA    #0
:              ADC    #(SG****01-4)/256
:              STA    .T000005+1
:.MFFLOAT      SET    1
:              JSR    .FFLOAT
:              .BYTE  0
:              .AWRD  .C000019
:              .AWRD  -.T000005
::             SG(12)=FLOAT(40)                          00010611
:              LDA    #12
:              ASL    A
:              ASL    A
:              CLC
:              ADC    #(SG****01-4) MOD .M
:              STA    .T000005
:              LDA    #0
:              ADC    #(SG****01-4)/256
:              STA    .T000005+1
:.MFFLOAT      SET    1
:              JSR    .FFLOAT
:              .BYTE  0
:              .AWRD  .C000021
:              .AWRD  -.T000005
::             SG(13)=FLOAT(50)                          00010612
:              LDA    #13
:              ASL    A
:              ASL    A
:              CLC
:              ADC    #(SG****01-4) MOD .M
:              STA    .T000005
:              LDA    #0
:              ADC    #(SG****01-4)/256
:              STA    .T000005+1
:.MFFLOAT      SET    1
:              JSR    .FFLOAT
:              .BYTE  0
:              .AWRD  .C000023
:              .AWRD  -.T000005
::             SG(14)=FLOAT(60)                          00010613
:              LDA    #14
:              ASL    A
:              ASL    A
:              CLC
:              ADC    #(SG****01-4) MOD .M
:              STA    .T000005
:              LDA    #0
:              ADC    #(SG****01-4)/256
:              STA    .T000005+1
:.MFFLOAT      SET    1
:              JSR    .FFLOAT
:              .BYTE  0
:              .AWRD  .C000025
:              .AWRD  -.T000005
::             SG(15)=FLOAT(70)                          00010614
:              LDA    #15
:              ASL    A
:              ASL    A
:              CLC
:              ADC    #(SG****01-4) MOD .M
:              STA    .T000005
:              LDA    #0
:              ADC    #(SG****01-4)/256
:              STA    .T000005+1
:.MFFLOAT      SET    1
:              JSR    .FFLOAT
:              .BYTE  0
:              .AWRD  .C000026
:              .AWRD  -.T000005
::             SG(16)=FLOAT(80)                          00010615
:              LDA    #16
:              ASL    A
:              ASL    A
:              CLC
:              ADC    #(SG****01-4) MOD .M
:              STA    .T000005
```

```
:              LDA    #0
:              ADC    #(SG****01-4)/256
:              STA    .T000005+1
:.MFFLOAT      SET    1
:              JSR    .FFLOAT
:              .BYTE  0
:              .WORD  .C000028
:              .WORD  -.T000005
::            SG(17)=FLOAT(90)                                          00010616
:              LDA    #17
:              ASL    A
:              ASL    A
:              CLC
:              ADC    #(SG****01-4) MOD .M
:              STA    .T000005
:              LDA    #0
:              ADC    #(SG****01-4)/256
:              STA    .T000005+1
:.MFFLOAT      SET    1
:              JSR    .FFLOAT
:              .BYTE  0
:              .WORD  .C000030
:              .WORD  -.T000005
::            SG(18)=FLOAT(130)                                         00010617
:: C          QUARTZ,CALCITE,DOLOMITE,CLAY,SILICA,FELDSPARS,ANHYDRITE,SIDERIT00010700
:: C          BARITE,PYRITE,RUTILE,HALITE,MICA.          13 MINERALS    00010800
:              LDA    #18
:              ASL    A
:              ASL    A
:              CLC
:              ADC    #(SG****01-4) MOD .M
:              STA    .T000005
:              LDA    #0
:              ADC    #(SG****01-4)/256
:              STA    .T000005+1
:.MFFLOAT      SET    1
:              JSR    .FFLOAT
:              .BYTE  0
:              .WORD  .C000032
:              .WORD  -.T000005
::                                                                      00010900
::                                                                      00011000
:              LDA    #1
:              ASL    A
:              ASL    A
:              CLC
:              ADC    #(A*****01-4) MOD .M
:              STA    .T000005
:              LDA    #0
:              ADC    #(A*****01-4)/256
:              STA    .T000005+1
:.MFFLOAT      SET    1
:              JSR    .FFLOAT
:              .BYTE  1
:              .WORD  .C000033
:              .WORD  -.T000005
::            A(2)=FLOAT(767)                                           00011001
:              LDA    #2
:              ASL    A
:              ASL    A
:              CLC
:              ADC    #(A*****01-4) MOD .M
:              STA    .T000005
:              LDA    #0
:              ADC    #(A*****01-4)/256
:              STA    .T000005+1
:.MFFLOAT      SET    1
:              JSR    .FFLOAT
:              .BYTE  1
:              .WORD  .C000034
:              .WORD  -.T000005
::            A(3)=FLOAT(448)                                           00011002
:              LDA    #3
:              ASL    A
:              ASL    A
:              CLC
:              ADC    #(A*****01-4) MOD .M
:              STA    .T000005
:              LDA    #0
:              ADC    #(A*****01-4)/256
:              STA    .T000005+1
:.MFFLOAT      SET    1
:              JSR    .FFLOAT
:              .BYTE  1
:              .WORD  .C000035
:              .WORD  -.T000005
::            A(4)=FLOAT(410)                                           00011003
:              LDA    #4
```

```
:          ASL   A
:          ASL   A
:          CLC
:          ADC   #(R*****01-4) MOD .M
:          STA   .T000005
:          LDA   #0
:          ADC   #(R*****01-4)/256
:          STA   .T000005+1
:.MFFLOAT  SET   1
:          JSR   .FFLOAT
:          .BYTE 1
:          .WORD .C000036
:          .WORD -.T000005
;;         R(5)=FLOAT(260)                                   00011004
:          LDA   #5
:          ASL   A
:          ASL   A
:          CLC
:          ADC   #(R*****01-4) MOD .M
:          STA   .T000005
:          LDA   #0
:          ADC   #(R*****01-4)/256
:          STA   .T000005+1
:.MFFLOAT  SET   1
:          JSR   .FFLOAT
:          .BYTE 1
:          .WORD .C000037
:          .WORD -.T000005
;;         R(6)=FLOAT(400)                                   00011005
:          LDA   #6
:          ASL   A
:          ASL   A
:          CLC
:          ADC   #(R*****01-4) MOD .M
:          STA   .T000005
:          LDA   #0
:          ADC   #(R*****01-4)/256
:          STA   .T000005+1
:.MFFLOAT  SET   1
:          JSR   .FFLOAT
:          .BYTE 1
:          .WORD .C000038
:          .WORD -.T000005
;;         R(7)=FLOAT(563)                                   00011006
:          LDA   #7
:          ASL   A
:          ASL   A
:          CLC
:          ADC   #(R*****01-4) MOD .M
:          STA   .T000005
:          LDA   #0
:          ADC   #(R*****01-4)/256
:          STA   .T000005+1
:.MFFLOAT  SET   1
:          JSR   .FFLOAT
:          .BYTE 1
:          .WORD .C000039
:          .WORD -.T000005
;;         R(8)=FLOAT(1280)                                  00011007
:          LDA   #8
:          ASL   A
:          ASL   A
:          CLC
:          ADC   #(R*****01-4) MOD .M
:          STA   .T000005
:          LDA   #0
:          ADC   #(R*****01-4)/256
:          STA   .T000005+1
:.MFFLOAT  SET   1
:          JSR   .FFLOAT
:          .BYTE 1
:          .WORD .C000040
:          .WORD -.T000005
;;         R(9)=FLOAT(546)                                   00011008
:          LDA   #9
:          ASL   A
:          ASL   A
:          CLC
:          ADC   #(R*****01-4) MOD .M
:          STA   .T000005
:          LDA   #0
:          ADC   #(R*****01-4)/256
:          STA   .T000005+1
:.MFFLOAT  SET   1
:          JSR   .FFLOAT
:          .BYTE 1
:          .WORD .C000041
:          .WORD -.T000005
```

```
::         R(10)=FLOAT(1581)                                   00011004
:          LDA    #10
:          ASL    A
:          ASL    A
:          CLC
:          ADC    #(R*****01-4) MOD .M
:          STA    .T000005
:          LDA    #0
:          ADC    #(R*****01-4)/256
:          STA    .T000005+1
:.MFFLOAT  SET    1
:          JSM    .FFLOAT
:          .WORD  .C000002
:          .WORD  -.T000005
::         R(11)=FLOAT(2330)                                   00011010
:          LDA    #11
:          ASL    A
:          ASL    A
:          CLC
:          ADC    #(R*****01-4) MOD .M
:          STA    .T000005
:          LDA    #0
:          ADC    #(R*****01-4)/256
:          STA    .T000005+1
:.MFFLOAT  SET    1
:          JSM    .FFLOAT
:          .BYTE  1
:          .WORD  .C000003
:          .WORD  -.T000005
::         R(12)=FLOAT(252)                                    00011011
:          LDA    #12
:          ASL    A
:          ASL    A
:          CLC
:          ADC    #(R*****01-4) MOD .M
:          STA    .T000005
:          LDA    #0
:          ADC    #(R*****01-4)/256
:          STA    .T000005+1
:.MFFLOAT  SET    1
:          JSM    .FFLOAT
:          .BYTE  0
:          .WORD  .C000004
:          .WORD  -.T000005
::         R(13)=FLOAT(522)                                    00011012
:          LDA    #13
:          ASL    A
:          ASL    A
:          CLC
:          ADC    #(R*****01-4) MOD .M
:          STA    .T000005
:          LDA    #0
:          ADC    #(R*****01-4)/256
:          STA    .T000005+1
:.MFFLOAT  SET    1
:          JSM    .FFLOAT
:          .BYTE  1
:          .WORD  .C000005
:          .WORD  -.T000005
:                                                              00011100
:                                                              00011200
:          LDA    #1
:          ASL    A
:          ASL    A
:          CLC
:          ADC    #(G*****01-4) MOD .M
:          STA    .T000005
:          LDA    #0
:          ADC    #(G*****01-4)/256
:          STA    .T000005+1
:.MFFLOAT  SET    1
:          JSM    .FFLOAT
:          .BYTE  1
:          .WORD  .C000006
:          .WORD  -.T000005
::         G(2)=FLOAT(323)                                     00011201
:          LDA    #2
:          ASL    A
:          ASL    A
:          CLC
:          ADC    #(G*****01-4) MOD .M
:          STA    .T000005
:          LDA    #0
:          ADC    #(G*****01-4)/256
:          STA    .T000005+1
:.MFFLOAT  SET    1
:          JSM    .FFLOAT
:          .BYTE  1
```

```
:          .WORD  .C000047
:          .WORD  -.T000005
::        G(3)=FLOAT(457)                        00011202
:          LDA    #3
:          ASL    A
:          ASL    A
:          CLC
:          ADC    #(G*****01-4) MOD .M
:          STA    .T000005
:          LDA    #0
:          ADC    #(G*****01-4)/256
:          STA    .T000005+1
:.MFFLOAT  SET    1
:          JSR    .FFLOAT
:          .BYTE  1
:          .WORD  .C000048
:          .WORD  -.T000005
::        G(4)=FLOAT(170)                        00011203
:          LDA    #4
:          ASL    A
:          ASL    A
:          CLC
:          ADC    #(G*****01-4) MOD .M
:          STA    .T000005
:          LDA    #0
:          ADC    #(G*****01-4)/256
:          STA    .T000005+1
:.MFFLOAT  SET    1
:          JSR    .FFLOAT
:          .BYTE  0
:          .WORD  .C000049
:          .WORD  -.T000005
::        G(5)=FLOAT(320)                        00011204
:          LDA    #5
:          ASL    A
:          ASL    A
:          CLC
:          ADC    #(G*****01-4) MOD .M
:          STA    .T000005
:          LDA    #0
:          ADC    #(G*****01-4)/256
:          STA    .T000005+1
:.MFFLOAT  SET    1
:          JSR    .FFLOAT
:          .BYTE  1
:          .WORD  .C000050
:          .WORD  -.T000005
::        G(6)=FLOAT(100)                        00011205
:          LDA    #6
:          ASL    A
:          ASL    A
:          CLC
:          ADC    #(G*****01-4) MOD .M
:          STA    .T000005
:          LDA    #0
:          ADC    #(G*****01-4)/256
:          STA    .T000005+1
:.MFFLOAT  SET    1
:          JSR    .FFLOAT
:          .BYTE  0
:          .WORD  .C000032
:          .WORD  -.T000005
::        G(7)=FLOAT(241)                        00011206
:          LDA    #7
:          ASL    A
:          ASL    A
:          CLC
:          ADC    #(G*****01-4) MOD .M
:          STA    .T000005
:          LDA    #0
:          ADC    #(G*****01-4)/256
:          STA    .T000005+1
:.MFFLOAT  SET    1
:          JSR    .FFLOAT
:          .BYTE  1
:          .WORD  .C000051
:          .WORD  -.T000005
::        G(8)=FLOAT(510)                        00011207
:          LDA    #8
:          ASL    A
:          ASL    A
:          CLC
:          ADC    #(G*****01-4) MOD .M
:          STA    .T000005
:          LDA    #0
:          ADC    #(G*****01-4)/256
:          STA    .T000005+1
:.MFFLOAT  SET    1
```

```
:            JSR    .FFLOAT
:            .BYTE  1
:            .WORD  .C000052
:            .WORD  -.T000005
::           G(9)=FLOAT(236)                          00011208
:            LDA    #9
:            ASL    A
:            ASL    A
:            CLC
:            ADC    #(G^^^^^01-4) MOD .M
:            STA    .T000005
:            LDA    #0
:            ADC    #(G^^^^^01-4)/256
:            STA    .T000005+1
:.MFFLOAT    SET    1
:            JSR    .FFLOAT
:            .BYTE  0
:            .WORD  .C000053
:            .WORD  -.T000005
::           G(10)=FLOAT(1487)                        00011209
:            LDA    #10
:            ASL    A
:            ASL    A
:            CLC
:            ADC    #(G^^^^^01-4) MOD .M
:            STA    .T000005
:            LDA    #0
:            ADC    #(G^^^^^01-4)/256
:            STA    .T000005+1
:.MFFLOAT    SET    1
:            JSR    .FFLOAT
:            .BYTE  1
:            .WORD  .C000054
:            .WORD  -.T000005
::           G(11)=FLOAT(1035)                        00011210
:            LDA    #11
:            ASL    A
:            ASL    A
:            CLC
:            ADC    #(G^^^^^01-4) MOD .M
:            STA    .T000005
:            LDA    #0
:            ADC    #(G^^^^^01-4)/256
:            STA    .T000005+1
:.MFFLOAT    SET    1
:            JSR    .FFLOAT
:            .BYTE  1
:            .WORD  .C000055
:            .WORD  -.T000005
::           G(12)=FLOAT(153)                         00011211
:            LDA    #12
:            ASL    A
:            ASL    A
:            CLC
:            ADC    #(G^^^^^01-4) MOD .M
:            STA    .T000005
:            LDA    #0
:            ADC    #(G^^^^^01-4)/256
:            STA    .T000005+1
:.MFFLOAT    SET    1
:            JSR    .FFLOAT
:            .BYTE  0
:            .WORD  .C000056
:            .WORD  -.T000005
::           G(13)=FLOAT(316)                         00011212
:            LDA    #13
:            ASL    A
:            ASL    A
:            CLC
:            ADC    #(G^^^^^01-4) MOD .M
:            STA    .T000005
:            LDA    #0
:            ADC    #(G^^^^^01-4)/256
:            STA    .T000005+1
:.MFFLOAT    SET    1
:            JSR    .FFLOAT
:            .BYTE  1
:            .WORD  .C000057
:            .WORD  -.T000005
::           REAL*8 NMU(13)                           00011300
:                                                     00011301
:.MFFLOAT    SET    1
:            JSR    .FFLOAT
:            .BYTE  0
:            .WORD  .C000032
:            .WORD  .T000059
:.MFFLOAT    SET    1
:            JSR    .FFLOAT
```

```
:            .BYTE  1
:            .WORD  .C000058
:            .WORD  .T000004
:            LDA    #1
:            ASL    A
:            ASL    A
:            CLC
:            ADC    #(RMU***01-4) MOD .M
:            STA    .T000061
:            LDA    #0
:            ADC    #(RMU***01-4)/256
:            STA    .T000061+1
:.MFFDIV     SET    1
:            JSR    .FFDIV
:            .BYTE  0
:            .WORD  .T000004,.T000059
:            .WORD  -.T000061                                        00011302
:
:.MFFLOAT    SET    1
:            JSR    .FFLOAT
:            .BYTE  0
:            .WORD  .C000032
:            .WORD  .T000059
:.MFFLOAT    SET    1
:            JSR    .FFLOAT
:            .BYTE  1
:            .WORD  .C000062
:            .WORD  .T000004
:            LDA    #2
:            ASL    A
:            ASL    A
:            CLC
:            ADC    #(RMU***01-4) MOD .M
:            STA    .T000061
:            LDA    #0
:            ADC    #(RMU***01-4)/256
:            STA    .T000061+1
:.MFFDIV     SET    1
:            JSR    .FFDIV
:            .BYTE  0
:            .WORD  .T000004,.T000059
:            .WORD  -.T000061
::                                                                   00011303
:.MFFLOAT    SET    1
:            JSR    .FFLOAT
:            .BYTE  0
:            .WORD  .C000032
:            .WORD  .T000059
:.MFFLOAT    SET    1
:            JSR    .FFLOAT
:            .BYTE  1
:            .WORD  .C000063
:            .WORD  .T000004
:            LDA    #3
:            ASL    A
:            ASL    A
:            CLC
:            ADC    #(RMU***01-4) MOD .M
:            STA    .T000061
:            LDA    #0
:            ADC    #(RMU***01-4)/256
:            STA    .T000061+1
:.MFFDIV     SET    1
:            JSR    .FFDIV
:            .BYTE  0
:            .WORD  .T000004,.T000059
:            .WORD  -.T000061
::                                                                   00011304
:.MFFLOAT    SET    1
:            JSR    .FFLOAT
:            .BYTE  0
:            .WORD  .C000032
:            .WORD  .T000059
:.MFFLOAT    SET    1
:            JSR    .FFLOAT
:            .BYTE  1
:            .WORD  .C000064
:            .WORD  .T000004
:            LDA    #4
:            ASL    A
:            ASL    A
:            CLC
:            ADC    #(RMU***01-4) MOD .M
:            STA    .T000061
:            LDA    #0
:            ADC    #(RMU***01-4)/256
:            STA    .T000061+1
```

```
;.MFFDIV   SET   1
;          JSR   .FFDIV
;          .BYTE 0
;          .WORD .T000004,.T000059
;          .WORD -.T000001
;;                                                          00011305
;.MFFLOAT  SET   1
;          JSR   .FFLOAT
;          .BYTE 0
;          .WORD .C000032
;          .WORD .T000059
;.MFFLOAT  SET   1
;          JSR   .FFLOAT
;          .BYTE 0
;          .WORD .C000005
;          .WORD .T000064
;          LDA   #5
;          ASL   A
;          ASL   A
;          CLC
;          ADC   #(MMI***01-0) MOD .M
;          STA   .T000001
;          LDA   #0
;          ADC   #(MMI***01-0)/256
;          STA   .T000001+1
;.MFFDIV   SET   1
;          JSR   .FFDIV
;          .BYTE 0
;          .WORD .T000004,.T000059
;          .WORD -.T000001
;;                                                          00011306
;.MFFLOAT  SET   1
;          JSR   .FFLOAT
;          .BYTE 0
;          .WORD .C000032
;          .WORD .T000059
;.MFFLOAT  SET   1
;          JSR   .FFLOAT
;          .BYTE 1
;          .WORD .C000006
;          .WORD .T000004
;          LDA   #6
;          ASL   A
;          ASL   A
;          CLC
;          ADC   #(MMU***01-0) MOD .M
;          STA   .T000001
;          LDA   #0
;          ADC   #(MMU***01-0)/256
;          STA   .T000001+1
;.MFFDIV   SET   1
;          JSR   .FFDIV
;          .BYTE 0
;          .WORD .T000004,.T000059
;          .WORD -.T000001
;;                                                          00011307
;.MFFLOAT  SET   1
;          JSR   .FFLOAT
;          .BYTE 0
;          .WORD .C000032
;          .WORD .T000059
;.MFFLOAT  SET   1
;          JSR   .FFLOAT
;          .BYTE 1
;          .WORD .C000007
;          .WORD .T000004
;          LDA   #7
;          ASL   A
;          ASL   A
;          CLC
;          ADC   #(MMU***01-0) MOD .M
;          STA   .T000001
;          LDA   #0
;          ADC   #(MM0***01-0)/256
;          STA   .T000001+1
;.MFFDIV   SET   1
;          JSR   .FFDIV
;          .BYTE 0
;          .WORD .T000004,.T000059
;          .WORD -.T000001
;;                                                          00011308
;.MFFLOAT  SET   1
;          JSR   .FFLOAT
;          .BYTE 0
;          .WORD .C000032
;          .WORD .T000059
;.MFFLOAT  SET   1
```

```
;          JSR    .FFLOAT
;          .BYTE  1
;          .WORD  .C000068
;          .WORD  .T000004
;          LDA    #8
;          ASL    A
;          ASL    A
;          CLC
;          ADC    #(HHU***01-4) MOD .M
;          STA    .T000061
;          LDA    #0
;          ADC    #(HHU***01-4)/256
;          STA    .T000061+1
;.MFFDIV   SET    1
;          JSR    .FFDIV
;          .BYTE  0
;          .WORD  .T000004,.T000059
;          .WORD  -.T000061
;;                                                    00011309
;.MFFLOAT  SET    1
;          JSR    .FFLOAT
;          .BYTE  0
;          .WORD  .C000032
;          .WORD  .T000059
;.MFFLOAT  SET    1
;          JSR    .FFLOAT
;          .BYTE  1
;          .WORD  .C000069
;          .WORD  .T000004
;          LDA    #9
;          ASL    A
;          ASL    A
;          CLC
;          ADC    #(HHU***01-4) MOD .M
;          STA    .T000061
;          LDA    #0
;          ADC    #(HHU***01-4)/256
;          STA    .T000061+1
;.MFFDIV   SET    1
;          JSR    .FFDIV
;          .BYTE  0
;          .WORD  .T000004,.T000059
;          .WORD  -.T000061
;;                                                    00011310
;.MFFLOAT  SET    1
;          JSR    .FFLOAT
;          .BYTE  0
;          .WORD  .C000032
;          .WORD  .T000059
;.MFFLOAT  SET    1
;          JSR    .FFLOAT
;          .BYTE  1
;          .WORD  .C000070
;          .WORD  .T000004
;          LDA    #10
;          ASL    A
;          ASL    A
;          CLC
;          ADC    #(HHU***01-4) MOD .M
;          STA    .T000061
;          LDA    #0
;          ADC    #(HHU***01-4)/256
;          STA    .T000061+1
;.MFFDIV   SET    1
;          JSR    .FFDIV
;          .BYTE  0
;          .WORD  .T000004,.T000059
;          .WORD  -.T000061                          00011311
;;
;.MFFLOAT  SET    1
;          JSR    .FFLOAT
;          .BYTE  0
;          .WORD  .C000032
;          .WORD  .T000059
;.MFFLOAT  SET    1
;          JSR    .FFLOAT
;          .BYTE  1
;          .WORD  .C000071
;          .WORD  .T000004
;          LDA    #11
;          ASL    A
;          ASL    A
;          CLC
;          ADC    #(HHU***01-4) MOD .M
;          STA    .T000061
;          LDA    #0
;          ADC    #(HHU***01-4)/256
;          STA    .T000061+1
```

```
:.MFFDIV  SET   1
:         JSM   .FFDIV
:         .BYTE 0
:         .WORD .T000004,.T000059
:         .WORD -.T000061
::                                                          00011312
:.MFFLOAT SET   1
:         JSM   .FFLOAT
:         .BYTE 0
:         .WORD .C000032
:         .WORD .T000059
:.MFFLOAT SET   1
:         JSM   .FFLOAT
:         .BYTE 0
:         .WORD .C000072
:         .WORD .T000004
:         LDA   012
:         ASL   A
:         ASL   A
:         CLC
:         ADC   0(NND***01-0) MOD .M
:         STA   .T000061
:         LDA   00
:         ADC   0(NND***01-0)/256
:         STA   .T000061+1
:.MFFDIV  SET   1
:         JSM   .FFDIV
:         .BYTE 0
:         .WORD .T000004,.T000059
:         .WORD -.T000061
::                                                          00011313
:: C      READ THREE 80 COLUMN HEADING CARDS                00011500
:.MFFLOAT SET   1
:         JSM   .FFLOAT
:         .BYTE 0
:         .WORD .C000032
:         .WORD .T000059
:.MFFLOAT SET   1
:         JSM   .FFLOAT
:         .BYTE 1
:         .WORD .C000073
:         .WORD .T000004
:         LDA   013
:         ASL   A
:         ASL   A
:         CLC
:         ADC   0(NND***01-0) MOD .M
:         STA   .T000061
:         LDA   00
:         ADC   0(NND***01-0)/256
:         STA   .T000061+1
:.MFFDIV  SET   1
:         JSM   .FFDIV
:         .BYTE 0
:         .WORD .T000004,.T000059
:         .WORD -.T000061
::        1 CALL NAME(0D,3,0)                               00011600
:.L000074 .EQU  0
:         LDA   0.C000003 MOD .M
:         STA   NAME.003
:         LDA   0.C000003/256
:         STA   NAME.003+1
:         LDA   0.C000007 MOD .M
:         STA   NAME.002
:         LDA   0.C000007/256
:         STA   NAME.002+1
:         LDA   0AD****01 MOD .M
:         STA   NAME.001
:         LDA   0AD****01/256
:         STA   NAME.001+1
:         JSM   NAME
:: C      READ GENERAL PARAMETER CARD.                      00011700
::        CALL READ(5,3,TGHAD,FGHAD,CD,KL10,NHOL10,TOL,WT,T0,IST,NBUG,NSG00011800
:         LDA   0NSG***01 MOD .M
:         STA   READ.013
:         LDA   0NSG***01/256
:         STA   READ.013+1
:         LDA   0NBUG**01 MOD .M
:         STA   READ.012
:         LDA   0NBUG**01/256
:         STA   READ.012+1
:         LDA   0IST***01 MOD .M
:         STA   READ.011
:         LDA   0IST***01/256
:         STA   READ.011+1
:         LDA   0T0****01 MOD .M
:         STA   READ.010
:         LDA   0T0****01/256
```

```
:          STA   READ.010+1
:          LDA   @RT^^^^01 MOD .M
:          STA   READ.009
:          LDA   @RT^^^^01/256
:          STA   READ.009+1
:          LDA   @TOL^^^01 MOD .M
:          STA   READ.008
:          LDA   @TOL^^^01/256
:          STA   READ.008+1
:          LDA   @WMHL1U01 MOD .M
:          STA   READ.007
:          LDA   @WMHL1U01/256
:          STA   READ.007+1
:          LDA   @KLIG^^01 MOD .M
:          STA   READ.006
:          LDA   @KLIU^^01/256
:          STA   READ.006+1
:          LDA   @CU^^^^01 MOD .M
:          STA   READ.005
:          LDA   @CU^^^^01/256
:          STA   READ.005+1
:          LDA   @FGRAD^01 MOD .M
:          STA   READ.004
:          LDA   @FGRAD^01/256
:          STA   READ.004+1
:          LDA   @TGRAD^01 MOD .M
:          STA   READ.003
:          LDA   @TGRAD^01/256
:          STA   READ.003+1
:          LDA   @.C000007 MOD .M
:          STA   READ.002
:          LDA   @.C000007/256
:          STA   READ.002+1
:          LDA   @.C000009 MOD .M
:          STA   READ.001
:          LDA   @.C000009/256
:          STA   READ.001+1
:          JSM   READ
:: C    5 FORMAT(4F7.0,2I3   )                                    00011900
:: C      READ RM,GM DEFAULT CARD                                 00012000
::        CALL READ (5,4,RMDEF,GMDEF)                             00012100
:          LDA   @GMDEF^01 MOD .M
:          STA   READ.004
:          LDA   @GMDEF^01/256
:          STA   READ.004+1
:          LDA   @RMDEF^01 MOD .M
:          STA   READ.003
:          LDA   @RMDEF^01/256
:          STA   READ.003+1
:          LDA   @.C000008 MOD .M
:          STA   READ.002
:          LDA   @.C000006/256
:          STA   READ.002+1
:          LDA   @.C000009 MOD .M
:          STA   READ.001
:          LDA   @.C000009/256
:          STA   READ.001+1
:          JSM   READ
:: C    4 FORMAT (2F10.0)                                         00012200
:: C      DEFAULTS.                                               00012300
::                                                                00012400
:.MFFLOAT SET    1
:          JSM   .FFLOAT
:          .BYTE 0
:          .WORD .C000003
:          .WORD .T000004
:.MFFLE    SET   1
:          JSM   .FFLE
:          .BYTE 0
:          .WORD RMDEF^01,.T000004
:          ASL   A
:          BCS   *+5
:          JMP   .L000075
:.MFFLOAT SET    1
:          JSM   .FFLOAT
:          .BYTE 1
:          .WORD .C000076
:          .WORD RMDEF^01
:.L000075 EQU    *
::                                                                00012500
:.MFFLOAT SET    1
:          JSM   .FFLOAT
:          .BYTE 0
:          .WORD .C000003
:          .WORD .T000004
:.MFFLE    SET   1
:          JSM   .FFLE
:          .BYTE 0
```

```
:               .WORD GPDEF°01,.T000004
:               ASL   A
:               BCS   *+5
:               JMP   .L000077
:.MFFLOAT       SET   1
:               JSR   .FFLOAT
:               .BYTE 1
:               .WORD .C00007A
:               .WORD GMDEF°01
:.L000077       EQU   *
::                                                    00012600
:               LDA   #0
:               CMP   MSG°°°01+1
:               LDA   #0
:               SBC   MSG°°°01
:               BMI   .L000079
:               LDA   #0
:               STA   MSG°°°01
:               LDA   #18
:               STA   MSG°°°01+1
:.L000079       EQU   *
::                                                    00012700
:.MFFLOAT       SET   1
:               JSR   .FFLOAT
:               .BYTE 0
:               .WORD .L000003
:               .WORD SLMIC°01
::                                                    00012800
:.MFFLOAT       SET   1
:               JSR   .FFLOAT
:               .BYTE 0
:               .WORD .C000003
:               .WORD .T000004
:.MFFLE         SET   1
:               JSR   .FFLE
:               .BYTE 0
:               .WORD TST°°°01,.T000004
:               ASL   A
:               BCS   *+5
:               JMP   .L000081
:.MFFLOAT       SET   1
:               JSR   .FFLOAT
:               .BYTE 0
:               .WORD .C000007
:               .WA   TST°°°01
:.L000081       EQU   *
::
:.MFFLOAT       SET   1                               00012900
:               JSR   .FFLOAT
:               .BYTE 0
:               .WORD .C000003
:               .WORD .T000004
:.MFFLE         SET   1
:               JSR   .FFLE
:               .BYTE 0
:               .WORD TGRAD°01,.T000004
:               ASL   A
:               BCS   *+5
:               JMP   .L000082
:.MFFLOAT       SET   1
:               JSR   .FFLOAT
:               .BYTE 0
:               .WORD .C000014
:               .WORD TGRAD°01
:.L000082       EQU
::
:.MFFLOAT       SET   1                               0001300
:               JSR   .FFLOAT
:               .BYTE 0
:               .WORD .C000003
:               .WORD .T000004
:.MFFLE         SET   1
:               JSR   .FFLE
:               .BYTE 0
:               .WORD FGRAD°01,.T000004
:               ASL   A
:               BCS   *+5
:               JMP   .L000083
:.MFFLOAT       SET   1
:               JSR   .FFLOAT
:               .BYTE 1
:               .WORD .C000085
:               .WORD .T000059
:.MFFLOAT       SET   1
:               JSR   .FFLOAT
:               .BYTE 1
:               .WORD .C000086
:               .WORD .T000004
```

```
;.MFFDIV  SET    1
;         JSR    .FFDIV
;         .BYTE 0
;         .WORD .T000004,.T000059
;         .WORD FGRAD^01
;.L000083 EQU    *
;
;.MFFLOAT SET    1
;.MFFLOAT SET    1
;         JSR    .FFLOAT
;         .BYTE 0
;         .WORD .C000003
;         .WORD .T000004
;.MFFLE   SET    1
;         JSR    .FFLE
;         .BYTE 0
;         .WORD CO^^^^01,.T000004
;         ASL    A
;         BCS    *+5
;         JMP    .L000086
;.MFFLOAT SET    1
;         JSR    .FFLOAT
;         .BYTE 1
;         .WORD .C000085
;         .WORD .T000059
;.MFFLOAT SET    1
;         JSR    .FFLOAT
;         .BYTE 0
;         .WORD .C000087
;         .WORD .T000004
;.MFFDIV  SET 1
;         JSR    .FFDIV
;         .BYTE 0
;         .WORD .T000004,.T000059
;         .WORD CO^^^^01
;.L000086 EQU    *
;;                                                              00013200
;.MFFLOAT SET    1
;         JSR    .FFLOAT
;         .BYTE 0
;         .WORD .C000003
;         .WORD .T000004
;.MFFLE   SET    1
;         JSR    .FFLE
;         .BYTE 0
;         .WORD KLIQ^^01,.T000004
;         ASL    A
;         BCS    *+5
;         JMP    .L000088
;.MFFLOAT SET    1
;         JSR    .FFLOAT
;         .BYTE 0
;         .WORD .C000017
;         .WORD KLIQ^^01
;.L000088 EQU    *
;;                                                              00013300
;.MFFLOAT SET    1
;         JSR    .FFLOAT
;         .BYTE 0
;         .WORD .C000005
;         .WORD .T000004
;.MFFLE   SET    1
;         JSR    .FFLE
;         .BYTE 0
;         .WORD MMUL1001,.T000004
;         ASL    A
;         BCS    *+5
;         JMP    .L000089
;.MFFLOAT SET    1
;         JSR    .FFLOAT
;         .BYTE 0
;         .WORD .C000032
;         .WORD .T000059
;.MFFLOAT SET    1
;         JSR    .FFLOAT
;         .BYTE 0
;         .WORD .C000090
;         .WORD .T000004
;.MFFDIV  SET    1
;         JSR    .FFDIV
;         .BYTE 0
;         .WORD .T000004,.T000059
;         .WORD RMUL1001
;.L000089 EQU    *
;;                                                              00013400
;.MFFLOAT SET    1
;         JSR    .FFLOAT
;         .BYTE 0
```

```
:           .WORD  .C000005
:           .WORD  .T000004
:.MFFLE     SET    1
:           JSR    .FFLE
:           .BYTE  0
:           .WORD  TUL***01,.T000004
:           ASL    A
:           BCS    *+5
:           JMP    .L000091
:.MFFLOAT   SET    1
:           JSR    .FFLOAT
:           .BYTE  1
:           .WORD  .C0000A5
:           .WORD  .T000059
:.MFFLOAT   SET    1
:           JSR    .FFLOAT
:           .BYTE  0
:           .WORD  .C000009
:           .WORD  .T000004
:.MFFDIV    SET    1
:           JSR    .FFDIV
:           .BYTE  0
:           .WORD  .T000004,.T000059
:           .WORD  TUL***01
:.L000091   EQU    *
::                                                              00013500
:.MFFLOAT   SET    1
:           JSR    .FFLOAT
:           .BYTE  0
:           .WORD  .C000003
:           .WORD  .T000004
:.MFFLE     SET    1
:           JSR    .FFLE
:           .BYTE  0
:           .WORD  WT****01,.T000004
:           ASL    A
:           BCS    *+5
:           JMP    .L000092
:.MFFLOAT   SET    1
:           JSR    .FFLOAT
:           .BYTE  0
:           .WORD  .C000027
:           .WORD  WT****01
:.L000092   EQU    *
::                                                              00013600
:.MFFLOAT   SET    1
:           JSR    .FFLOAT
:           .BYTE  0
:           .WORD  .C000027
:           .WORD  .T000004
:.MFFEQ     SET    1
:           JSR    .FFEQ
:           .BYTE  0
:           .WORD  WT****01,.T000004
:           ASL    A
:           BCS    *+5
:           JMP    .L000093
:           LDA    #.C000009 MOD .M
:           STA    WRITE.02
:           LDA    #.C000009/256
:           STA    WRITE.02+1
:           LDA    #.C000010 MOD .M
:           STA    WRITE.01
:           LDA    #.C000010/256
:           STA    WRITE.01+1
:           JSR    WRITE
:.L000093   EQU    *
:: C    5 FORMAT(/5X,' MFTHANE ,WT=16' /7)                      0001370C
::                                                              00013800
:           LDA    #0
:           CMP    NBUG**01+1
:           LDA    #0
:           SBC    NBUG**01
:           BMI    .L000094
:           LDA    #0
:           STA    NBUG**01
:           LDA    #0
:           STA    NBUG**01+1
:.L000094   EQU    *
::                                                              00013900
:.MFFLOAT   SET    1
:           JSR    .FFLOAT
:           .BYTE  0
:           .WORD  .C000003
:           .WORD  .T000004
:.MFFLE     SET    1
:           JSR    .FFLE
:           .BYTE  0
```

```
:         .WORD TG****01,.T000004
:         ASL   A
:         BCS   *+5
:         JMP   .L000096
:.MFFLOAT SET   1
:         JSR   .FFLOAT
:         .BYTE 0
:         .WORD .C000097
:         .WORD T0****01
:.L000096 EQU   *
::       CALL WRITE(6,10,TGRAD,FGRAD,KLIQ,RHOLIQ,TOL,WT,WBUG,T0,CU)      00014000
:         LDA   #CU****01 MOD .M
:         STA   WRITE.11
:         LDA   #CU****01/256
:         STA   WRITE.11+1
:         LDA   #T0****01 MOD .M
:         STA   WRITE.10
:         LDA   #T0****01/256
:         STA   WRITE.10+1
:         LDA   #WBUG**01 MOD .M
:         STA   WRITE.09
:         LDA   #WBUG**01/256
:         STA   WRITE.09+1
:         LDA   #WT****01 MOD .M
:         STA   WRITE.08
:         LDA   #WT****01/256
:         STA   WRITE.08+1
:         LDA   #TOL***01 MOD .M
:         STA   WRITE.07
:         LDA   #TOL***01/256
:         STA   WRITE.07+1
:         LDA   #RHOLIQ01 MOD .M
:         STA   WRITE.06
:         LDA   #RHOLIQ01/256
:         STA   WRITE.06+1
:         LDA   #KLIQ**01 MOD .M
:         STA   WRITE.05
:         LDA   #KLIQ**01/256
:         STA   WRITE.05+1
:         LDA   #FGRAD*01 MOD .M
:         STA   WRITE.04
:         LDA   #FGRAD*01/256
:         STA   WRITE.04+1
:         LDA   #TGRAD*01 MOD .M
:         STA   WRITE.03
:         LDA   #TGRAD*01/256
:         STA   WRITE.03+1
:         LDA   #.C000012 MOD .M
:         STA   WRITE.02
:         LDA   #.C000012/256
:         STA   WRITE.02+1
:         LDA   #.C000010 MOD .M
:         STA   WRITE.01
:         LDA   #.C000010/256
:         STA   WRITE.01+1
:         JSR   WRITE
:: C  10 FORMAT(/5X,' PARAMETERS:  '/5X,' TGRAD(DEG.F/KILOFT)=',F 10.3,'00014100
:: C     * FGRAD(RPSI/KILOFT-FLUID GRADIENT)=',F10.4,' KLIQ(KB)=BRINE MOD00014200
:: C     *,F10.3,/5X,'LIQUID DENSITY=',F10.5,' TOL=  ',F10.6,' WT= GAS MOD00014300
:: C     *,WT=',F10.3,'  WBUG(DEBUG FLAG)=',I5,' T0(DEG.F)=',F7.2,' CU=',00014400
:: C     */,4  //)                                                        00014500
::       NUMS=0                                                          00014600
:: C     READ INPU, CARDS                                                00014700
:         LDA   #0
:         STA   NUMS**01
:         LDA   #0
:         STA   NUMS**01+1
::       DO 50 J=1,200                                                   00014800
:         LDA   #0
:         STA   J*****01
:         LDA   #1
:         STA   J*****01+1
:         JMP   .L000101
:.L000098 EQU   *
:         LDA   J*****01+1
:         CLC
:         ADC   #1
:         STA   J*****01+1
:         LDA   J*****01
:         ADC   #0
:         STA   J*****01
:         LDA   #200
:         CMP   J*****01+1
:         LDA   #0
:         SBC   J*****01
:         BMI   .L000099
:.L000101 EQU   *
::       CALL READ(5,20 V,BLK,PORDS,DEP,T,MIN,SONIC,SWP,CL)              00014900
```

```
:           LDA   #CL****01 MOD .M
:           STA   HEAD.011
:           LDA   #CL****01/256
:           STA   HEAD.011+1
:           LDA   #SMP***01 MOD .M
:           STA   HEAD.010
:           LDA   #SMP***01/256
:           STA   HEAD.010+1
:           LDA   #SONIC*01 MOD .M
:           STA   HEAD.009
:           LDA   #SONIC*01/256
:           STA   HEAD.009+1
:           LDA   #MIN***01 MOD .M
:           STA   HEAD.008
:           LDA   #MIN***01/256
:           STA   HEAD.008+1
:           LDA   #T*****01 MOD .M
:           STA   HEAD.007
:           LDA   #T*****01/256
:           STA   HEAD.007+1
:           LDA   #DEP***01 MOD .M
:           STA   HEAD.006
:           LDA   #DEP***01/256
:           STA   HEAD.006+1
:           LDA   #PURUS*01 MOD .M
:           STA   HEAD.005
:           LDA   #PURUS*01/256
:           STA   HEAD.005+1
:           LDA   #MLA***01 MOD .M
:           STA   HEAD.004
:           LDA   #MLA***01/256
:           STA   HEAD.004+1
:           LDA   #V*****01 MOD .M
:           STA   HEAD.003
:           LDA   #V*****01/256
:           STA   HEAD.003+1
:           LDA   #.C000016 MOD .M
:           STA   HEAD.002
:           LDA   #.C000016/256
:           STA   HEAD.002+1
:           LDA   #.C000009 MOD .M
:           STA   HEAD.001
:           LDA   #.C000009/256
:           STA   HEAD.001+1
:           JSR   HEAD
::                                                    00015000
:.MFFLOAT   SET   1
:           JSR   .FFLOAT
:           .BYTE 0
:           .WORD .C000005
:           .WORD .T000006
:.MFFLOAT   SET   1
:           JSR   .FFLOAT
:           .BYTE 0
:           .WORD .C000003
:           .WORD .T000059
:.MFFEQ     SET   1
:           JSR   .FFEQ
:           .BYTE 0
:           .WORD BLA***01,.T000059
:           STA   .T000060
:.MFFEQ     SET   1
:           JSR   .FFEQ
:           .BYTE 0
:           .WORD V*****01,.T000004
:           ORA   .T000060
:           ASL   A
:           BCS   *+5
:           JMP   .L000105
:           JMP   .L000106
:.L000105   EQU   *
:: C        EAU FLAG CARD                             00015100
::          SONIA=SONIC                               00015200
:.MFLTASG   SET   1
:           JSR   .FLTASGN
:           .BYTE 0
:           .WORD SONIC*01
:           .WORD SONIA*01
::                                                    00015300
:.MFFLOAT   SET   1
:           JSR   .FFLOAT
:           .BYTE 0
:           .WORD .C000003
:           .WORD .T000004
:.MFFNE     SET   1
:           JSR   .FFNE
:           .BYTE 0
:           .WORD SONIA*01,.T000004
```

```
:          ASL    A
:          BCS    *+5
:          JMP    .L000107
:.MFFLOAT  SET    1
:          JSR    .FFLOAT
:          .BYTE  1
:          .WORD  .C000085
:          .WORD  .T000059
:.MFFLOAT  SET    1
:          JSR    .FFLOAT
:          .BYTE  1
:          .WORD  .C000085
:          .WORD  .T000004
:: C     CONVERT DELTA T (SONIC LOG MICSEC/FT) TO FT/SEC.                00015400
:: C  20 FORMAT(5F10.0,I5,F10.0,5X,A8,A2)                                00015500
:.MFFMUL   SET    1
:          JSR    .FFMUL
:          .BYTE  0
:          .WORD  .T000004,.T000059
:          .WORD  .T000061
:.MFFDIV   SET    1
:          JSR    .FFDIV
:          .BYTE  0
:          .WORD  .T000061,V*****01
:          .WORD  V*****01
:.L000107  EQU    *                                                      00015600
::
:          LDA    J*****01+1
:          ASL    A
:          ASL    A
:          CLC
:          ADC    #(VP****01-4) MOD .M
:          STA    .T000005
:          LDA    #0
:          ADC    #(VP****01-4)/256
:          STA    .T000005+1
:.MFLTASG  SET    1
:          JSR    .FLTASGN
:          .BYTE  0
:          .WORD  V*****01
:          .WORD  -.T000005
::                                                                       00015700
:          LDA    J*****01+1
:          ASL    A
:          ASL    A
:          CLC
:          ADC    #(BULKD*01-4) MOD .M
:          STA    .T000005
:          LDA    #0
:          ADC    #(BULKD*01-4)/256
:          STA    .T000005+1
:.MFLTASG  SET    1
:          JSR    .FLTASGN
:          .BYTE  0
:          .WORD  BLK***01
:          .WORD  -.T000005
::                                                                       00015800
:.MFFLOAT  SET    1
:          JSR    .FFLOAT
:          .BYTE  0
:          .WORD  .C000032
:          .WORD  .T000004
:          LDA    J*****01+1
:          ASL    A
:          ASL    A
:          CLC
:          ADC    #(PUN***01-4) MOD .M
:          STA    .T000060
:          LDA    #0
:          ADC    #(PUN***01-4)/256
:          STA    .T000060+1
:.MFFDIV   SET    1
:          JSR    .FFDIV
:          .BYTE  0
:          .WORD  POWOS*01,.T000004
:          .WORD  -.T000060
::                                                                       00015900
:          LDA    J*****01+1
:          ASL    A
:          ASL    A
:          CLC
:          ADC    #(FTEMP*01-4) MOD .M
:          STA    .T000005
:          LDA    #0
:          ADC    #(FTEMP*01-4)/256
:          STA    .T000005+1
:.MFLTASG  SET    1
:          JSR    .FLTASGN
```

```
:             .BYTE 0
:             .WORD I*****01
:             .WORD -.T000005
:;                                                    00016000
:             LDA   J*****01+1
:             ASL   A
:             STA   .T000004
:             LDA   MIN***01
:             LDX   .T000004
:             STA   MINR**01-2,X
:             LDA   MIN***01+1
:             STA   MINR**01-1,X
:;                                                    00016100
:             LDA   J*****01+1
:             ASL   A
:             ASL   A
:             CLC
:             ADC   #(SAMP**01-4) MOD .M
:             STA   .T000005
:             LDA   #0
:             ADC   #(SAMP**01-4)/256
:             STA   .T000005+1
:.MFLTASG     SET   1
:             JSR   .FLTASGN
:             .BYTE 0
:             .WORD SMP***01
:             .WORD -.T000005
:;                                                    00016200
:             LDA   J*****01+1
:             ASL   A
:             ASL   A
:             CLC
:             ADC   #(COL***01-4) MOD .M
:             STA   .T000005
:             LDA   #0
:             ADC   #(COL***01-4)/256
:             STA   .T000005+1
:.MFLTASG     SET   1
:             JSR   .FLTASGN
:             .BYTE 0
:             .WORD CL****01
:             .WORD -.T000005
:;                                                    00016300
:.MFFLOAT     SET   1
:             JSR   .FFLOAT
:             .BYTE 0
:             .WORD .C000019
:             .WORD .T000004
:.MFFGT       SET   1
:             JSR   .FFGT
:             .BYTE 0
:             .WORD DEP***01,.T000004
:             ASL   A
:             BCS   *+5
:             JMP   .L000108
:.MFFLOAT     SET   1
:             JSR   .FFLOAT
:             .BYTE 1
:             .WORD .C000005
:             .WORD .T000004
:.MFFDIV      SET   1
:             JSR   .FFDIV
:             .BYTE 0
:             .WORD DEP***01,.T000004
:             .WORD DEP***01
:.L000108     EQU   *
:;                                                    00016400
:             LDA   J*****01+1
:             ASL   A
:             ASL   A
:             CLC
:             ADC   #(DEPTH*01-4) MOD .M
:             STA   .T000005
:             LDA   #0
:             ADC   #(DEPTH*01-4)/256
:             STA   .T000005+1
:.MFLTASG     SET   1
:             JSR   .FLTASGN
:             .BYTE 0
:             .WORD DEP***01
:             .WORD -.T000005
:;                                                    00016500
:             LDA   #0
:             CMP   MIN***01+1
:             LDA   #0
:             SBC   MIN***01
:             BMI   .L000109
:             JMP   .L000111
```

```
;.L000109 EQU   *
;; C      READ MINERALS CARD SINCE MIN >0.                                00016600
;; C      CALL READ(5,22)(X(L),L=1,13)                                    00016700
;;        CALL READ(5,22,X(1),X(2),X(3),X(4),X(5),X(6),X(7)               00016800
;;       ,X(8),X(9),X(10),X(11),X(12),X(13) )                             00016900
;               LDA   #15
;               ASL   A
;               ASL   A
;               CLC
;               ADC   #(X*****01-4) MOD .M
;               STA   READ.015
;               LDA   #0
;               ADC   #(X*****01-4)/256
;               STA   READ.015+1
;               LDA   #12
;               ASL   A
;               ASL   A
;               CLC
;               ADC   #(X*****01-4) MOD .M
;               STA   READ.014
;               LDA   #0
;               ADC   #(X*****01-4)/256
;               STA   READ.014+1
;               LDA   #11
;               ASL   A
;               ASL   A
;               CLC
;               ADC   #(X*****01-4) MOD .M
;               STA   READ.013
;               LDA   #0
;               ADC   #(X*****01-4)/256
;               STA   READ.013+1
;               LDA   #10
;               ASL   A
;               ASL   A
;               CLC
;               ADC   #(X*****01-4) MOD .M
;               STA   READ.012
;               LDA   #0
;               ADC   #(X*****01-4)/256
;               STA   READ.012+1
;               LDA   #9
;               ASL   A
;               ASL   A
;               CLC
;               ADC   #(X*****01-4) MOD .M
;               STA   READ.011
;               LDA   #0
;               ADC   #(X*****01-4)/256
;               STA   READ.011+1
;               LDA   #8
;               ASL   A
;               ASL   A
;               CLC
;               ADC   #(X*****01-4) MOD .M
;               STA   READ.010
;               LDA   #0
;               ADC   #(X*****01-4)/256
;               STA   READ.010+1
;               LDA   #7
;               ASL   A
;               ASL   A
;               CLC
;               ADC   #(X*****01-4) MOD .M
;               STA   READ.009
;               LDA   #0
;               ADC   #(X*****01-4)/256
;               STA   READ.009+1
;               LDA   #6
;               ASL   A
;               ASL   A
;               CLC
;               ADC   #(X*****01-4) MOD .M
;               STA   READ.008
;               LDA   #0
;               ADC   #(X*****01-4)/256
;               STA   READ.008+1
;               LDA   #5
;               ASL   A
;               ASL   A
;               CLC
;               ADC   #(X*****01-4) MOD .M
;               STA   READ.007
;               LDA   #0
;               ADC   #(X*****01-4)/256
;               STA   READ.007+1
;               LDA   #4
;               ASL   A
```

```
:          ASL   A
:          CLC
:          ADC   #(X*****01-4) MOD .M
:          STA   HEAD.006
:          LDA   #0
:          ADC   #(X*****01-4)/256
:          STA   HEAD.006+1
:          LDA   #3
:          ASL   A
:          ASL   A
:          CLC
:          ADC   #(X*****01-4) MOD .M
:          STA   HEAD.005
:          LDA   #0
:          ADC   #(X*****01-4)/256
:          STA   HEAD.005+1
:          LDA   #2
:          ASL   A
:          ASL   A
:          CLC
:          ADC   #(X*****01-4) MOD .M
:          STA   HEAD.004
:          LDA   #0
:          ADC   #(X*****01-4)/256
:          STA   HEAD.004+1
:          LDA   #1
:          ASL   A
:          ASL   A
:          CLC
:          ADC   #(X*****01-4) MOD .M
:          STA   HEAD.003
:          LDA   #0
:          ADC   #(X*****01-4)/256
:          STA   HEAD.003+1
:          LDA   #.C000112 MOD .M
:          STA   HEAD.002
:          LDA   #.C000112/256
:          STA   HEAD.002+1
:          LDA   #.C000004 MOD .M
:          STA   HEAD.001
:          LDA   #.C000004/256
:          STA   HEAD.001+1
:          JSR   HEAD
:: C   22 FORMAT(1PF5.0)                                  00017000
::                                                        00017100
:.MFFLOAT SET   1
:          JSR   .FFLOAT
:          .BYTE 0
:          .WORD .C000003
:          .WORD SUP****01
::                                                        00017200
:          LDA   #0
:          STA   L*****01
:          LDA   #1
:          STA   L*****01+1
:          JMP   .L000115
:.L000113 EQU   *
:          LDA   L*****01+1
:          CLC
:          ADC   #1
:          STA   L*****01+1
:          LDA   L*****01
:          ADC   #0
:          STA   L*****01
:.         LDA   #15
:          CMP   L*****01+1
:          LDA   #0
:          SBC   L*****01
:          BMI   .L000114
:.L000115 EQU   *
::                                                        00017300
:.MFFLOAT SET   1
:          JSR   .FFLOAT
:          .BYTE 0
:          .WORD .C000032
:          .WORD .T000008
:          LDA   L*****01+1
:          ASL   A
:          ASL   A
:          CLC
:          ADC   #(X*****01-4) MOD .M
:          STA   .T000059
:          LDA   #0
:          ADC   #(X*****01-4)/256
:          STA   .T000059+1
:          LDA   L*****01+1
:          ASL   A
:          ASL   A
```

```
:            CLC
:            ADC   #(X*****01-4) MOD .M
:            STA   .T000060
:            LDA   #0
:            ADC   #(X*****01-4)/256
:            STA   .T000060+1
:.MFFDIV     SET   1
:            JSR   .FFDIV
:            .BYTE 0
:            .WORD -.T000059,.T000004
:            .WORD -.T000060
::                                                        00017400
:            LDA   L*****01+1
:            ASL   A
:            ASL   A
:            CLC
:            ADC   #(X*****01-4) MOD .M
:            STA   .T000004
:            LDA   #0
:            ADC   #(X*****01-4)/256
:            STA   .T000004+1
:.MFFADD     SET   1
:            JSR   .FFADD
:            .BYTE 0
:            .WORD SUM***01,-.T000004
:            .WORD SUM***01
::      25 CONTINUE                                       00017500
:.L000117    EQU   *
:            JMP   .L000115
:.L000114    EQU   *                                      00017600
::
:.MFFLOAT    SET   1
:            JSR   .FFLOAT
:            .BYTE 0
:            .WORD .C000003
:            .WORD .T000004
:.MFFLE      SET   1
:            JSR   .FFLE
:            .BYTE 0
:            .WORD SUM***01,.T000004
:            ASL   A
:            BCS   *+5
:            JMP   .L000118
:            LDA   #0
:            STA   MIN***01
:            LDA   #0
:            STA   MIN***01+1
:.L000118    EQU   *
::                                                        00017700
:            LDA   #0
:            CMP   MIN***01+1
:            LDA   #0
:            SBC   MIN***01
:            BMI   .L000119
:            JMP   .L000111
:.L000119    EQU   *
::                                                        00017800
:            LDA   #0
:            STA   L*****01
:            LDA   #1
:            STA   L*****01+1
:            JMP   .L000123
:.L000121    EQU   *
:            LDA   L*****01+1
:            CLC
:            ADC   #1
:            STA   L*****01+1
:            LDA   L*****01
:            ADC   #0
:            STA   L*****01
:            LDA   #13
:            CMP   L*****01+1
:            LDA   #0
:            SBC   L*****01
:            BMI   .L000122
:.L000123    EQU   *
::                                                        00017900
:.L000125    EQU   *
:            LDA   L*****01+1
:            ASL   A
:            ASL   A
:            CLC
:            ADC   #(X*****01-4) MOD .M
:            STA   .T000005
:            LDA   #0
```

```
02103 :             ADC     #(X^^^^^01-4)/256
02104 :             STA     .T000005+1
02105 :             LDA     L^^^^^01+1
02106 :             ASL     A
02107 :             ASL     A
02108 :             CLC
02109 :             ADC     #(X^^^^^01-4) MOD .M
02110 :             STA     .T000059
02111 :             LDA     #0
02112 :             ADC     #(X^^^^^01-4)/256
02113 :             STA     .T000059+1
02114 :.MFFDIV      SET     1
02115 :             JSR     .FFDIV
02116 :             .BYTE   0
02117 :             .WORD   -.T000005,SUM^^^01
02118 :             .WORD   -.T000059
02119 :             JMP     .L000121
02120 :.L000122     EQU     *
02121 :;                                                                    00018000
02122 :             LDA     J^^^^^01+1
02123 :             ASL     A
02124 :             ASL     A
02125 :             CLC
02126 :             ADC     #(RNUM^^01-4) MOD .M
02127 :             STA     .T000005
02128 :             LDA     #0
02129 :             ADC     #(RNUM^^01-4)/256
02130 :             STA     .T000005+1
02131 :.MFFLOAT     SET     1
02132 :             JSR     .FFLOAT
02133 :             .BYTE   0
02134 :             .WORD   .C000003
02135 :             .WORD   -.T000005
02136 :;                                                                    00018100
02137 :             LDA     #0
02138 :             STA     L^^^^^01
02139 :             LDA     #1
02140 :             STA     L^^^^^01+1
02141 :             JMP     .L000128
02142 :.L000126     EQU     *
02143 :             LDA     L^^^^^01+1
02144 :             CLC
02145 :             ADC     #1
02146 :             STA     L^^^^^01+1
02147 :             LDA     L^^^^^01
02148 :             ADC     #0
02149 :             STA     L^^^^^01
02150 :             LDA     #13
02151 :             CMP     L^^^^^01+1
02152 :             LDA     #0
02153 :             SBC     L^^^^^01
02154 :             BMI     .L000127
02155 :.L000128     EQU     *
02156 :;                                                                    00018200
02157 :.L000130     EQU     *
02158 :             LDA     L^^^^^01+1
02159 :             ASL     A
02160 :             ASL     A
02161 :             CLC
02162 :             ADC     #(RNUM^^01-4) MOD .M
02163 :             STA     .T000005
02164 :             LDA     #0
02165 :             ADC     #(RNUM^^01-4)/256
02166 :             STA     .T000005+1
02167 :             LDA     L^^^^^01+1
02168 :             ASL     A
02169 :             ASL     A
02170 :             CLC
02171 :             ADC     #(X^^^^^01-4) MOD .M
02172 :             STA     .T000059
02173 :             LDA     #0
02174 :             ADC     #(X^^^^^01-4)/256
02175 :             STA     .T000059+1
02176 :.MFFMUL      SET     1
02177 :             JSR     .FFMUL
02178 :             .BYTE   0
02179 :             .WORD   -.T000059,-.T000005
02180 :             .WORD   .T000004
02181 :             LDA     J^^^^^01+1
02182 :             ASL     A
02183 :             ASL     A
```

```
:           CLC
:           ADC    #(NNUM**01-4) MOD .M
:           STA    .T000059
:           LDA    #0
:           ADC    #(NNUM**01-4)/256
:           STA    .T000059+1
:           LDA    J*****01+1
:           ASL    A
:           ASL    A
:           CLC
:           ADC    #(NNUM**01-4) MOD .M
:           STA    .T000060
:           LDA    #0
:           ADC    #(NNUM**01-4)/256
:           STA    .T000060+1
:.MFFADD    SET    1
:           JSR    .FFADD
:           .BYTE  0
:           .WORD  -.T000059,.T000004
:           .WORD  -.T000060
:           JMP    .L000126
:.L000127   EQU    *
::                                                    00018300
:.MFFLOAT   SET    1
:           JSR    .FFLOAT
:           .BYTE  0
:           .WORD  .C000003
:           .WORD  AV****01
::                                                    00018400
:.MFFLOAT   SET    1
:           JSR    .FFLOAT
:           .BYTE  0
:           .WORD  .C000003
:           .WORD  AW****01
::                                                    00018500
:.MFFLOAT   SET    1
:           JSR    .FFLOAT
:           .BYTE  0
:           .WORD  .C000003
:           .WORD  GV****01
::                                                    00018600
:.MFFLOAT   SET    1
:           JSR    .FFLOAT
:           .BYTE  0
:           .WORD  .C000003
:           .WORD  GW****01
::                                                    00018700
:           LDA    #0
:           STA    L*****01
:           LDA    #1
:           STA    L*****01+1
*           JMP    .L000133
:.L000131   EQU    *
:           LDA    L*****01+1
:           CLC
:           ADC    #1
:           STA    L*****01+1
:           LDA    L*****01
:           ADC    #0
:           STA    L*****01
:           LDA    #13
:           CMP    L*****01+1
:           LDA    #0
:           SBC    L*****01
:           BMI    .L000132
:.L000133   EQU    *
::                                                    00018800
:           LDA    L*****01+1
:           ASL    A
:           ASL    A
:           CLC
:           ADC    #(K*****01-4) MOD .M
:           STA    .T000005
:           LDA    #0
:           ADC    #(K*****01-4)/256
:           STA    .T000005+1
:           LDA    L*****01+1
:           ASL    A
:           ASL    A
:           CLC
:           ADC    #(X*****01-4) MOD .M
:           STA    .T000059
:           LDA    #0
:           ADC    #(X*****01-4)/256
:           STA    .T000059+1
:.MFFMUL    SET    1
:           JSR    .FFMUL
:           .BYTE  0
```

```
02272 :            .WORD -.T000059,-.T000005
02273 :            .WORD .T000004
02274 :.MFFADD     SEI   1
02275 :            JSR   .FFADD
02276 :            .BYTE 0
02277 :            .WORD AV*****01,.T000004
02278 :            .WORD AV*****01
02279 ::                                                                                00018900
02280 :            LDA   L*****01+1
02281 :            ASL   A
02282 :            ASL   A
02283 :            CLC
02284 :            ADC   #(A*****01-4) MOD .M
02285 :            STA   .T000005
02286 :            LDA   #0
02287 :            ADC   #(A*****01-4)/256
02288 :            STA   .T000005+1
02289 :            LDA   L*****01+1
02290 :            ASL   A
02291 :            ASL   A
02292 :            CLC
02293 :            ADC   #(B*****01-4) MOD .M
02294 :            STA   .T000059
02295 :            LDA   #0
02296 :            ADC   #(B*****01-4)/256
02297 :            STA   .T000059+1
02298 :.MFFDIV     SEI   1
02299 :            JSR   .FFDIV
02300 :            .BYTE 0
02301 :            .WORD -.T000059,-.T000005
02302 :            .WORD .T000004
02303 :.MFFADD     SEI   1
02304 :            JSR   .FFADD
02305 :            .BYTE 0
02306 :            .WORD AN*****01,.T000004
02307 :            .WORD AN*****01
02308 ::                                                                                00019000
02309 :            LDA   L*****01+1
02310 :            ASL   A
02311 :            ASL   A
02312 :            CLC
02313 :            ADC   #(G*****01-4) MOD .M
02314 :            STA   .T000005
02315 :            LDA   #0
02316 :            ADC   #(G*****01-4)/256
02317 :            STA   .T000005+1
02318 :            LDA   L*****01+1
02319 :            ASL   A
02320 :            ASL   A
02321 :            CLC
02322 :            ADC   #(R*****01-4) MOD .M
02323 :            STA   .T000059
02324 :            LDA   #0
02325 :            ADC   #(R*****01-4)/256
02326 :            STA   .T000059+1
02327 :.MFFMUL     SEI   1
02328 :            JSR   .FFMUL
02329 :            .BYTE 0
02330 :            .WORD -.T000059,-.T000005
02331 :            .WORD .T000004
02332 :.MFFADD     SEI   1
02333 :            JSR   .FFADD
02334 :            .BYTE 0
02335 :            .WORD GV*****01,.T000004
02336 :            .WORD GV*****01
02337 ::                                                                                00019100
02338 :            LDA   L*****01+1
02339 :            ASL   A
02340 :            ASL   A
02341 :            CLC
02342 :            ADC   #(G*****01-4) MOD .M
02343 :            STA   .T000005
02344 :            LDA   #0
02345 :            ADC   #(G*****01-4)/256
02346 :            STA   .T000005+1
02347 :            LDA   L*****01+1
02348 :            ASL   A
02349 :            ASL   A
02350 :            CLC
02351 :            ADC   #(R*****01-4) MOD .M
02352 :            STA   .T000059
02353 :            LDA   #0
02354 :            ADC   #(R*****01-4)/256
02355 :            STA   .T000059+1
02356 :.MFFDIV     SEI   1
02357 :            JSR   .FFDIV
02358 :            .BYTE 0
02359 :            .WORD -.T000059,-.T000005
02360 :            .WORD .T000004
```

```
:.MFFADD  SET   1
:         JSR   .FFADD
:         .BYTE 0
:         .WORD GR****01,.T000004
:         .WORD GR****01
::   30 CONTINUE                                      00019200
:.L000135 EQU   *
:         JMP   .L000131
:.L000132 EQU   *
::                                                    00019300
:.MFFLOAT SET   1
:         JSR   .FFLOAT
:         .BYTE 0
:         .WORD .C000002
:         .WORD .T000004
:.MFFDIV  SET   1
:         JSR   .FFDIV
:         .BYTE 0
:         .WORD .T000004,GR****01
:         .WORD GR****01
::                                                    00019400
:: C      VRM AVERAGES                                00019500
:.MFFLOAT SET   1
:         JSR   .FFLOAT
:         .BYTE 0
:         .WORD .C000002
:         .WORD .T000004
:.MFFDIV  SET   1
:         JSR   .FFDIV
:         .BYTE 0
:         .WORD .T000004,RR****01
:         .WORD RR****01
::                                                    00019600
:.MFFLOAT SET   1
:         JSR   .FFLOAT
:         .BYTE 0
:         .WORD .C000006
:         .WORD .T000059
:.MFFADD  SET   1
:         JSR   .FFADD
:         .BYTE 0
:         .WORD RV****01,RR****01
:         .WORD .T000004
:         LDA   J*****01+1
:         ASL   A
:         ASL   A
:         CLC
:         ADC   #(RR****01-4) MOD .M
:         STA   .T000061
:         LDA   #0
:         ADC   #(RR****01-4)/256
:         STA   .T000061+1
:.MFFDIV  SET   1
:         JSR   .FFDIV
:         .BYTE 0
:         .WORD .T000004,.T000059
:         .WORD -.T000061
::                                                    00019700
:.MFFLOAT SET   1
:         JSR   .FFLOAT
:         .BYTE 0
:         .WORD .C000006
:         .WORD .T000059
:.MFFADD  SET   1
:         JSR   .FFADD
:         .BYTE 0
:         .WORD GV****01,GR****01
:         .WORD .T000004
:         LDA   J*****01+1
:         ASL   A
:         ASL   A
:         CLC
:         ADC   #(GR****01-4) MOD .M
:         STA   .T000061
:         LDA   #0
:         ADC   #(GR****01-4)/256
:         STA   .T000061+1
:.MFFDIV  SET   1
:         JSR   .FFDIV
:         .BYTE 0
:         .WORD .T000004,.T000059
:         .WORD -.T000061
::       GO TO 40                                     00019800
:         JMP   .L000136
:: C      DEFAULTS:                                   00019900
::                                                    00020000
:.L000111 EQU   *
:         LDA   J*****01+1
:         ASL   A
```

```
:         ASL   A
:         CLC
:         ADC   #(AM****01-4) MOD .M
:         STA   .T000005
:         LDA   #0
:         ADC   #(AM****01-4)/256
:         STA   .T000005+1
:.MFLTASG SET   1
:         JSM   .FLTASGN
:         .BYTE 6
:         .WORD AMDEF*01
:         .WORD -.T000005
::                                                         00020100
:         LDA   J*****01+1
:         ASL   A
:         ASL   A
:         CLC
:         ADC   #(GM****01-4) MOD .M
:         STA   .T000005
:         LDA   #0
:         ADC   #(GM****01-4)/256
:         STA   .T000005+1
:.MFLTASG SET   1
:         JSM   .FLTASGN
:         .BYTE 6
:         .WORD GMDEF*01
:         .WORD -.T000005
::                                                         00020200
:.L000136 EQU   *
:         LDA   J*****01
:         STA   NOBS**01
:         LDA   J*****01+1
:         STA   NOBS**01+1
::    50 CONTINUE                                          00020300
:.L000103 EQU   *
:         JMP   .L000098
:.L000099 EQU   *
::    75 CALL WRITE(6,80,NOBS)                             00020400
:.L000106 EQU   *
:         LDA   #NOBS**01 MOD .M
:         STA   WRITE.03
:         LDA   #NOBS**01/256
:         STA   WRITE.03+1
:         LDA   #.C000028 MOD .M
:         STA   WRITE.02
:         LDA   #.C000028/256
:         STA   WRITE.02+1
:         LDA   #.C000010 MOD .M
:         STA   WRITE.01
:         LDA   #.C000010/256
:         STA   WRITE.01+1
:         JSM   WRITE
:: C  80 FORMAT(/5X,'   NO. OF OBSERVATIONS=',I6 //)      00020500
:: C     MAIN COMPUTE LOOP :                               00020600
::                                                         00020700
:         LDA   #0
:         STA   J*****01
:         LDA   #1
:         STA   J*****01+1
:         JMP   .L000139
:.L000137 EQU   *
:         LDA   J*****01+1
:         CLC
:         ADC   #1
:         STA   J*****01+1
:         LDA   J*****01
:         ADC   #0
:         STA   J*****01
:         LDA   NOBS**01+1
:         CMP   J*****01+1
:         LDA   NOBS**01
:         SBC   J*****01
:         BMI   .L000138
:.L000139 EQU   *
::       CALL WRITE(6,110,J,SAMP(J),COL(J))                00020800
:         LDA   J*****01+1
:         ASL   A
:         ASL   A
:         CLC
:         ADC   #(COL***01-4) MOD .M
:         STA   WRITE.05
:         LDA   #0
:         ADC   #(COL***01-4)/256
:         STA   WRITE.05+1
:         LDA   J*****01+1
:         ASL   A
:         ASL   A
:         CLC
```

```
:           ADC    #(SAMP**01-4) MOD .M
:           STA    WRITE.04
:           LDA    #0
:           ADC    #(SAMP**01-4)/256
:           STA    WRITE.04+1
:           LDA    #J*****01 MOD .M
:           STA    WRITE.03
:           LDA    #J*****01/256
:           STA    WRITE.03+1
:           LDA    #.C000142 MOD .M
:           STA    WRITE.02
:           LDA    #.C000142/256
:           STA    WRITE.02+1
:           LDA    #.C000010 MOD .M
:           STA    WRITE.01
:           LDA    #.C000010/256
:           STA    WRITE.01+1
:           JSR    WRITE
:: C 110 FORMAT(/5X,'        PROBLEM NO. J4',I5,9X,'SAMPLE  NO.#',A8,A2  00020900
::          #INCH(AM(J)                                                  00021000
:           LDA    J*****01+1
:           ASL    A
:           TAX
:           LDA    MINW**01-2,X
:           STA    MIN***01
:           LDA    MINW**01-1,X
:           STA    MIN***01+1
::                                                                       00021100
:.MFFLOAT   SET    1
:           JSR    .FFLOAT
:           .BYTE  0
:           .WORD  .C000032
:           .WORD  .T000004
:           LDA    J*****01+1
:           ASL    A
:           ASL    A
:           CLC
:           ADC    #(PDN***01-4) MOD .M
:           STA    .T000059
:           LDA    #0
:           ADC    #(PDN***01-4)/256
:           STA    .T000059+1
:.MFFMUL    SET    1
:           JSR    .FFMUL
:           .BYTE  0
:           .WORD  -.T000059,.T000004
:           .WORD  PCT***01
::          CALL WRITE(6,113,VP(J),BULKD(J),DEPTH(J),RM(J),GM(J),MIN,PCT,   00021200
::                                                                       00021300
:           LDA    #SONIC*01 MOD .M
:           STA    WRITE.10
:           LDA    #SONIC*01/256
:           STA    WRITE.10+1
:           LDA    #PCT***01 MOD .M
:           STA    WRITE.09
:           LDA    #PCT***01/256
:           STA    WRITE.09+1
:           LDA    #MIN***01 MOD .M
:           STA    WRITE.08
:           LDA    #MIN***01/256
:           STA    WRITE.08+1
:           LDA    J*****01+1
:           ASL    A
:           ASL    A
:           CLC
:           ADC    #(GM****01-4) MOD .M
:           STA    WRITE.07
:           LDA    #0
:           ADC    #(GM****01-4)/256
:           STA    WRITE.07+1
:           LDA    J*****01+1
:           ASL    A
:           ASL    A
:           CLC
:           ADC    #(RM****01-4) MOD .M
:           STA    WRITE.06
:           LDA    #0
:           ADC    #(RM****01-4)/256
:           STA    WRITE.06+1
:           LDA    J*****01+1
:           ASL    A
:           ASL    A
:           CLC
:           ADC    #(DEPTH*01-4) MOD .M
:           STA    WRITE.05
:           LDA    #0
:           ADC    #(DEPTH*01-4)/256
:           STA    WRITE.05+1
```

```
02626 :        LDA     J*****01+1
02627 :        ASL     A
02628 :        ASL     A
02629 :        CLC
02630 :        ADC     #(BULK**01-4) MOD .M
02631 :        STA     WRITE.04
02632 :        LDA     #0
02633 :        ADC     #(BULK**01-4)/256
02634 :        STA     WRITE.04+1
02635 :        LDA     J*****01+1
02636 :        ASL     A
02637 :        ASL     A
02638 :        CLC
02639 :        ADC     #(VP****01-4) MOD .M
02640 :        STA     WRITE.03
02641 :        LDA     #0
02642 :        ADC     #(VP****01-4)/256
02643 :        STA     WRITE.03+1
02644 :        LDA     #.C000145 MOD .M
02645 :        STA     WRITE.02
02646 :        LDA     #.L000145/256
02647 :        STA     WRITE.02+1
02648 :        LDA     #.L000010 MOD .M
02649 :        STA     WRITE.01
02650 :        LDA     #.C000010/256
02651 :        STA     WRITE.01+1
02652 :        JSR     WRITE
02653 :: C 113 FORMAT(/5X,'MARINE SATURATED INPUTS:'/5X,'  VP=',F10.1,' BULK DE00021400
02654 :: C      *ITY=',F10.3,'  DEPTH(RFT)=',F10.2,'  KM=',F6.1,'  GM=',F6.1,   00021500
02655 :: C      *'  MIKE',I3,/5X,'POROSITY(%)=',F6.2,'  SONIC=',F5.1 //)       00021600
02656 :: C      IF(MIN.GT.0)CALL WRITE(6,307)(X(JL),JL=1,13),SAMP(J),COL(J)    00021700
02657 :: C      IF(MIN.GT.0) CALL WRITE(6,307,X(1),X(2),X(3),X(4),X(5))        00021800
02658 :        LDA     #0
02659 :        CMP     MIN***01+1
02660 :        LDA     #0
02661 :        SBC     MIN***01
02662 :        BMI     .L000145
02663 :        JMP     .L000144
02664 :.L000145 EQU    *
02665 ::      *  ,X(6),X(7),X(8),X(9),X(10),X(11),X(12),X(13)                  00021900
02666 ::      *  ,SAMP(J),COL(J) )                                             00022000
02667 :        LDA     J*****01+1
02668 :        ASL     A
02669 :        ASL     A
02670 :        CLC
02671 :        ADC     #(COL***01-4) MOD .M
02672 :        STA     WRITE.17
02673 :        LDA     #0
02674 :        ADC     #(COL***01-4)/256
02675 :        STA     WRITE.17+1
02676 :        LDA     J*****01+1
02677 :        ASL     A
02678 :        ASL     A
02679 :        CLC
02680 :        ADC     #(SAMP**01-4) MOD .M
02681 :        STA     WRITE.16
02682 :        LDA     #0
02683 :        ADC     #(SAMP**01-4)/256
02684 :        STA     WRITE.16+1
02685 :        LDA     #13
02686 :        ASL     A
02687 :        ASL     A
02688 :        CLC
02689 :        ADC     #(X*****01-4) MOD .M
02690 :        STA     WRITE.15
02691 :        LDA     #0
02692 :        ADC     #(X*****01-4)/256
02693 :        STA     WRITE.15+1
02694 :        LDA     #12
02695 :        ASL     A
02696 :        ASL     A
02697 :        CLC
02698 :        ADC     #(X*****01-4) MOD .M
02699 :        STA     WRITE.14
02700 :        LDA     #0
02701 :        ADC     #(X*****01-4)/256
02702 :        STA     WRITE.14+1
02703 :        LDA     #11
02704 :        ASL     A
02705 :        ASL     A
02706 :        CLC
02707 :        ADC     #(X*****01-4) MOD .M
02708 :        STA     WRITE.13
02709 :        LDA     #0
02710 :        ADC     #(X*****01-4)/256
02711 :        STA     WRITE.13+1
02712 :        LDA     #10
02713 :        ASL     A
```

```
         ASL   A
         CLC
         ADC   #(X*****01-4) MOD .M
         STA   WRITE.12
         LDA   #0
         ADC   #(X*****01-4)/256
         STA   WRITE.12+1
         LDA   #9
         ASL   A
         ASL   A
         CLC
         ADC   #(X*****01-4) MOD .M
         STA   WRITE.11
         LDA   #0
         ADC   #(X*****01-4)/256
         STA   WRITE.11+1
         LDA   #8
         ASL   A
         ASL   A
         CLC
         ADC   #(X*****01-4) MOD .M
         STA   WRITE.10
         LDA   #0
         ADC   #(X*****01-4)/256
         STA   WRITE.10+1
         LDA   #7
         ASL   A
         ASL   A
         CLC
         ADC   #(X*****01-4) MOD .M
         STA   WRITE.09
         LDA   #0
         ADC   #(X*****01-4)/256
         STA   WRITE.09+1
         LDA   #6
         ASL   A
         ASL   A
         CLC
         ADC   #(X*****01-4) MOD .M
         STA   WRITE.08
         LDA   #0
         ADC   #(X*****01-4)/256
         STA   WRITE.08+1
         LDA   #5
         ASL   A
         ASL   A
         CLC
         ADC   #(X*****01-4) MOD .M
         STA   WRITE.07
         LDA   #0
         ADC   #(X*****01-4)/256
         STA   WRITE.07+1
         LDA   #4
         ASL   A
         ASL   A
         CLC
         ADC   #(X*****01-4) MOD .M
         STA   WRITE.06
         LDA   #0
         ADC   #(X*****01-4)/256
         STA   WRITE.06+1
         LDA   #3
         ASL   A
         ASL   A
         CLC
         ADC   #(X*****01-4) MOD .M
         STA   WRITE.05
         LDA   #0
         ADC   #(X*****01-4)/256
         STA   WRITE.05+1
         LDA   #2
         ASL   A
         ASL   A
         CLC
         ADC   #(X*****01-4) MOD .M
         STA   WRITE.04
         LDA   #0
         ADC   #(X*****01-4)/256
         STA   WRITE.04+1
         LDA   #1
         ASL   A
         ASL   A
         CLC
         ADC   #(X*****01-4) MOD .M
         STA   WRITE.03
         LDA   #0
         ADC   #(X*****01-4)/256
         STA   WRITE.03+1
```

```
:           LDA   #.L000146 MOD .M
:           STA   WRITE.02
:           LDA   #.L000146/256
:           STA   WRITE.02+1
:           LDA   #.C000010 MOD .M
:           STA   WRITE.01
:           LDA   #.C000010/256
:           STA   WRITE.01+1
:           JSR   WRITE
:.L000146   EQU   *
:: C 307 FORMAT(/5X,' MINERAL CAND X(I),I=1,13 '/5X,13F7.2,10X,A8,A2 //)00022100
:: C     POROSITY=0 ERROR.                                              00022200
::                                                                      00022300
:.MFFLOAT   SET   1
:           JSR   .FFLOAT
:           .BYTE 0
:           .WORD .C000003
:           .WORD .T000004
:.MFFLE     SET   1
:           JSR   .FFLE
:           .BYTE 0
:           .WORD PCT***01,.T000004
:           ASL   A
:           BCS   *+5
:           JMP   .L000147
:           LDA   #.C000148 MOD .M
:           STA   WRITE.02
:           LDA   #.C000148/256
:           STA   WRITE.02+1
:           LDA   #.C000010 MOD .M
:           STA   WRITE.01
:           LDA   #.C000010/256
:           STA   WRITE.01+1
:           JSR   WRITE
:.L000147   EQU   *
:: C 301 FORMAT(/5X,'   POROSITY=0. PROBLEM UNTENABLE' //)                00022400
::                                                                      00022500
:.MFFLOAT   SET   1
:           JSR   .FFLOAT
:           .BYTE 0
:           .WORD .C000003
:           .WORD .T000004
:.MFFLE     SET   1
:           JSR   .FFLE
:           .BYTE 0
:           .WORD PCT***01,.T000004
:           ASL   A
:           BCS   *+5
:           JMP   .L000149
:           JMP   .L000141
:.L000149   EQU   *
::                                                                      00022600
:           LDA   #0
:           CMP   MIN***01+1
:           LDA   #0
:           SBC   MIN***01
:           BMI   .L000150
:           JMP   .L000152
:.L000150   EQU   *
::                                                                      00022700
:.MFFLOAT   SET   1
:           JSR   .FFLOAT
:           .BYTE 0
:           .WORD .C000002
:           .WORD .T000059
:           LDA   J*****01+1
:           ASL   A
:           ASL   A
:           CLC
:           ADC   #(POR***01-4) MOD .M
:           STA   .T000005
:           LDA   #0
:           ADC   #(POR***01-4)/256
:           STA   .T000005+1
:.MFFSUM    SET   1
:           JSR   .FFSUM
:           .BYTE 0
:           .WORD .T000059,-.T000005
:           .WORD .T000061
:           LDA   J*****01+1
:           ASL   A
:           ASL   A
:           CLC
:           ADC   #(WMUM**01-4) MOD .M
:           STA   .T000005
:           LDA   #0
:           ADC   #(WMIN**01-4)/256
:           STA   .T000005+1
```

```
02840 :.MFFMUL  SET     1
02841 :         JSR     .FFMUL
02842 :         .BYTE   0
02843 :         .WORD   .T000001,-.T000005
02844 :         .WORD   .T000059
02845 :         LDA     J*****01+1
02846 :         ASL     A
02847 :         ASL     A
02848 :         CLC
02849 :         ADC     #(POK***01-4) MOD .M
02900 :         STA     .T000060
02901 :         LDA     #0
02902 :         ADC     #(POK***01-4)/256
02903 :         STA     .T000060+1
02904 :.MFFMUL  SET     1
02905 :         JSR     .FFMUL
02906 :         .BYTE   0
02907 :         .WORD   -.T000060,NMULI001
02908 :         .WORD   .T000004
02909 :.MFFADD  SET     1
02910 :         JSR     .FFADD
02911 :         .BYTE   0
02912 :         .WORD   .T000004,.T000059
02913 :         .WORD   NMUAC*01                                    00022800
02914 ::
02915 :         LDA     J*****01+1
02916 :         ASL     A
02917 :         ASL     A
02918 :         CLC
02919 :         ADC     #(BULKD*01-4) MOD .M
02920 :         STA     .T000005
02921 :         LDA     #0
02922 :         ADC     #(BULAD*01-4)/256
02923 :         STA     .T000005+1
02924 :.MFFSUB  SET     1
02925 :         JSR     .FFSUB
02926 :         .BYTE   0
02927 :         .WORD   -.T000005,NMUBC*01
02928 :         .WORD   U*****01                                    00022900
02929 ::
02930 :         LDA     #U*****01 MOD .M
02931 :         STA     ABS.0001
02932 :         LDA     #U*****01/256
02933 :         STA     ABS.0001+1
02934 :         LDA     #.T000004 MOD .M
02935 :         STA     ABS.0000
02936 :         LDA     #.T000004/256
02937 :         STA     ABS.0000+1
02938 :         JSR     ABS
02939 :.MFLTASG SET     1
02940 :         JSR     .FLTASGN
02941 :         .BYTE   0
02942 :         .WORD   .T000004
02943 :         .WORD   U*****01                                    00023000
02944 ::
02945 :.MFFLOAT SET     1
02946 :         JSR     .FFLOAT
02947 :         .BYTE   0
02948 :         .WORD   .C000032
02949 :         .WORD   .T000059
02950 :         LDA     J*****01+1
02951 :         ASL     A
02952 :         ASL     A
02953 :         CLC
02954 :         ADC     #(BULAD*01-4) MOD .M
02955 :         STA     .T000005
02956 :         LDA     #0
02957 :         ADC     #(BULKD*01-4)/256
02958 :         STA     .T000005+1
02959 :.MFFDIV  SET     1
02960 :         JSR     .FFDIV
02961 :         .BYTE   0
02962 :         .WORD   U*****01,-.T000005
02963 :         .WORD   .T000004
02964 :.MFFMUL  SET     1
02965 :         JSR     .FFMUL
02966 :         .BYTE   0
02967 :         .WORD   .T000004,.T000059
02968 :         .WORD   U*****01                                    00023100
02969 ::
02970 :.MFFGT   SET     1
02971 :         JSR     .FFGT
02972 :         .BYTE   0
02973 :         .WORD   U*****01,TST***01
02974 :         ASL     A
02975 :         BCS     *+5
```

```
:               JMP    .L000153
:               LDA    #IST***01 MOD .M
:               STA    WRITE.03
:               LDA    #IST***01/256
:               STA    WRITE.03+1
:               LDA    #.C000154 MOD .M
:               STA    WRITE.02
:               LDA    #.C000154/256
:               STA    WRITE.02+1
:               LDA    #.C000010 MOD .M
:               STA    WRITE.01
:               LDA    #.C000010/256
:               STA    WRITE.01+1
:               JSR    WRITE
:.L000153       EQU    *
:; C 115 FORMAT(/5X,' COMPUTED AND OBSERVED BRINE BULK MODULI DIFFER BY 00023200
:; C     *MORE THAN IST % =',F10.2 //)                                   00023300
:;              GO TO 117                                             00023400
:               JMP    .L000155
:;                                                                    00023500
:.L000152       EQU    *
:               LDA    J*****01+1
:               ASL    A
:               ASL    A
:               CLC
:               ADC    #(BULKO*01-4) MOD .M
:               STA    .T000004
:               LDA    #0
:               ADC    #(BULKO*01-4)/256
:               STA    .T000004+1
:.MFLTASG       SET    1
:               JSR    .FLTASG
:               .BYTE  0
:               .WORD  -.T000004
:               .WORD  RHOBC*01
:;                                                                    00023600
:               LDA    J*****01+1
:               ASL    A
:               ASL    A
:               CLC
:               ADC    #(POR***01-4) MOD .M
:               STA    .T000059
:               LDA    #0
:               ADC    #(POR***01-4)/256
:               STA    .T000059+1
:.MFFMUL        SET    1
:               JSR    .FFMUL
:               .BYTE  0
:               .WORD  -.T000059,RHOLIQ01
:               .WORD  .T000004
:.MFFLOAT       SET    1
:               JSR    .FFLOAT
:               .BYTE  0
:               .WORD  .C000002
:               .WORD  .T000061
:               LDA    J*****01+1
:               ASL    A
:               ASL    A
:               CLC
:               ADC    #(POR***01-4) MOD .M
:               STA    .T000005
:               LDA    #0
:               ADC    #(POR***01-4)/256
:               STA    .T000005+1
:.MFFSUM        SET    1
:               JSR    .FFSUM
:               .BYTE  0
:               .WORD  .T000061,-.T000005
:               .WORD  .T000156
:.MFFSUB        SET    1
:               JSR    .FFSUB
:               .BYTE
:               .WORD  RHOMC*01,.T000004
:               .WORD  .T000059
:               LDA    J*****01+1
:               ASL    A
:               ASL    A
:               CLC
:               ADC    #(RHOMA**01-4) MOD .M
:               STA    .T000060
```

```
:              LDA    #0
:              ADC    #(MMU"""01-4)/256
:              STA    .T000060+1
:.MFFDIV       SET    1
:              JSR    .FFDIV
:              .BYTE  0
:              .WORD  .T000059,.T000156
:              .WORD  -.T000060                                     00023700
::
:.L000155      EQU    *
:.MFFLOAT      SET    1
:              JSR    .FFLOAT
:              .BYTE  1
:              .WORD  .C000157
:              .WORD  .T000004
:.MFFLOAT      SET    1
:              JSR    .FFLOAT
:              .BYTE  0
:              .WORD  .C000006
:              .WORD  .T000061
:              LDA    J"""""01+1
:              ASL    A
:              ASL    A
:              CLC
:              ADC    #(VP""""01-4) MOD .M
:              STA    .T000060
:              LDA    #0
:              ADC    #(VP""" 01-4)/256
:              STA    .T000060+1
:.MFFDIV       SET    1
:              JSR    .FFDIV
:              .BYTE  0
:              .WORD  -.T000060,.T000004
:              .WORD  .T000059
:.MFFLOAT      SET    1
:              JSR    .FFLOAT
:              .BYTE  0
:              .WORD  .C000012
:              .WORD  .T000156
:.MFFMUL       SET    1
:              JSR    .FFMUL
:              .BYTE  0
:              .WORD  .T000059,.T000061
:              .WORD  .T000004
:.MFFMUL       SET    1
:              JSR    .FFMUL
:              .BYTE  0
:              .WORD  .T000004,.T000156
:              .WORD  RMUBC"01                                      00023800
::
:              LDA    J"""""01+1
:              ASL    A
:              ASL    A
:              CLC
:              ADC    #(RM""""01-4) MOD .M
:              STA    .T000004
:              LDA    #0
:              ADC    #(RM""""01-4)/256
:              STA    .T000004+1
:.MFLTASG      SET    1
:              JSR    .FLTASGN
:              .BYTE  0
:              .WORD  -.T000004
:              .WORD  RRM"""01                                      00023900
::
:              LDA    J"""""01+1
:              ASL    A
:              ASL    A
:              CLC
:              ADC    #(GM""""01-4) MOD .M
:              STA    .T000004
:              LDA    #0
:              ADC    #(GM""""01-4)/256
:              STA    .T000004+1
:.MFLTASG      SET    1
:              JSR    .FLTASGN
:              .BYTE  0
:              .WORD  -.T000004
:              .WORD  GGM"""01                                      00024000
::             PHI=PON(J)
:              LDA    J"""""01+1
:              ASL    A
:              ASL    A
:              CLC
:              ADC    #(PON"""01-4) MOD .M
:              STA    .T000004
:              LDA    #0
:              ADC    #(PON"""01-4)/256
:              STA    .T000004+1
```

```
:.MFLTASG SET   1
:         JSM   .FLTASGN
:         .BYTE 0
:         .WORD -.T000004
:         .WORD PHI***01
::                                                                      00024100
:.MFFLOAT SET   1
:         JSM   .FFLOAT
:         .BYTE 0
:         .WORD .C000002
:         .WORD .T000059
:.MFFSUB  SET   1
:         JSM   .FFSUB
:         .BYTE 0
:         .WORD .T000059,PHI***01
:         .WORD .T000001
:         LDA   J*****01+1
:         ASL   A
:         ASL   A
:         CLC
:         ADC   #(NNUM**01-4) MOD .M
:         STA   .T000005
:         LDA   #0
:         ADC   #(NNUM**01-4)/256
:         STA   .T000005+1
:.MFFMUL  SET   1
:         JSM   .FFMUL
:         .BYTE 0
:         .WORD .T000001,-.T000005
:         .WORD .T000059
:.MFFDIV  SET   1
:         JSM   .FFDIV
:         .BYTE 0
:         .WORD PHI***01,ANNL1U01
:         .WORD .T000004
:.MFFADD  SET   1
:         JSM   .FFADD
:         .BYTE 0
:         .WORD .T000004,.T000059
:         .WORD PLOW**01
::                                                                      00024200
::                                                                      00024300
:.MFFLOAT SET   1
:         JSM   .FFLOAT
:         .BYTE 0
:         .WORD .C000002
:         .WORD .T000004
:.MFFDIV  SET   1
:         JSM   .FFDIV
:         .BYTE 0
:         .WORD .T000004,PLOW**01
:         .WORD PLOW**01
::                                                                      00024400
:.MFFGE   SET   1
:         JSM   .FFGE
:         .BYTE 0
:         .WORD PLOW**01,PSTR**01
:         ASL   A
:         BCS   *+5
:         JMP   .L000158
:         LDA   #PSTR**01 MOD .M
:         STA   WRITE.04
:         LDA   #PSTR**01/256
:         STA   WRITE.04+1
:         LDA   #PLOW**01 MOD .M
:         STA   WRITE.03
:         LDA   #PLOW**01/256
:         STA   WRITE.03+1
:         LDA   #.C000159 MOD .M
:         STA   WRITE.02
:         LDA   #.C000159/256
:         STA   WRITE.02+1
:         LDA   #.C000016 MOD .M
:         STA   WRITE.01
:         LDA   #.C000016/256
:         STA   WRITE.01+1
:         JSM   WRITE
:.L000158 EQU   *
:: C 507 FORMAT(/5X,' LOWER BOUND,PLOW=',F7.2,3X,'< OR = PSTR=',F7.2,5X,00024500
:: C     *'PROBLEM QUESTIONABLE' //)                                    00024600
:: C      CALL AGRA AND CALD TO COMPUTE AA/AM,BB/BM,GG/GM (SEE SANDMUU2) 00024700
::        CALL AGRA (PSTR,ARM,GGM,KLIQ,CO,PHI,AA,BB,GG,TOL)             00024800
:         LDA   #TOL***01 MOD .M
:         STA   AGRA.010
:         LDA   #TOL***01/256
:         STA   AGRA.010+1
:         LDA   #GG****01 MOD .M
:         STA   AGRA.009
:         LDA   #GG****01/256
```

```
:              STA    RGRA,009+1
:              LDA    #EB****01 MOD .M
:              STA    RGRA,008
:              LDA    #BB****01/256
:              STA    RGRA,008+1
:              LDA    #AA****01 MOD .M
:              STA    RGRA,007
:              LDA    #AA****01/256
:              STA    RGRA,007+1
:              LDA    #PHI***01 MOD .M
:              STA    RGRA,006
:              LDA    #PHI***01/256
:              STA    RGRA,006+1
:              LDA    #CU****01 MOD .M
:              STA    RGRA,005
:              LDA    #CU****01/256
:              STA    RGRA,005+1
:              LDA    #ALIU**01 MOD .M
:              STA    RGRA,004
:              LDA    #ALIU**01/256
:              STA    RGRA,004+1
:              LDA    #GGM***01 MOD .M
:              STA    RGRA,003
:              LDA    #GGM***01/256
:              STA    RGRA,003+1
:              LDA    #RRM***01 MOD .M
:              STA    RGRA,002
:              LDA    #RRM***01/256
:              STA    RGRA,002+1
:              LDA    #PSTN**01 MOD .M
:              STA    RGRA,001
:              LDA    #PSTN**01/256
:              STA    RGRA,001+1
:              JSR    RGRA
::                                                                 00024900
:.MFFMUL       SEI    1
:              JSR    .FFMUL
:              .BYTE  0
:              .WORD  AA****01,RRM***01
:              .WORD  RA****01
::                                                                 00025000
:.MFFMUL       SEI    1
:              JSR    .FFMUL
:              .BYTE  0
:              .WORD  BM****01,RRM***01
:              .WORD  RSTAN*01
::                                                                 00025100
:.MFFMUL       SEI    1
:              JSR    .FFMUL
:              .BYTE  0
:              .WORD  GG****01,GGM***01
:              .WORD  GSTAN*01
::             IF(NMUG.GT.0)CALL WRITE(6,511,AA,BB,GG,RSTAN,GSTAN,PSTN)   00025200
:              LDA    #0
:              CMP    NMUG**01+1
:              LDA    #0
:              SBC    NMUG**01
:              BMI    .L000101
:              JMP    .L000100
:.L000101      EQU    *
:              LDA    #PSTN**01 MOD .M
:              STA    WRITE,08
:              LDA    #PSTN**01/256
:              STA    WRITE,08+1
:              LDA    #GSTAN*01 MOD .M
:              STA    WRITE,07
:              LDA    #GSTAN*01/256
:              STA    WRITE,07+1
:              LDA    #RSTAN*01 MOD .M
:              STA    WRITE,06
:              LDA    #RSTAN*01/256
:              STA    WRITE,06+1
:              LDA    #GG****01 MOD .M
:              STA    WRITE,05
:              LDA    #GG****01/256
:              STA    WRITE,05+1
:              LDA    #BB****01 MOD .M
:              STA    WRITE,04
:              LDA    #BB****01/256
:              STA    WRITE,04+1
:              LDA    #AA****01 MOD .M
:              STA    WRITE,03
:              LDA    #AA****01/256
:              STA    WRITE,03+1
:              LDA    #.C000102 MOD .M
:              STA    WRITE,02
:              LDA    #.C000102/256
:              STA    WRITE,02+1
```

```
:          LDA   =.C000010 MOD .M
:          STA   =WRITE.01
:          LDA   =.C000010/256
:          STA   =WRITE.01+1
:          JSM   =WRITE
:.L000100 EQU   *
:: C S11 FORMAT(/5X,' ASNA/AM,BSNA/BM,GSGA/GM,NA,GA,PAS',6F10.5 //)       00025300
::                                                                        00025400
:.MFFDIV  SET   1
:         JSM   .FFDIV
:         .BYTE 0
:         .WORD ASTAR**01,GSTAR**01
:         .WORD W******01
::                                                                        00025500
:.MFFLOAT SET   1
:         JSM   .FFLOAT
:         .BYTE 0
:         .WORD .C000007
:         .WORD .T000059
:.MFFLOAT SET   1
:         JSM   .FFLOAT
:         .BYTE 0
:         .WORD .C000004
:         .WORD .T000000
:.MFFDIV  SET   1
:         JSM   .FFDIV
:         .BYTE 0
:         .WORD .T000004,.T000059
:         .WORD .T000001
:.MFFADD  SET   1
:         JSM   .FFADD
:         .BYTE 0
:         .WORD W******01,.T000001
:         .WORD FAC****01
::        USUM(J)**FLOAT(2))/FAC                                          00025600
:.MFFLOAT SET   1
:         JSM   .FFLOAT
:         .BYTE 0
:         .WORD .C000006
:         .WORD .T000004
:         LDA   J******01+1
:         ASL   A
:         ASL   A
:         CLC
:         ADC   =(UP*****01-4) MOD .M
:         STA   .T000000
:         LDA   =0
:         ADC   =(UP*****01-4)/256
:         STA   .T000000+1
:.MFFDIV  SET   1
:         JSM   .FFDIV
:         .BYTE 0
:         .WORD .T000004,FAC****01
:         .WORD -.T000000
::                                                                        00025700
:         LDA   =US*****01 MOD .M
:         STA   SUM1.001
:         LDA   =US*****01/256
:         STA   SUM1.001+1
:         LDA   =.T000000 MOD .M
:         STA   SUM1.000
:         LDA   =.T000000/256
:         STA   SUM1.000+1
:         JSM   SUM1
:.MFLTASG SET   1
:         JSM   .FLTASGN
:         .BYTE 0
:         .WORD .T000008
:         .WORD UCS****01
::                                                                        00025800
:.MFFLOAT SET   1
:         JSM   .FFLOAT
:         .BYTE 0
:         .WORD .C000007
:         .WORD .T000000
:.MFFLOAT SET   1
:         JSM   .FFLOAT
:         .BYTE 0
:         .WORD .C000006
:         .WORD .T000001
:.MFFMUL  SET   1
:         JSM   .FFMUL
:         .BYTE 0
:         .WORD .T000004,R******01
:         .WORD .T000059
:.MFFLOAT SET   1
:         JSM   .FFLOAT
:         .BYTE 0
```

```
;               .WORD .C000010
;               .WORD .T000156
;.MFFLOAT       SET   1
;               JSR   .FFLOAT
;               .BYTE 0
;               .WORD .C000006
;               .WORD .T000164
;.MFFMUL        SET   1
;               JSR   .FFMUL
;               .BYTE 0
;               .WORD .T000156,W*****01
;               .WORD .T000165
;.MFFADD        SET   1
;               JSR   .FFADD
;               .BYTE 0
;               .WORD .T000165,.T000164
;               .WORD .T000156
;.MFFSUM        SET   1
;               JSR   .FFSUM
;               .BYTE 0
;               .WORD .T000059,.T000061
;               .WORD .T000004
;.MFFDIV        SET   1
;               JSR   .FFDIV
;               .BYTE 0
;               .WORD .T000004,.T000156
;               .WORD SIGSTW01                                  00025900
;;
;               LDA   J*****01+1
;               ASL   A
;               ASL   A
;               CLC
;               ADC   #(DEPTH*01-4) MOD .M
;               STA   .T000004
;               LDA   #0
;               ADC   #(DEPTH*01-4)/256
;               STA   .T000004+1
;.MFLTASG       SET   1
;               JSR   .FLTASGN
;               .BYTE 0
;               .WORD -.T000004
;               .WORD DEP***01                                  00026000
;;
;               LDA   J*****01+1
;               ASL   A
;               ASL   A
;               CLC
;               ADC   #(FTEMP*01-4) MOD .M
;               STA   .T000004
;               LDA   #0
;               ADC   #(FTEMP*01-4)/256
;               STA   .T000004+1
;.MFLTASG       SET   1
;               JSR   .FLTASGN
;               .BYTE 0
;               .WORD -.T000004
;               .WORD TEMP**01                                  00026100
;;
;               LDA   J*****01+1
;               ASL   A
;               ASL   A
;               CLC
;               ADC   #(NMUM**01-4) MOD .M
;               STA   .T000004
;               LDA   #0
;               ADC   #(NMUM**01-4)/256
;               STA   .T000004+1
;.MFLTASG       SET   1
;               JSR   .FLTASGN
;               .BYTE 0
;               .WORD -.T000004
;               .WORD NMUGWA01                                  00026200
;;
;; C     COMPUTE AND PRINT RHOGAS & KGAS IF NBUG>0.            00026300
;               LDA   J*****01+1
;               ASL   A
;               ASL   A
;               CLC
;               ADC   #(VP****01-4) MOD .M
;               STA   .T000004
;               LDA   #0
;               ADC   #(VP****01-4)/256
;               STA   .T000004+1
;.MFLTASG       SET   1
;               JSR   .FLTASGN
;               .BYTE 0
;               .WORD -.T000004
;               .WORD VCP***01
```

```
::                                                          00026400
:.MFFLOAT SET   1
:         JSM   .FFLOAT
:         .MVIE 0
:         .ADWD .C000012
:         .ADWD .T000059
:.MFFLOAT SET   1
:         JSR   .FFLOAT
:         .MVIE 0
:         .ADWD .C000009
:         .ADWD .T000004
:.MFFDIV  SET   1
:         JSM   .FFDIV
:         .MVIE 0
:         .ADWD .T000004,.T000059
:         .ADWD SX****01
::                                                          00026500
:.MFLTASG SET   1
:         JSM   .FLTASGA
:         .MVIE 0
:         .ADWD TEMP**01
:         .ADWD TEMX**01
::        IF(NBUL.GT.0)CALL FLMMUD(NT,TEMX,FGRAD,DEP,SX,PHI,MMUGNN,MMOL100026600
:         LDA   @0
:         CMP   NNUG**01+1
:         LDA   @0
:         SBC   NNUG**01
:         RMI   .L000166
:         JMP   .L000165
:.L000166 EQU   *
::       &KLIW,TO,MMUGAS,RGAS,RF,MMLWX,TGRAD,TCALC)              00026700
:         LDA   @TCALC*01 MOD .M
:         STA   FLMMUD.0
:         LDA   @TCALC*01/256
:         STA   FLMMUD.0+1
:         LDA   @TGRAD*01 MOD .M
:         STA   FLMMUD.5
:         LDA   @TGRAD*01/256
:         STA   FLMMUD.5+1
:         LDA   @MMLWX*01 MOD .M
:         STA   FLMMUD.8
:         LDA   @MMLWX*01/256
:         STA   FLMMUD.8+1
:         LDA   @RF****01 MOD .M
:         STA   FLMMUD.3
:         LDA   @RF****01/256
:         STA   FLMMUD.3+1
:         LDA   @RGAS**01 MOD .M
:         STA   FLMMUD.2
:         LDA   @RGAS**01/256
:         STA   FLMMUD.2+1
:         LDA   @MMUGAS01 MOD .M
:         STA   FLMMUD.1
:         LDA   @MMUGAS01/256
:         STA   FLMMUD.1+1
:         LDA   @TO****01 MOD .M
:         STA   FLMMUD.0
:         LDA   @TO****01/256
:         STA   FLMMUD.0+1
:         LDA   @KLIW**01 MOD .M
:         STA   FLMMUD.9
:         LDA   @KLIW**01/256
:         STA   FLMMUD.9+1
:         LDA   @MMOLIW01 MOD .M
:         STA   FLMMUD.8
:         LDA   @MMOLIW01/256
:         STA   FLMMUD.8+1
:         LDA   @MMUGNN01 MOD .M
:         STA   FLMMUD.7
:         LDA   @MMUGNN01/256
:         STA   FLMMUD.7+1
:         LDA   @PHI***01 MOD .M
:         STA   FLMMUD.6
:         LDA   @PHI***01/256
:         STA   FLMMUD.6+1
:         LDA   @SX****01 MOD .M
:         STA   FLMMUD.5
:         LDA   @SX****01/256
:         STA   FLMMUD.5+1
:         LDA   @DEP***01 MOD .M
:         STA   FLMMUD.4
:         LDA   @DEP***01/256
:         STA   FLMMUD.4+1
:         LDA   @FGRAD*01 MOD .M
:         STA   FLMMUD.3
:         LDA   @FGRAD*01/256
:         STA   FLMMUD.3+1
:         LDA   @TEMX**01 MOD .M
```

```
:         STA   FLMMUD.2
:         LDA   =TEMX**01/256
:         STA   FLMMUD.2+1
:         LDA   =RI*****01 MOD .M
:         STA   FLMMGD.1
:         LDA   =RI*****01/256
:         STA   FLMMGD.1+1
:         JSM   FLMMUD
:.L000165 EQU   *
::              IF(NHUG.GT.0)CALL WRITE(6,251,KGAS,RHOGAS,TCALC)           00026800
:         LDA   =0
:         CMP   NHUG**01+1
:         LDA   =0
:         SBC   NHUG**01
:         BMI   .L000166
:         JMP   .L000167
:.L000166 EQU   *
:         LDA   =TCALC*01 MOD .M
:         STA   WRITE.05
:         LDA   =TCALC*01/256
:         STA   WRITE.05+1
:         LDA   =RHOGAS01 MOD .M
:         STA   WRITE.04
:         LDA   =RHOGAS01/256
:         STA   WRITE.04+1
:         LDA   =KGAS**01 MOD .M
:         STA   WRITE.03
:         LDA   =KGAS**01/256
:         STA   WRITE.03+1
:         LDA   =.C000169 MOD .M
:         STA   WRITE.02
:         LDA   =.C000169/256
:         STA   WRITE.02+1
:         LDA   =.C000010 MOD .M
:         STA   WRITE.01
:         LDA   =.C000010/256
:         STA   WRITE.01+1
:         JSM   WRITE
:.L000167 EQU   *
:: C 251 FORMAT(/5X,'    KGAS=',F10.5,'   RHOGAS=',F10.5,'  TEMPERATURE(00026900
:: C     *',F10.5 //)                                                     00027000
::              CALL WRITE(6,120)                                          00027100
:         LDA   =.C000170 MOD .M
:         STA   WRITE.02
:         LDA   =.C000170/256
:         STA   WRITE.02+1
:         LDA   =.C000010 MOD .M
:         STA   WRITE.01
:         LDA   =.C000010/256
:         STA   WRITE.01+1
:         JSM   WRITE
:: C 120 FORMAT(/3X,' SG=GAS SATURATION(%)',2X,' VP(COMPUTED,FT.SEC)',2X00027200
:: C     *  VS(COMPUTED, FT/SEC)',3X,' POISSON RATIO ',3X,' CALC. BULK DE00027300
:: C     *1Y(GM/CM**3)' //)                                               00027400
::              S=FLOAT(0)                                                 00027500
:.MFFLOAT SET   1
:         JSM   .FFLOAT
:         .BYTE 0
:         .WORD .C000003
:         .WORD S*****01
::              CALL WRITE(6,125,S,VCP,VCS,SIGSTR,RHOBC)                   00027600
:         LDA   =RHOBC*01 MOD .M
:         STA   WRITE.07
:         LDA   =RHOBC*01/256
:         STA   WRITE.07+1
:         LDA   =SIGSTR01 MOD .M
:         STA   WRITE.06
:         LDA   =SIGSTR01/256
:         STA   WRITE.06+1
:         LDA   =VCS***01 MOD .M
:         STA   WRITE.05
:         LDA   =VCS***01/256
:         STA   WRITE.05+1
:         LDA   =VCP***01 MOD .M
:         STA   WRITE.04
:         LDA   =VCP***01/256
:         STA   WRITE.04+1
:         LDA   =S*****01 MOD .M
:         STA   WRITE.03
:         LDA   =S*****01/256
:         STA   WRITE.03+1
:         LDA   =.C000047 MOD .M
:         STA   WRITE.02
:         LDA   =.C000047/256
:         STA   WRITE.02+1
:         LDA   =.C000010 MOD .M
:         STA   WRITE.01
:         LDA   =.C000010/256
```

```
:           STA   ##IIE.01+1
:           JSM   ##IIE
:: C 125 FORMAT(1X,F22.2,F23.1,F25.1,F17.5,3X,F25.5    //)           00027700
::                                                                  00027800
:           LDA   #0
:           STA   L*****01
:           LDA   #2
:           STA   L*****01+1
:           JMP   .L000173
:.L000171   EQU   *
:           LDA   L*****01+1
:           CLC
:           ADC   #1
:           STA   L*****01+1
:           LDA   L*****01
:           ADC   #0
:           STA   L*****01
:           LDA   NSG***01+1
:           CMP   L*****01+1
:           LDA   NSG***01
:           SBC   L*****01
:           BMI   .L000172
:.L000173   EQU   *
::          S=SG(L)/FLOAT(100)
:: C        BEGIN SATURATION CALC. WITH SUBROUTINE FLMOD(FLUID MODULI)   00027900
:: C        AND ITS COMPANION GASMOD(GAS MODULI).                        00028000
:.MFFLOAT   SEI                                                          00028100
:           JSM   .FFLOAT
:           .BYTE 0
:           .WORD .C000032
:           .WORD .T000000
:           LDA   L*****01+1
:           ASL   A
:           ASL   A
:           CLC
:           ADC   #(SG****01-4) MOD .M
:           STA   .T000059
:           LDA   #0
:           ADC   #(SG****01-4)/256
:           STA   .T000059+1
:.MFFDIV    SEI
:           JSM   .FFDIV
:           .BYTE 0
:           .WORD -.T000059,.T000000
:           .WORD S*****01
::          CALL FLMOD(AT,TEMP,FGRAD,DEP,S,PHI,RHOGRN,RMULIQ,KLIQ,IQ,     00028200
::         *RMUGAS,KGAS,PF,RMUBC,TGRAD,TCALC)                            00028300
:           LDA   #TCALC*01 MOD .M
:           STA   FLMOD.6
:           LDA   #TCALC*01/256
:           STA   FLMOD.6+1
:           LDA   #TGRAD*01 MOD .M
:           STA   FLMOD.5
:           LDA   #TGRAD*01/256
:           STA   FLMOD.5+1
:           LDA   #RMUBC*01 MOD .M
:           STA   FLMOD.4
:           LDA   #RMUBC*01/256
:           STA   FLMOD.4+1
:           LDA   #PF****01 MOD .M
:           STA   FLMOD.3
:           LDA   #PF****01/256
:           STA   FLMOD.3+1
:           LDA   #KGAS**01 MOD .M
:           STA   FLMOD.2
:           LDA   #KGAS**01/256
:           STA   FLMOD.2+1
:           LDA   #RMUGAS01 MOD .M
:           STA   FLMOD.1
:           LDA   #RMUGAS01/256
:           STA   FLMOD.1+1
:           LDA   #IQ****01 MOD .M
:           STA   FLMOD.0
:           LDA   #IQ****01/256
:           STA   FLMOD.0+1
:           LDA   #KLIQ**01 MOD .M
:           STA   FLMOD.9
:           LDA   #KLIQ**01/256
:           STA   FLMOD.9+1
:           LDA   #RMULIQ01 MOD .M
:           STA   FLMOD.8
:           LDA   #RMULIQ01/256
:           STA   FLMOD.8+1
:           LDA   #RHOGRN01 MOD .M
:           STA   FLMOD.7
:           LDA   #RHOGRN01/256
:           STA   FLMOD.7+1
```

```
              LDA   #PHI***01 MOD .M
              STA   FLMMOD.6
              LDA   #PHI***01/256
              STA   FLMMOD.6+1
              LDA   #S*****01 MOD .M
              STA   FLMMOD.5
              LDA   #S*****01/256
              STA   FLMMOD.5+1
              LDA   #DEP***01 MOD .M
              STA   FLMMOD.4
              LDA   #DEP* *01/256
              STA   FLMMOD.4+1
              LDA   #FGWAD*01 MOD .M
              STA   FLMMOD.3
              LDA   #FGWAD*01/256
              STA   FLMMOD.3+1
              LDA   #TEMP**01 MOD .M
              STA   FLMMOD.2
              LDA   #TEMP**01/256
              STA   FLMMOD.2+1
              LDA   #AT****01 MOD .M
              STA   FLMMOD.1
              LDA   #AT****01/256
              STA   FLMMOD.1+1
              JSR   FLMMOD                                                  00028400
      C                                                                     00028500
      C      FLUID IS A SIMPLE BIOT-GASSMAN EQN ROUTINE WHICH COMPUTES K*.  00028600
             CALL FLUID(AA,KKM,KF,PHI,KSTAR)
              LDA   #KSTAR*01 MOD .M
              STA   FLUID.05
              LDA   #KSTAR*01/256
              STA   FLUID.05+1
              LDA   #PHI***01 MOD .M
              STA   FLUID.04
              LDA   #PHI***01/256
              STA   FLUID.04+1
              LDA   #KF****01 MOD .M
              STA   FLUID.03
              LDA   #KF****01/256
              STA   FLUID.03+1
              LDA   #KKM***01 MOD .M
              STA   FLUID.02
              LDA   #KKM***01/256
              STA   FLUID.02+1
              LDA   #AA****01 MOD .M
              STA   FLUID.01
              LDA   #AA****01/256
              STA   FLUID.01+1
              JSR   FLUID                                                   00028700

  .MFFDIV     SET   1
              JSR   .FFDIV
              .BYTE 0
              .WORD KSTAR*01,GSTAR*01
              .WORD W*****01                                                00028800

  .MFFLOAT    SET   1
              JSR   .FFLOAT
              .BYTE 0
              .WORD .C000007
              .WORD .T000004
  .MFFLOAT    SET   1
              JSR   .FFLOAT
              .BYTE 0
              .WORD .C000000
              .WORD .T000061
  .MFFMUL     SET   1
              JSR   .FFMUL
              .BYTE 0
              .WORD .T000004,W*****01
              .WORD .T000059
  .MFFLOAT    SET   1
              JSR   .FFLOAT
              .BYTE 0
              .WORD .C000010
              .WORD .T000156
  .MFFLOAT    SET   1
              JSR   .FFLOAT
              .BYTE 0
              .WORD .C000006
              .WORD .T000160
  .MFFMUL     SET   1
              JSR   .FFMUL
              .BYTE 0
              .WORD .T000156,W*****01
              .WORD .T000163
  .MFFADD     SET   1
```

```
;          JSR   .FFADD
;          .BYTE 0
;          .WORD .T000163,.T000164
;          .WORD .T000156
;.MFFSUB   SET   1
;          JSR   .FFSUB
;          .BYTE 0
;          .WORD .T000059,.T000061
;          .WORD .T000004
;.MFFDIV   SET   1
;          JSR   .FFDIV
;          .BYTE 0
;          .WORD .T000004,.T000156
;          .WORD SIGSTH01
;;                                                   00028900
;.MFFLOAT  SET   1
;          JSR   .FFLOAT
;          .BYTE 0
;          .WORD .C000007
;          .WORD .T000059
;.MFFLOAT  SET   1
;          JSR   .FFLOAT
;          .BYTE 0
;          .WORD .C000008
;          .WORD .T000004
;.MFFDIV   SET   1
;          JSR   .FFDIV
;          .BYTE 0
;          .WORD .T000004,.T000059
;          .WORD .T000061
;.MFFADD   SET   1
;          JSR   .FFADD
;          .BYTE 0
;          .WORD H*****01,.T000061
;          .WORD FAC***01
;;                                                   00029000
;.MFFLOAT  SET   1
;          JSR   .FFLOAT
;          .BYTE 0
;          .WORD .C000008
;          .WORD .T000004
;.MFFLOAT  SET   1
;          JSR   .FFLOAT
;          .BYTE 0
;          .WORD .C000007
;          .WORD .T000061
;.MFFMUL   SET   1
;          JSR   .FFMUL
;          .BYTE 0
;          .WORD .T000004,GSTAH*01
;          .WORD .T000059
;.MFFDIV   SET   1
;          JSR   .FFDIV
;          .BYTE 0
;          .WORD .T000059,.T000061
;          .WORD .T000004
;.MFFADD   SET   1
;          JSR   .FFADD
;          .BYTE 0
;          .WORD RSTAH*01,.T000004
;          .WORD PHAI**01
;;                                                   00029100
;.MFFLOAT  SET   1
;          JSR   .FFLOAT
;          .BYTE 0
;          .WORD .C000012
;          .WORD .T000004
;; C     COMPUTED P-WAVE AND SHEAR WAVE VELOCITIES,VCP,VCS FOR GIVEN SG.00029200
;.MFFMUL   SET   1
;          JSR   .FFMUL
;          .BYTE 0
;          .WORD .T000004,HHOHC*01
;          .WORD .T000059
;.MFFDIV   SET   1
;          JSR   .FFDIV
;          .BYTE 0
;          .WORD PHAI**01,.T000059
;          .WORD YY****01
;;                                                   00029300
;          LDA   #YY****01 MOD .M
;          STA   SUNT.001
;          LDA   #YY****01/256
;          STA   SUNT.001+1
;          LDA   #.T000004 MOD .M
;          STA   SUNT.000
;          LDA   #.T000004/256
;          STA   SUNT.000+1
;          JSR   SUNT
```

```
:.MFFLOAT SET    1
:         JSM    .FFLOAT
:         .BYTE  1
:         .WORD  .C000157
:         .WORD  .T000059
:.MFFMUL  SET    1
:         JSM    .FFMUL
:         .BYTE  0
:         .WORD  .T000004,.T000059
:         .WORD  VCP***01                                  00029400
::
:.MFFLOAT SET    1
:         JSM    .FFLOAT
:         .BYTE  0
:         .WORD  .C000012
:         .WORD  .T000004
:.MFFMUL  SET    1
:         JSR    .FFMUL
:         .BYTE  0
:         .WORD  .T000004,RMOBC*01
:         .WORD  .T000059
:.MFFDIV  SET    1
:         JSM    .FFDIV
:         .BYTE  0
:         .WORD  GSTAR*01,.T000059
:         .WORD  VCS***01                                  00029500
::
:         LDA    =VCS***01 MOD .M
:         STA    SQRT.001
:         LDA    =VCS***01/256
:         STA    SQRT.001+1
:         LDA    =.T000004 MOD .M
:         STA    SQRT.000
:         LDA    =.T000004/256
:         STA    SQRT.000+1
:         JSM    SQRT
:.MFFLOAT SET    1
:         JSM    .FFLOAT
:         .BYTE  1
:         .WORD  .C000157
:         .WORD  .T000059
:.MFFMUL  SET    1
:         JSM    .FFMUL
:         .BYTE  0
:         .WORD  .T000004,.T000059
:         .WORD  VCS***01                                  00029600
::
:.MFFLOAT SET    1
:         JSR    .FFLOAT
:         .BYTE  0
:         .WORD  .C000032
:         .WORD  .T000004
:.MFFMUL  SET    1
:         JSM    .FFMUL
:         .BYTE  0
:         .WORD  S*****01,.T000004
:         .WORD  SGPCT*01
::        CALL WRITE(6,125,SGPCT,VCP,VCS,SIGSTR,RMOBC)     00029700
:         LDA    =RMOBC*01 MOD .M
:         STA    WRITE.07
:         LDA    =RMOBC*01/256
:         STA    WRITE.07+1
:         LDA    =SIGSTR01 MOD .M
:         STA    WRITE.06
:         LDA    =SIGSTR01/256
:         STA    WRITE.06+1
:         LDA    =VCS***01 MOD .M
:         STA    WRITE.05
:         LDA    =VCS***01/256
:         STA    WRITE.05+1
:         LDA    =VCP***01 MOD .M
:         STA    WRITE.04
:         LDA    =VCP***01/256
:         STA    WRITE.04+1
:         LDA    =SGPCT*01 MOD .M
:         STA    WRITE.03
:         LDA    =SGPCT*01/256
:         STA    WRITE.03+1
:         LDA    =.C000087 MOD .M
:         STA    WRITE.02
:         LDA    =.C000087/256
:         STA    WRITE.02+1
:         LDA    =.C000010 MOD .M
:         STA    WRITE.01
:         LDA    =.C000010/256
:         STA    WRITE.01+1
:         JSM    WRITE                                     00029800
::    175 CONTINUE
```

```
04024 :.L000175 EQU    0
04025 :         JMP    .L000171
04026 :.L000172 EQU    0
04027 ::        CALL WRITE (6,131)                                00024900
04028 :         LDA    =.C000176 MOD .M
04029 :         STA    WRITE.02
04030 :         LDA    =.C000176/256
04031 :         STA    WRITE.02+1
04032 :         LDA    =.L000010 MOD .M
04033 :         STA    WRITE.01
04034 :         LDA    =.L000010/256
04035 :         STA    WRITE.01+1
04036 :         JSB    WRITE
04037 :: C 131 FORMAT(' S S S S S S' //)                           00030000
04038 ::    200 CONTINUE                                          00030100
04039 :.L000101 EQU    0
04040 :         JMP    .L000137
04041 :.L000136 EQU    0
04042 ::        GO TO 1                                           00030200
04043 :         JMP    .L000074
04044 ::        END                                               00030300
04045 :.B000001 NIS
04046 ::        SUBROUTINE AGRA(PSIBR,RN,GN,RF,CO,POR,A,B,G,TOL)  00030400
04047 :AGRA     EQU    0
04048 :PSIAR*02 EQU    AGRA.001
04049 :RN****02 EQU    AGRA.002
04050 :GN****02 EQU    AGRA.003
04051 :RF****02 EQU    AGRA.004
04052 :CO****02 EQU    AGRA.005
04053 :POR***02 EQU    AGRA.006
04054 :A*****02 EQU    AGRA.007
04055 :B*****02 EQU    AGRA.008
04056 :G*****02 EQU    AGRA.009
04057 :TOL***02 EQU    AGRA.010
04058 :: C       R.J.RUALL          CURRC.                         00030500
04059 :: C       CALCULATES A,B,G SUCH THAT ABS(Q)< TOL, I.E Q=0 USING  00030600
04060 :: C       HALVING SEARCH (THOMPSON,D.D. & BROWN,R.J.S. MEMO  00030700
04061 :: C       0                                                 00030800
04062 ::        IMPLICIT REAL (A)                                 00030900
04063 ::                                                          00031000
04064 :.MFFLOAT SET    1
04065 :         JSB    .FFLOAT
04066 :         .MVTE  0
04067 :         .AWRD  .C000007
04068 :         .AWRD  .T000170
04069 :.MFFLOAT SET    1
04070 :         JSB    .FFLOAT
04071 :         .MVTE  0
04072 :         .AWRD  .C000008
04073 :         .AWRD  .T000182
04074 :.MFFMUL  SET    1
04075 :         JSB    .FFMUL
04076 :         .MVTE  0
04077 :         .AWRD  .T000182,-GN****02
04078 :         .AWRD  .T000183
04079 :.MFFMUL  SET    1
04080 :         JSB    .FFMUL
04081 :         .MVTE  0
04082 :         .AWRD  .T000178,-PSIAR*02
04083 :         .AWRD  .T000181
04084 :.MFFDIV  SET    1
04085 :         JSB    .FFDIV
04086 :         .MVTE  0
04087 :         .AWRD  .T000181,.T000183
04088 :         .AWRD  ALPHA.02
04089 ::                                                         00031100
04090 :.MFFLOAT SET    1
04091 :         JSB    .FFLOAT
04092 :         .MVTE  0
04093 :         .AWRD  .C000007
04094 :         .AWRD  .T000178
04095 :.MFFLOAT SET    1
04096 :         JSB    .FFLOAT
04097 :         .MVTE  0
04098 :         .AWRD  .C000008
04099 :         .AWRD  .T000182
04100 :.MFFMUL  SET    1
04101 :         JSB    .FFMUL
04102 :         .MVTE  0
04103 :         .AWRD  .T000182,-GN****02
04104 :         .AWRD  .T000183
04105 :.MFFMUL  SET    1
04106 :         JSB    .FFMUL
04107 :         .MVTE  0
04108 :         .AWRD  .T000178,-RN****02
04109 :         .AWRD  .T000181
04110 :.MFFDIV  SET    1
04111 :         JSB    .FFDIV
04112 :         .MVTE  0
04113 :         .AWRD  .T000181,.T000183
04114 :         .AWRD  BETA.*02
```

```
;;                                                        00031200
;;                                                        00031300
;.MFFLOAT SET   1
;         JSR   .FFLOAT
;         .BYTE 0
;         .WORD .C000002
;         .WORD .T000181
;.MFFDIV  SET   1
;         JSR   .FFDIV
;         .BYTE 0
;         .WORD -KM****02,-KF****02
;         .WORD .T000178
;.MFFSUB  SET   1
;         JSR   .FFSUB
;         .BYTE 0
;         .WORD .T000178,.T000181
;         .WORD FO****02
;;                                                        00031400
;.MFFLOAT SET   1
;         JSR   .FFLOAT
;         .BYTE 0
;         .WORD .C000003
;         .WORD ALOW**02
;;                                                        00031500
;.MFFLOAT SET   1
;         JSR   .FFLOAT
;         .BYTE 0
;         .WORD .C000002
;         .WORD AMIGH*02
;;                                                        00031600
;.MFFLOAT SET   1
;         JSR   .FFLOAT
;         .BYTE 0
;         .WORD .C000012
;         .WORD .T000181
;.MFFLOAT SET   1
;         JSR   .FFLOAT
;         .BYTE 0
;         .WORD .C000009
;         .WORD .T000178
;.MFFDIV  SET   1
;         JSR   .FFDIV
;         .BYTE 0
;         .WORD .T000178,.T000181
;         .WORD -A*****02
;;       CALL CALCU(ULOW,ALOW,B,G,CO,FO,POW,ALPHAO,BETAO)  00031700
;         LDA   #BETAO*02 MOD .M
;         STA   CALCU.09
;         LDA   #BETAO*02/256
;         STA   CALCU.09+1
;         LDA   #ALPHAO02 MOD .M
;         STA   CALCU.08
;         LDA   #ALPHAO02/256
;         STA   CALCU.08+1
;         LDA   POW***02
;         STA   CALCU.07
;         LDA   POW***02+1
;         STA   CALCU.07+1
;         LDA   #FO****02 MOD .M
;         STA   CALCU.06
;         LDA   #FO****02/256
;         STA   CALCU.06+1
;         LDA   CO****02
;         STA   CALCU.05
;         LDA   CO****02+1
;         STA   CALCU.05+1
;         LDA   G*****02
;         STA   CALCU.04
;         LDA   G*****02+1
;         STA   CALCU.04+1
;         LDA   B*****02
;         STA   CALCU.03
;         LDA   B*****02+1
;         STA   CALCU.03+1
;         LDA   #ALOW**02 MOD .M
;         STA   CALCU.02
;         LDA   #ALOW**02/256
;         STA   CALCU.02+1
;         LDA   #ULOW**02 MOD .M
;         STA   CALCU.01
;         LDA   #ULOW**02/256
;         STA   CALCU.01+1
;         JSR   CALCU
;;       CALL CALCU(UHIGH,AHIGH,B,G,CO,FO,POW,ALPHAO,BETAO) 00031800
;         LDA   #BETAO*02 MOD .M
;         STA   CALCU.09
;         LDA   #BETAO*02/256
```

```
:           STA   CALCU.09+1
:           LDA   #ALPHAU02 MOD .M
:           STA   CALCU.08
:           LDA   #ALPHAU02/256
:           STA   CALCU.08+1
:           LDA   PON***02
:           STA   CALCU.07
:           LDA   PON***02+1
:           STA   CALCU.07+1
:           LDA   #FU****02 MOD .M
:           STA   CALCU.06
:           LDA   #FU****02/256
:           STA   CALCU.06+1
:           LDA   CU****02
:           STA   CALCU.05
:           LDA   CU****02+1
:           STA   CALCU.05+1
:           LDA   G*****02
:           STA   CALCU.04
:           LDA   G*****02+1
:           STA   CALCU.04+1
:           LDA   B*****02
:           STA   CALCU.03
:           LDA   B*****02+1
:           STA   CALCU.03+1
:           LDA   #AMIGM*02 MOD .M
:           STA   CALCU.02
:           LDA   #AMIGM*02/256
:           STA   CALCU.02+1
:           LDA   #OMIGM*02 MOD .M
:           STA   CALCU.01
:           LDA   #OMIGM*02/256
:           STA   CALCU.01+1
:           JSM   CALCU
::                                                    00031900
:.MFFLOAT   SET   1
:           JSM   .FFLOAT
:           .BYTE 0
:           .WORD .C000003
:           .WORD .T000178
:.MFFLOAT   SET   1
:           JSM   .FFLOAT
:           .BYTE 0
:           .WORD .C000003
:           .WORD .T000181
:.MFFGT     SET   1
:           JSM   .FFGT
:           .BYTE 0
:           .WORD OMIGM*02,.T000181
:           STA   .T000180
:.MFFLT     SET   1
:           JSM   .FFLT
:           .BYTE 0
:           .WORD OLOW**02,.T000178
:           AND   .T000180
:           ASL   A
:           BCS   *+5
:           JMP   .L000185
:           JMP   .L000186
:.L000185   EQU   *
::                                                    00032000
:.MFFLOAT   SET   1
:           JSM   .FFLOAT
:           .BYTE 0
:           .WORD .C000003
:           .WORD .T00017F
:.MFFLOAT   SET   1
:           JSM   .FFLOAT
:           .BYTE 0
:           .WORD .C000003
:           .WORD .T000181
:.MFFGT     SET   1
:           JSM   .FFGT
:           .BYTE 0
:           .WORD GLOW**02,.T000181
:           STA   .T000180
:.MFFLT     SET   1
:           JSM   .FFLT
:           .BYTE 0
:           .WORD GMIGM*02,.T000178
:           AND   .T000180
:           ASL   A
:           BCS   *+5
:           JMP   .L000187
:           JMP   .L000188
:.L000187   EQU   *
::                                                    00032100
:.MFFLOAT   SET   1
```

```
:         JSB    .FFLOAT
:         .BYTE  0
:         .WORD  .C000002
:         .WORD  .T000170
:.MFUNMIN SET    1
:         JSB    .FUNMIN
:         .BYTE  0
:         .WORD  .T000170
:         .WORD  =A*****02
::        GO TO 20                                                  00032200
:         JMP    .L000189
::    TO CALL CALCU(U,A,B,G,CU,FU,PUW,ALPHAU,BETAD)                 00032300
:.L000186 EQU    *
:         LDA    #BETAD*02 MOD .M
:         STA    CALCU.09
:         LDA    #BETAD*02/256
:         STA    CALCU.09+1
:         LDA    #ALPHAU02 MOD .M
:         STA    CALCU.08
:         LDA    #ALPHAU02/256
:         STA    CALCG.08+1
:         LDA    PUW***02
:         STA    CALCU.07
:         LDA    PUW***02+1
:         STA    CALCU.07+1
:         LDA    #FU****02 MOD .M
:         STA    CALCU.06
:         LDA    #FU****02/256
:         STA    CALCU.06+1
:         LDA    CU****02
:         STA    CALCU.05
:         LDA    CU****02+1
:         STA    CALCU.05+1
:         LDA    G*****02
:         STA    CALCU.04
:         LDA    G*****02+1
:         STA    CALCU.04+1
:         LDA    B*****02
:         STA    CALCU.03
:         LDA    B*****02+1
:         STA    CALCU.03+1
:         LDA    A*****02
:         STA    CALCU.02
:         LDA    A*****02+1
:         STA    CALCU.02+1
:         LDA    #U*****02 MOD .M
:         STA    CALCU.01
:         LDA    #U*****02/256
:         STA    CALCU.01+1
:         JSB    CALCU                                              00032400
::
:         LDA    #U*****02 MOD .M
:         STA    ABS.0001
:         LDA    #U*****02/256
:         STA    ABS.0001+1
:         LDA    #.T000170 MOD .M
:         STA    ABS.0000
:         LDA    #.T000170/256
:         STA    ABS.0000+1
:         JSB    ABS
:.MFLTASG SET    1
:         JSB    .FLTASGN
:         .BYTE  0
:         .WORD  .T000170
:         .WORD  V*****02                                           00032500
::
:.MFFLE   SET    1
:         JSB    .FFLE
:         .BYTE  0
:         .WORD  V*****02,-TOL***02
:         ASL    A
:         RCS    *+5
:         JMP    .L000190
:         JMP    .L000189
:.L000190 EQU    *                                                  00032600
::
:.MFFLOAT SET    1
:         JSB    .FFLOAT
:         .BYTE  0
:         .WORD  .C000003
:         .WORD  .T000170
:.MFFGT   SET    1
:         JSB    .FFGT
:         .BYTE  0
:         .WORD  U*****02,.T000170
:         ASL    A
:         RCS    *+5
:         JMP    .L000191
```

```
00378 :.MFLTASG SET   1
00379 :          JSR   .FLTASG
00380 :          .BYTE 0
00381 :          .WORD M------02
00382 :          .WORD AHIGH--02
00383 :.L000191  EQU   *
00384 ::                                                              00032700
00385 :.MFFLOAT  SET   1
00386 :          JSR   .FFLOAT
00387 :          .BYTE 0
00388 :          .WORD .C000003
00389 :          .WORD .T000178
00390 :.MFFLT    SET   1
00391 :          JSR   .FFLT
00392 :          .BYTE 0
00393 :          .WORD M------02,.T000178
00394 :          ASL   A
00395 :          BCS   $+5
00396 :          JMP   .L000192
00397 :.MFLTASG  SET   1
00398 :          JSR   .FLTASG
00399 :          .BYTE 0
00400 :          .WORD M------02
00401 :          .WORD ALOW--02
00402 :.L000192  EQU   *
00403 ::                                                              00032800
00404 :.MFFLOAT  SET   1
00405 :          JSR   .FFLOAT
00406 :          .BYTE 0
00407 :          .WORD .C000006
00408 :          .WORD .T000181
00409 :.MFFADD   SET   1
00410 :          JSR   .FFADD
00411 :          .BYTE 0
00412 :          .WORD AHIGH--02,ALOW--02
00413 :          .WORD .T000178
00414 :.MFFDIV   SET   1
00415 :          JSR   .FFDIV
00416 :          .BYTE 0
00417 :          .WORD .T000178,.T000181
00418 :          .WORD M------02
00419 ::                                                              00032900
00420 :.MFFSUB   SET   1
00421 :          JSR   .FFSUB
00422 :          .BYTE 0
00423 :          .WORD AHIGH--02,ALOW--02
00424 :          .WORD N------02
00425 ::                                                              00033000
00426 :          LDA   N------02 MOD .N
00427 :          STA   ABS.0001
00428 :          LDA   N------02/256
00429 :          STA   ABS.0001+1
00430 :          LDA   .T000178 MOD .N
00431 :          STA   ABS.0000
00432 :          LDA   .T000178/256
00433 :          STA   ABS.0000+1
00434 :          JSR   AHS
00435 :.MFLTASG  SET   1
00436 :          JSR   .FLTASG
00437 :          .BYTE 0
00438 :          .WORD .T000178
00439 :          .WORD M------02
00440 ::                                                              00033100
00441 :.MFFDIV   SET   1
00442 :          JSR   .FFDIV
00443 :          .BYTE 0
00444 :          .WORD N------02,-A----02
00445 :          .WORD N------02
00446 ::                                                              00033200
00447 :.MFFLOAT  SET   1
00448 :          JSR   .FFLOAT
00449 :          .BYTE 1
00450 :          .WORD .C000004
00451 :          .WORD .T000141
00452 :.MFFLOAT  SET   1
00453 :          JSR   .FFLOAT
00454 :          .BYTE 0
00455 :          .WORD .C000002
00456 :          .WORD .T000178
00457 :.MFFDIV   SET   1
00458 :          JSR   .FFDIV
00459 :          .BYTE 0
00460 :          .WORD .T000178,.T000181
00461 :          .WORD .T000182
00462 :.MFFLT    SET   1
00463 :          JSR   .FFLT
00464 :          .BYTE 0
00465 :          .WORD N------02,.T000182
```

```
:              ASL    A
:              BLS    *+5
:              JMP    .L000193
:              JMP    .L000189
:.L000193      EQU    *
::       GO TO 10                                                  00033300
:              JMP    .L000180
::     15 CALL CALCU(U,A,B,G,CU,FU,PUM,ALPHAD,BETAD)               00033400
:.L000180      EQU    *
:              LDA    #BETAU*02 MOD .M
:              STA    CALCU.09
:              LDA    #BETAU*02/256
:              STA    CALCU.09+1
:              LDA    #ALPHAU02 MOD .M
:              STA    CALCU.08
:              LDA    #ALPHAU02/256
:              STA    CALCU.08+1
:              LDA    PUM***02
:              STA    CALCU.07
:              LDA    PUM***02+1
:              STA    CALCU.07+1
:              LDA    #FU****02 MOD .M
:              STA    CALCU.06
:              LDA    #FU****02/256
:              STA    CALCU.06+1
:              LDA    CU****02
:              STA    CALCU.05
:              LDA    CU****02+1
:              STA    CALCU.05+1
:              LDA    G*****02
:              STA    CALCU.04
:              LDA    G*****02+1
:              STA    CALCU.04+1
:              LDA    B*****02
:              STA    CALCU.03
:              LDA    B*****02+1
:              STA    CALCU.03+1
:              LDA    A*****02
:              STA    CALCU.02
:              LDA    A*****02+1
:              STA    CALCU.02+1
:              LDA    #U*****02 MOD .M
:              STA    CALCU.01
:              LDA    #U*****02/256
:              STA    CALCU.01+1
:              JSM    CALCU                                        00033500
::
:              LDA    #U*****02 MOD .M
:              STA    ABS.0001
:              LDA    #U*****02/256
:              STA    ABS.0001+1
:              LDA    #.T000178 MOD .M
:              STA    ABS.0000
:              LDA    #.T000178/256
:              STA    ABS.0000+1
:              JSM    ABS
:.MFLTASG      SET    1
:              JSM    .FLTASGN
:              .BYTE  0
:              .WORD  .T000178
:              .WORD  V*****02                                     00033600
::
:.MFFLE        SET    1
:              JSM    .FFLE
:              .BYTE  0
:              .WORD  V*****02,-TOL***02
:              ASL    A
:              BCS    *+5
:              JMP    .L000194
:              JMP    .L000189
:.L000194      EQU    *                                            00033700
::
:.MFFLOAT      SET    1
:              JSM    .FFLOAT
:              .BYTE  0
:              .WORD  .C000003
:              .WORD  .T000178
:.MFFGT        SET    1
:              JSM    .FFGT
:              .BYTE  0
:              .WORD  G*****02,.T000178
:              ASL    A
:              BCS    *+5
:              JMP    .L000195
:.MFLTASG      SET    1
:              JSM    .FLTASGN
:              .BYTE  0
:              .WORD  -A*****02
:              .WORD  ALOW**02
:.L000195      EQU    *
```

```
04556 ::                                                          00033800
04557 :.MFFLOAT SET    1
04558 :        JSR     .FFLOAT
04559 :        .BYTE   0
04560 :        .WORD   .C000003
04561 :        .WORD   .T000178
04562 :.MFFLT  SET     1
04563 :        JSR     .FFLT
04564 :        .BYTE   0
04565 :        .WORD   B******02,.T000178
04566 :        ASL     A
04567 :        BCS     *+5
04568 :        JMP     .L000196
04569 :.MFLTASG SET    1
04570 :        JSR     .FLTASGN
04571 :        .BYTE   0
04572 :        .WORD   -A******02
04573 :        .WORD   AHIGH**02
04574 :.L000196 EQU    *
04575 ::                                                          00033900
04576 :.MFFLOAT SET    1
04577 :        JSR     .FFLOAT
04578 :        .BYTE   0
04579 :        .WORD   .C000006
04580 :        .WORD   .T000181
04581 :.MFFADD SET     1
04582 :        JSR     .FFADD
04583 :        .BYTE   0
04584 :        .WORD   AHIGH**02,ALOW**02
04585 :        .WORD   .T000178
04586 :.MFFDIV SET     1
04587 :        JSR     .FFDIV
04588 :        .BYTE   0
04589 :        .WORD   .T000178,.T000181
04590 :        .WORD   -A******02
04591 ::                                                          00034000
04592 :.MFFSUB SET     1
04593 :        JSR     .FFSUB
04594 :        .BYTE   0
04595 :        .WORD   AHIGH**02,ALOW**02
04596 :        .WORD   B******02
04597 ::                                                          00034100
04598 :        LDA     B******02 MOD .M
04599 :        STA     ANS.0001
04600 :        LDA     B******02/256
04601 :        STA     ANS.0001+1
04602 :        LDA     #.T000178 MOD .M
04603 :        STA     ANS.0000
04604 :        LDA     #.T000178/256
04605 :        STA     ANS.0000+1
04606 :        JSR     ANS
04607 :.MFLTASG SET    1
04608 :        JSR     .FLTASGN
04609 :        .BYTE   0
04610 :        .WORD   .T000178
04611 :        .WORD   B******02
04612 ::                                                          00034200
04613 :.MFFDIV SET     1
04614 :        JSR     .FFDIV
04615 :        .BYTE   0
04616 :        .WORD   B******02,-A******02
04617 :        .WORD   B******02
04618 ::                                                          00034300
04619 :.MFFLOAT SET    1
04620 :        JSR     .FFLOAT
04621 :        .BYTE   1
04622 :        .WORD   .C000005
04623 :        .WORD   .T000181
04624 :.MFFLOAT SET    1
04625 :        JSR     .FFLOAT
04626 :        .BYTE   0
04627 :        .WORD   .C000002
04628 :        .WORD   .T000178
04629 :.MFFDIV SET     1
04630 :        JSR     .FFDIV
04631 :        .BYTE   0
04632 :        .WORD   .T000178,.T000181
04633 :        .WORD   .T000182
04634 :.MFFLE  SET     1
04635 :        JSR     .FFLE
04636 :        .BYTE   0
04637 :        .WORD   B******02,.T000182
04638 :        ASL     A
04639 :        BCS     *+5
04640 :        JMP     .L000197
04641 :        JMP     .L000184
04642 :.L000197 EQU    *
```

```
                                                          00034400
::       GO TO 15
:        JMP    .L000188                                  00034500
::                                                        00034600
::    20 RETURN
:.L000188 EQU   *
:        JMP    .R000177                                  00034700
:: C     *                                                00034800
::       END
:.R000177 RTS                                             00034900
::       SUBROUTINE CALCQ(Q,A,B,G,CU,FU,PUR,ALPHAD,BETAD)
:CALCQ   EQU    *
:Q*****03 EQU   CALCQ.01
:A*****03 EQU   CALCQ.02
:B*****03 EQU   CALCQ.03
:G*****03 EQU   CALCQ.04
:CU****03 EQU   CALCQ.05
:FU****03 EQU   CALCQ.06
:PUR***03 EQU   CALCQ.07
:ALPHAD03 EQU   CALCQ.08
:BETAD*03 EQU   CALCQ.09
:: C     R.J.PURGE                    CUFRC               00035000
:: C                     CALCULATES  G(A)=LEFT SIDE OF G=0 IN 00035100
:: C     SUBROUTINE RGRA FOR A GIVEN A (HALVING SEARCH). ALSO, B,G, CALC00035200
:: C                                                      00035300
:: C     *                                                00035400
:: C     BIOT GASSMAN EQUATIONS                           00035500
::
:.MFFLOAT SET   1
:        JSR    .FFLOAT
:        .BYTE  0
:        .WORD  .C000002
:        .WORD  .T000199
:.MFFLOAT SET   1
:        JSR    .FFLOAT
:        .BYTE  0
:        .WORD  .C000002
:        .WORD  .T000205
:.MFFMUL SET    1
:        JSR    .FFMUL
:        .BYTE  0
:        .WORD  -FU****03,-PUR***03
:        .WORD  .T000204
:.MFFADD SET    1
:        JSR    .FFADD
:        .BYTE  0
:        .WORD  .T000204,.T000205
:        .WORD  .T000207
::                                                        00035600
:.MFFSUB SET    1
:        JSR    .FFSUB
:        .BYTE  0
:        .WORD  .T000207,-A*****03
:        .WORD  .T000204
:.MFFLOAT SET   1
:        JSR    .FFLOAT
:        .BYTE  0
:        .WORD  .C000006
:        .WORD  .T000203
:.MFFDIV SET    1
:        JSR    .FFDIV
:        .BYTE  0
:        .WORD  .T000203,.T000204
:        .WORD  .T000205
:.MFFSUB SET    1
:        JSR    .FFSUB
:        .BYTE  0
:        .WORD  .T000199,-A*****03
:        .WORD  .T000202
:.MFFADD SET    1
:        JSR    .FFADD
:        .BYTE  0
:        .WORD  .T000202,.T000205
:        .WORD  -A*****03
::                                                        00035700
:.MFFMUL SET    1
:        JSR    .FFMUL
:        .BYTE  0
:        .WORD  -BETAD 03,-B*****03
:        .WORD  .T000199
:.MFFSUB SET    1
:        JSR    .FFSUB
:        .BYTE  0
:        .WORD  -ALPHAD03,.T000199
:        .WORD  -G*****03                                 00035800
::
:.MFFSUB SET    1
:        JSR    .FFSUB
:        .BYTE  0
:        .WORD  -A*****03,-G*****03
:        .WORD  X*****03
```

```
 ;;                                                                          00035900
 ;;                                                                          00036000
 ;.MFFADD   SET     1
 ;          JSR     .FFADD
 ;          .BYTE 0
 ;          .WORD -A*****03,-G*****03
 ;          .WORD Y*****03
 ;;
 ;.MFFLOAT SET      1                                                        00036100
 ;          JSR     .FFLOAT
 ;          .BYTE 0
 ;          .WORD .C000002
 ;          .WORD .T000202
 ;.MFFLOAT SET 1
 ;          JSR     .FFLOAT
 ;          .BYTE 0
 ;          .WORD .C000008
 ;          .WORD .T000204
 ;.MFFSUB   SET     1
 ;          JSR .FFSUB
 ;          .BYTE 0
 ;          .WORD Y*****03,.T000202
 ;          .WORD .T000203
 ;.MFFSUB   SET     1
 ;          JSR     .FFSUB
 ;          .BYTE 0
 ;          .WORD .T000203,.T000204
 ;          .WORD .T000202
 ;.MFFLOAT SET      1
 ;          JSR     .FFLOAT
 ;          .BYTE 0
 ;          .WORD .C000002
 ;          .WORD .T000199
 ;.MFFMUL   SET     1
 ;          JSR     .FFMUL
 ;          .BYTE 0
 ;          .WORD .T000199,.T000202
 ;          .WORD .T000203
 ;.MFFSUB   SET     1
 ;          JSR     .FFSUB
 ;          .BYTE 0
 ;          .WORD -CO****03,.T000203
 :          .WORD X*****03
 ;;        RETURN                                                           00036200
 ;          JMP     .R000198
 ;; C       *                                                                00036300
 ;;        END                                                              00036400
 ;.R000198 RTS
 ;;        SUBROUTINE  FLMMOD(WT,FTEMP,FGRAD,Z,SG,PHI,RHOGRN,RHOLIQ,KLIQ,T00036500
 ;FLMMOD   EQU     *
 ;WT****04 EQU     FLMMOD.1
 ;FTEMP*04 EQU     FLMMOD.2
 ;FGRAD*04 EQU     FLMMOD.3
 ;Z*****04 EQU     FLMMOD.4
 ;SG****04 EQU     FLMMOD.5
 ;PHI***04 EQU     FLMMOD.6
 ;RHOGRN04 EQU     FLMMOD.7
 ;RHOLIQ04 EQU     FLMMOD.8
 ;KLIQ**04 EQU     FLMMOD.9
 ;T0****04 EQU     FLMMOD.0
 ;;       *RHOGAS,KGAS,KF,RHOO,TGRAD,TCALC)                                 00036600
 ;RHOGAS04 EQU     FLMMOD.1
 ;KGAS**04 EQU     FLMMOD.2
 ;KF****04 EQU     FLMMOD.3
 ;RHOO**04 EQU     FLMMOD.4
 ;TGRAD*04 EQU     FLMMOD.5
 ;TCALC*04 EQU     FLMMOD.6
 ;; C       COMPUTES RHOGAS,KGAS AND THEN KF=FLUID MIX BULK MODULUS AND      00036700
 ;; C       RHOO=BULK DENSITY. WT=GAS ATOMIC WT(=16 FOR METHANE)             00036800
 ;; C       FGRAD=FLUID GRADIENT IN PSI/FT, Z=DEPTH IN KILOFT                00036900
 ;; C       FTEMP=FLUID TEMP. DEG. FAHRENHEIT                                00037000
 ;; C       IF FTEMP=0.0,FTEMP IS COMPUTED FROM FTEMP=T0+TGRAD*Z             00037100
 ;; C       T0 AND  TGRAD IN FAHRENHEIT UNITS                                00037200
 ;; C       SG=FRACTIONAL GAS SATURATION, PHI=FRACTIONAL POROSITY OF ROCK    00037300
 ;; C       DENSITIES IN GM/CM**3,BULK MODULI IN KILOBARS                    00037400
 ;; C       RHOGRN=GRAIN DENSITY(E.G. 2.65),RHOLIQ=LIQUID(BRINE OR OIL) DEN00037500
 ;; C       (RHOBRINE=1.05 GULF COAST), KLIQ=LIQUID(BRINE)MODULUS=25.0 FOR   00037600
 ;; C       A=BRINE OR 25 FOR OIL.                                           00037700
 ;; C       TCALC =CALCULATED TEMP. DEG. F. RETURNED TO MAIN PROGRAM.        00037800
 ;; C                                                                        00037900
 ;;        IMPLICIT REAL (K)                                                00038000
 ;;        PFLUID=(FGRAD*Z)                                                 00038100
 ;.MFFMUL   SET     1
 ;          JSM     .FFMUL
 ;          .BYTE 0
 ;          .WORD -FGRAD*04,-Z*****04
 ;          .WORD PFLUID04
 ;;                                                                         00038200
```

```
:.MFFLOAT SET   1
:         JSR   .FFLOAT
:         .BYTE 0
:         .WORD .C000003
:         .WORD .T000209
:.MFFGT   SET   1
:         JSR   .FFGT
:         .BYTE 0
:         .WORD -FTEMP^04,.T000209
:         ASL   A
:         BCS   *+5
:         JMP   .L000213
:.MFLTASG SET   1
:         JSR   .FLTASGN
:         .BYTE 0
:         .WORD -FTEMP^04
:         .WORD TEMP^^04
:.L000213 EQU   *                                          00038300
::
:.MFFLOAT SET   1
:         JSR   .FFLOAT
:         .BYTE 0
:         .WORD .C000003
:         .WORD .T000209
:.MFFLE   SET   1
:         JSR   .FFLE
:         .BYTE 0
:         .WORD -FTEMP^04,.T000209
:         ASL   A
:         BCS   *+5
:         JMP   .L000214
:.MFFMUL  SET   1
:         JSR   .FFMUL
:         .BYTE 0
:         .WORD -TGRAD^04,-Z^^^^^04
:         .WORD .T000209
:.MFFADD  SET   1
:         JSR   .FFADD
:         .BYTE 0
:         .WORD -T0^^^^04,.T000209
:         .WORD TEMP^^04
:.L000214 EQU   *
::                                                         00038400
:.MFLTASG SET   1
:         JSR   .FLTASGN
:         .BYTE 0
:         .WORD TEMP^^04
:         .WORD -TCALC^04
::                                                         00038500
:.MFFLOAT SET   1
:         JSR   .FFLOAT
:         .BYTE 0
:         .WORD .C000003
:         .WORD .T000209
:.MFFEQ   SET   1
:         JSR   .FFEQ
:         .BYTE 0
:         .WORD -SG^^^^04,.T000209
:         ASL   A
:         BCS   *+5
:         JMP   .L000216
:.MFFLOAT SET   1
:         JSR   .FFLOAT
:         .BYTE 0
:         .WORD .C000003
:         .WORD -RMOLGAS04
:.L000216 EQU   *
::                                                         00038600
:.MFFLOAT SET   1
:         JSR   .FFLOAT
:         .BYTE 0
:         .WORD .C000003
:         .WORD .T000209
:.MFFEQ   SET   1
:         JSR   .FFEQ
:         .BYTE 0
:         .WORD -SG^^^^04,.T000209
:         ASL   A
:         BCS   *+5
:         JMP   .L000217
:.MFFLOAT SET   1
:         JSR   .FFLOAT
:         .BYTE 0
:         .WORD .C000003
:         .WORD -KGAS^^04
:.L000217 EQU   *
::                                                         00038700
:.MFFLOAT SET   1
```

```
:          JSB   .FFLOAT
:          .BYTE 0
:          .WORD .C000003
:          .WORD .T000209
:.MFFEQ    SET   1
:          JSB   .FFEQ
:          .BYTE 0
:          .WORD -SG****04,.T000209
:          ASL   A
:          BCS   *+5
:          JMP   .L000218
:.MFLTASG  SET   1
:          JSB   .FLTASGN
:          .BYTE 0
:          .WORD -ALIU**04
:          .WORD -KF****04
:.L000218  EQU   *
::                                                          00030800
:.MFFLOAT  SET   1
:          JSB   .FFLOAT
:          .BYTE 0
:          .WORD .C000003
:          .WORD .T000209
:.MFFEQ    SET   1
:          JSB   .FFEQ
:          .BYTE 0
:          .WORD -SG****04,.T000209
:          ASL   A
:          BCS   *+5
:          JMP   .L000219
:          JMP   .L000220
:.L000219  EQU   *
::        CALL GASMOD(AT,PFLUID,TEMP,NMOGAS,KGAS)          00030900
:          LDA   KGAS**04
:          STA   GASMOD.5
:          LDA   KGAS**04+1
:          STA   GASMOD.5+1
:          LDA   NMOGAS04
:          STA   GASMOD.4
:          LDA   BMOGAS04+1
:          STA   GASMOD.4+1
:          LDA   ATEMP**04 MOD .M
:          STA   GASMOD.3
:          LDA   ATEMP**04/256
:          STA   GASMOD.3+1
:          LDA   APFLUID04 MOD .M
:          STA   GASMOD.2
:          LDA   APFLUID04/256
:          STA   GASMOD.2+1
:          LDA   AT****04
:          STA   GASMOD.1
:          LDA   AT****04+1
:          STA   GASMOD.1+1
:          JSB   GASMOD
::                                                          00034000
::                                                          00034100
:.MFFLOAT  SET   1
:          JSB   .FFLOAT
:          .BYTE 0
:          .WORD .C000002
:          .WORD .T000215
:.MFFSUB   SET   1
:          JSB   .FFSUB
:          .BYTE 0
:          .WORD .T000215,-SG****04
:          .WORD .T000221
:.MFFDIV   SET   1
:          JSB   .FFDIV
:          .BYTE 0
:          .WORD .T000221,-ALIU**04
:          .WORD .T000215
:.MFFDIV   SET   1
:          JSB   .FFDIV
:          .BYTE 0
:          .WORD -SG****04,-KGAS**04
:          .WORD .T000209
:.MFFADD   SET   1
:          JSB   .FFADD
:          .BYTE 0
:          .WORD .T000209,.T000215
:          .WORD U*****04
::                                                          00039200
:.MFFLOAT  SET   1
:          JSB   .FFLOAT
:          .BYTE 0
:          .WORD .C000002
:          .WORD .T000209
:.MFFDIV   SET   1
```

```
:               JSR    .FFDIV
:               .BYTE  0
:               .WORD  .T000209,U*****04
:               .WORD  -RF****04
::
:.L000220 EQU   *
:.MFFLOAT SET   1
:               JSR    .FFLOAT
:               .BYTE  0
:               .WORD  .C000002
:               .WORD  .T000209
:.MFFSUB  SET   1
:               JSR    .FFSUM
:               .BYTE  0
:               .WORD  .T000209,-PHI***04
:               .WORD  .T000215
:.MFFLOAT SET   1
:               JSR    .FFLOAT
:               .BYTE  0
:               .WORD  .C000002
:               .WORD  .T000222
:.MFFSUM  SET   1
:               JSR    .FFSUM
:               .BYTE  0
:               .WORD  .T000222,-SG****04
:               .WORD  .T000223
:.MFFMUL  SET   1
:               JSR    .FFMUL
:               .BYTE  0
:               .WORD  .T000223,-RMUL1004
:               .WORD  .T000222
:.MFFMUL  SET   1
:               JSR    .FFMUL
:               .BYTE  0
:               .WORD  -SG****04,-RHOGAS04
:               .WORD  .T000221
:.MFFADD  SET   1
:               JSR    .FFADD
:               .BYTE  0
:               .WORD  .T000221,.T000222
:               .WORD  .T000223
:.MFFMUL  SET   1
:               JSR    .FFMUL
:               .BYTE  0
:               .WORD  -PHI***04,.T000223
:               .WORD  .T000221
:.MFFMUL  SET   1
:               JSR    .FFMUL
:               .BYTE  0
:               .WORD  .T000215,-RHOGRR04
:               .WORD  .T000209
:.MFFADD  SET   1
:               JSR    .FFADD
:               .BYTE  0
:               .WORD  .T000209,.T000221
:               .WORD  -RHOB**04
::             RETURN                                                    00039400
:               JMP    .W000208                                          00039500
::             END
:.W000208 WIS
::             SUBROUTINE GASMOD(WT,PFLUID,TEMP,RHOGAS,KGAS)             00039600
:GASMOD   EQU   *
:WT****05 EQU   GASMOD.1
:PFLUID05 EQU   GASMOD.2
:TEMP**05 EQU   GASMOD.3
:RHOGAS05 EQU   GASMOD.4
:KGAS**05 EQU   GASMOD.5
:: C       WT = MOLEC. WT(16 FOR METHANE (ASSUMED)), TEMP=TEMPERATURE    00039700
:: C       IN DEG. FAHRENHEIT, PFLUID=FLUID PRESSURE IN KILOPSI.         00039800
:: C       KGAS=GAS BULK MODULUS IN KILOBARS IS COMPUTED (REAL*8)        00039900
:: C       RHOGAS=GAS DENSITY IN GM./CM**3 IS COMPUTED                   00040000
::             IMPLICIT REAL (K)                                         00040100
::                                                                       00040200
:.MFFLOAT SET   1
:               JSR    .FFLOAT
:               .BYTE  0
:               .WORD  .C000226
:               .WORD  .T000227
:.MFFSUB  SET   1
:               JSR    .FFSUM
:               .BYTE  0
:               .WORD  -TEMP**05,.T000227
:               .WORD  .T000230
:.MFFLOAT SET   1
:               JSR    .FFLOAT
:               .BYTE  0
:               .WORD  .C000009
:               .WORD  .T000225
```

```
:.MFFLOAT SET  1
:         JSM  .FFLOAT
:         .MVTE 0
:         .AIWD .C000015
:         .AUWD .T000232
:.MFFMUL  SET  1
:         JSM  .FFMUL
:         .MVTE 0
:         .AIWD .T000225,.T000230
:         .AUWD .T000227
:.MFFDIV  SET  1
:         JSM  .FFDIV
:         .MVTE 0
:         .AIWD .T000227,.T000232
:         .AIWD C******05
::
:: C      FLUID PRESS. IN ATMOSPHERES. NON-IDEAL GAS LAW FOR NHUMAS.       00040300
                                                                           00040400
:.MFFLOAT SET  1
:         JSM  .FFLOAT
:         .MVTE 0
:         .AIWD .C000032
:         .AUWD .T000227
:.MFFLOAT SET  1
:         JSM  .FFLOAT
:         .MVTE 1
:         .AUWD .C000233
:         .AIWD .T000225
:.MFFDIV  SET  1
:         JSM  .FFDIV
:         .MVTE 0
:         .AIWD .T000225,.T000227
:         .AUWD .T000230
:.MFFADD  SET  1
:         JSM  .FFADD
:         .MVTE 0
:         .AIWD C******05,.T000230
:         .AUWD T******05
::                                                                         00040500
:.MFFLOAT SET  1
:         JSM  .FFLOAT
:         .MVTE 1
:         .AGWD .C000230
:         .AUWD .T000225
:.MFFLOAT SET  1
:         JSM  .FFLOAT
:         .MVTE 0
:         .AIWD .C000032
:         .AUWD .T000230
:.MFFMUL  SET  1
:         JSM  .FFMUL
:         .MVTE 0
:         .AUWD -FLUID05,.T000225
:         .AUWD .T000227
:.MFFDIV  SET  1
:         JSM  .FFDIV
:         .MVTE 0
:         .AIWD .T000227,.T000230
:         .AUWD P******05
::
:.MFFLOAT SET  1
:         JSM  .FFLOAT
:         .MVTE 1
:         .AUWD .C000236
:         .AIWD .T000227
:.MFFLOAT SET  1
:         JSM  .FFLOAT
:         .MVTE 1
:         .AUWD .C000235
:         .AIWD .T000225
:.MFFLOAT SET  1
:         JSM  .FFLOAT
:         .MVTE 1
:         .AUWD .C000237
:         .AUWD .T000232
:.MFFLOAT SET  1
:         JSM  .FFLOAT
:         .MVTE 1
:         .AUWD .C000236
:         .AUWD .T000230
:.MFFMUL  SET  1
:         JSM  .FFMUL
:         .MVTE 0
:         .AIWD -TLUP**05,.T000232
:         .AUWD .T000230
::        0(1000)                                                          00040700
:: :                                                                       00040800
```

```
05170 :.MFFLOAT SET   1
05171 :          JSR   .FFLOAT
05172 :          .BYTE 1
05173 :          .AWRD .C000085
05174 :          .AWRD .1000240
05175 :.MFFDIV  SET   1
05176 :          JSR   .FFDIV
05177 :          .BYTE 0
05178 :          .AWRD .1000238,.1000239
05179 :          .AWRD .1000232
05180 :.MFFDIV  SET   1
05181 :          JSR   .FFDIV
05182 :          .BYTE 0
05183 :          .AWRD .1000232,.1000240
05184 :          .AWRD .1000238
05185 :.MFFDIV  SET   1
05186 :          JSR   .FFDIV
05187 :          .BYTE 0
05188 :          .AWRD .1000225,.1000227
05189 :          .AWRD .1000230
05190 :.MFFADD  SET   1
05191 :          JSR   .FFADD
05192 :          .BYTE 0
05193 :          .AWRD .1000230,.1000238
05194 :          .AWRD Z7****05                                               00040900
05195 ::
05196 :.MFFLOAT SET   1
05197 :          JSR   .FFLOAT
05198 :          .BYTE 1
05199 :          .AWRD .C000085
05200 :          .AWRD .1000232
05201 :.MFFLOAT SET   1
05202 :          JSR   .FFLOAT
05203 :          .BYTE 0
05204 :          .AWRD .C000242
05205 :          .AWRD .1000230
05206 :.MFFDIV  SET   1
05207 :          JSR   .FFDIV
05208 :          .BYTE 0
05209 :          .AWRD .1000230,.1000232
05210 :          .AWRD .1000238
05211 :.MFFLOAT SET   1
05212 :          JSR   .FFLOAT
05213 :          .BYTE 0
05214 :          .AWRD .C000241
05215 :          .AWRD .1000227
05216 ::  C    METHANE VALUES AND EQUATIONS ASSUMED THROUGHOUT                00041000
05217 :.MFFADD  SET   1
05218 :          JSR   .FFADD
05219 :          .BYTE 0
05220 :          .AWRD .1000227,.1000238
05221 :          .AWRD .1000230
05222 :.MFFMUL  SET   1
05223 :          JSR   .FFMUL
05224 :          .BYTE 0
05225 :          .AWRD Z7****05,1****05
05226 :          .AWRD .1000225
05227 :.MFFMUL  SET   1
05228 :          JSR   .FFMUL
05229 :          .BYTE 0
05230 :          .AWRD .1000225,.1000230
05231 :          .AWRD D****05                                                00041100
05232 ::
05233 :.MFFMUL  SET   1
05234 :          JSR   .FFMUL
05235 :          .BYTE 3
05236 :          .AWRD M****05,-R7***05
05237 :          .AWRD E****05                                                00041200
05238 ::
05239 :.MFFDIV  SET   1
05240 :          JSR   .FFDIV
05241 :          .BYTE 0
05242 :          .AWRD E****05,D****05
05243 :          .AWRD =NMOGASOS                                              00041300
05244 ::
05245 :.MFFLOAT SET   1
05246 :          JSR   .FFLOAT
05247 :          .BYTE 0
05248 :          .AWRD .C000243
05249 :          .AWRD .1000225                                               00041400
05250 ::
05251 :.MFFLOAT SET   1
05252 :          JSR   .FFLOAT
05253 :          .BYTE 0
05254 :          .AWRD .C000012
05255 :          .AWRD .1000230
05256 :.MFFDIV  SET   1
05257 :          JSR   .FFDIV
```

```
:              .BYTE 0
:              .WORD -PFLUID05,.T000225
:              .WORD .T000227
:.MFFDIV       SET   1
:              JSM   .FFDIV
:              .BYTE 0
:              .WORD .T000227,.T000230
:              .WORD PRB***05
::                                                        00041500
:.MFFLOAT      SET   1
:              JSM   .FFLOAT
:              .BYTE 0
:              .WORD .C000032
:              .WORD .T000227
:.MFFLOAT      SET   1
:              JSM   .FFLOAT
:              .BYTE 0
:              .WORD .C000240
:              .WORD .T000225
:.MFFLOAT      SET   1
:              JSM   .FFLOAT
:              .BYTE 6
:              .WORD .C000032
:              .WORD .T000234
:.MFFLOAT      SET   1
:              JSM   .FFLOAT
:              .BYTE 1
:              .WORD .C000245
:              .WORD .T000232
:.MFFDIV       SET   1
:              JSM   .FFDIV
:              .BYTE 0
:              .WORD .T000232,.T000230
:              .WORD .T000239
:.MFFMUL       SET   1
:              JSM   .FFMUL
:              .BYTE 0
:              .WORD .T000239,PRB***05
:              .WORD .T000232
:.MFFDIV       SET   1
:              JSM   .FFDIV
:              .BYTE 0
:              .WORD .T000225,.T000227
:              .WORD .T000230
:.MFFADD       SET   1
:              JSM   .FFADD
:              .BYTE 0
:              .WORD .T000230,.T000232
:              .WORD GAM77*05
::                                                        00041600
:.MFFLOAT      SET   1
:              JSM   .FFLOAT
:              .BYTE 0
:              .WORD .C000032
:              .WORD .T000227
:.MFFLOAT      SET   1
:              JSM   .FFLOAT
:              .BYTE 0
:              .WORD .C000240
:              .WORD .T000225
:.MFFLOAT      SET   1
:              JSM   .FFLOAT
:              .BYTE 0
:              .WORD .C000032
:              .WORD .T000230
:.MFFLOAT      SET   1
:              JSM   .FFLOAT
:              .BYTE 1
:              .WORD .C000247
:              .WORD .T000232
:.MFFDIV       SET   1
:              JSM   .FFDIV
:              .BYTE 0
:              .WORD .T000232,.T000230
:              .WORD .T000239
:.MFFMUL       SET   1
:              JSM   .FFMUL
:              .BYTE 0
:              .WORD .T000239,PRB***05
:              .WORD .T000232
:.MFFDIV       SET   1
:              JSM   .FFDIV
:              .BYTE 0
:              .WORD .T000225,.T000227
:              .WORD .T000230
:.MFFADD       SET   1
:              JSM   .FFADD
:              .BYTE 0
```

```
:              .WORD .T000230,.T000232
:              .WORD GAM30005
::                                                          00041700
:.MFFLOAT SET   1
:         JSM   .FFLOAT
:         .BYTE 0
:         .WORD .C000248
:         .WORD .T000227
:.MFFSUB  SET   1
:         JSM   .FFSUB
:         .BYTE 0
:         .WORD GAM30005,GAM77*05
:         .WORD .T000225
:.MFFDIV  SET   1
:         JSM   .FFDIV
:         .BYTE 0
:         .WORD .T000225,.T000227
:         .WORD SLP***05
::                                                          00041800
:.MFFLOAT SET   1
:         JSM   .FFLOAT
:         .BYTE 0
:         .WORD .C000249
:         .WORD .T000225
:.MFFSUB  SET   1
:         JSM   .FFSUB
:         .BYTE 0
:         .WORD -TEMP**05,.T000225
:         .WORD .T000227
:.MFFMUL  SET   1
:         JSM   .FFMUL
:         .BYTE 0
:         .WORD .T000227,SLP***05
:         .WORD .T000225
:.MFFADD  SET   1
:         JSM   .FFADD
:         .BYTE 0
:         .WORD .T000225,GAM77*05
:         .WORD GAMAPP05
::                                                          00041900
:.MFFMUL  SET   1
:         JSM   .FFMUL
:         .BYTE 0
:         .WORD GAMAPP05,PKB***05
:         .WORD -KGAS**05
::                                                          00042000
:.MFFLOAT SET   1
:         JSM   .FFLOAT
:         .BYTE 0
:         .WORD .C000003
:         .WORD .T000225
:.MFFLE   SET   1
:         JSM   .FFLE
:         .BYTE 0
:         .WORD -KGAS**05,.T000225
:         ASL   A
:         BCS   *+5
:         JMP   .L000250
:.MFFLOAT SET   1
:         JSM   .FFLOAT
:         .BYTE 0
:         .WORD .C000012
:         .WORD .T000227
:.MFFLOAT SET   1
:         JSM   .FFLOAT
:         .BYTE 0
:         .WORD .C000002
:         .WORD .T000225
:.MFFDIV  SET   1
:         JSM   .FFDIV
:         .BYTE 0
:         .WORD .T000225,.T000227
:         .WORD -KGAS**05
:.L000250 EQU   *
::        RETURN                                            00042100
:         JMP   .R000224
::        END                                               00042200
:.R000224 RTS
::        SUBROUTINE FLUID (AA,KM,KF,PHI,KSTAR)             00042300
:FLUID    EQU   *
:AA****06 EQU   FLUID.01
:KM****06 EQU   FLUID.02
:KF****06 EQU   FLUID.03
:PHI***06 EQU   FLUID.04
:KSTAR*06 EQU   FLUID.05
:: C      W.J. MUNGE  CUFMC                                 00042400
:: C      CALCULATES KSTAR FROM BIOT GASSMAN EQN. GIVEN AA=KA/KM,KM,  00042500
:: C      RESIDUAL FLUID MODULUS(INCL.GAS+LIQUID),FRACT. POROSITY=PHI.  00042600
```

```
05433 ;; C
05435 ;; C
05436 ;;          IMPLICIT REAL(A)
05437 ;;
05438 ;.MFFLOAT  SET   1
05434 ;          JSR   .FFLOAT
05440 ;          .BYTE 0
05441 ;          .WORD .C000002
05442 ;          .WORD .T000253
05443 ;.MFFDIV   SET   1
05444 ;          JSR   .FFDIV
05445 ;          .BYTE 0
05446 ;          .WORD -AA***00,-BF***00
05447 ;          .WORD .T000252
05448 ;.MFFSUB   SET   1
05449 ;          JSR   .FFSUB
05450 ;          .BYTE 0
05451 ;          .WORD .T000252,.T000253
05452 ;          .WORD BG***00
05453 ;;         DWDAA
05454 ;.MFFLOAT  SET   1
05455 ;          JSR   .FFLOAT
05456 ;          .BYTE 0
05457 ;          .WORD .C000002
05458 ;          .WORD .T000252
05459 ;.MFFMUL   SET   1
05460 ;          JSR   .FFMUL
05461 ;          .BYTE 0
05462 ;          .WORD FU***00,-PHI***00
05463 ;          .WORD .T000258
05464 ;.MFFLOAT  SET   1
05465 ;          JSR   .FFLOAT
05466 ;          .BYTE 0
05467 ;          .WORD .C000002
05468 ;          .WORD .T000260
05469 ;.MFFSUB   SET   1
05470 ;          JSR   .FFSUB
05471 ;          .BYTE 0
05472 ;          .WORD .T000258,-AA***00
05473 ;          .WORD .T000259
05474 ;.MFFADD   SET   1
05475 ;          JSR   .FFADD
05476 ;          .BYTE 0
05477 ;          .WORD .T000259,.T000260
05478 ;          .WORD .T000258
05479 ;.MFFLOAT  SET   1
05480 ;          JSR   .FFLOAT
05481 ;          .BYTE 0
05482 ;          .WORD .C000006
05483 ;          .WORD .T000257
05484 ;.MFFDIV   SET   1
05485 ;          JSR   .FFDIV
05486 ;          .BYTE 0
05487 ;          .WORD .T000257,.T000258
05488 ;          .WORD .T000259
05489 ;.MFFSUB   SET   1
05490 ;          JSR   .FFSUB
05491 ;          .BYTE 0
05492 ;          .WORD .T000252,-AA***00
05493 ;          .WORD .T000253
05494 ;.MFFADD   SET   1
05495 ;          JSR   .FFADD
05496 ;          .BYTE 0
05497 ;          .WORD .T000253,.T000259
05498 ;          .WORD -AA***00
05499 ;;
05500 ;.MFFMUL   SET   1
05501 ;          JSR   .FFMUL
05502 ;          .BYTE 0
05503 ;          .WORD BG***00,-AA***00
05504 ;          .WORD -ASIAH*00
05505 ;;         RETURN
05506 ;          JMP   .R000251
05507 ;; C
05508 ;;         END
05509 ;.R000251  RTS
05510 ;;         SUBROUTINE GAME (TITLE,MLINE,NC)
05511  SHAPE     EQU
05512 ;TITLE*07  EQU   GAME.001
05513 ;NLINE*07  EQU   GAME.002
05514 ;NC***07   EQU   GAME.003
05515 ;; C
05516 ;; C       ENTIRE STORED IN TITLE (M) NO=ONLINE
05517 ;;         DIMENSION TITLE(1)
05518 ;;         NO=ONLINE
05519 ;; C       CALL HEAD(5,5)ENDS15,(TITLE(J),J=1,M)
05520 ;.MIMUL    SET   1
05521 ;          JSR   .IMUL
```

```
          .BYTE 0
          .WORD .L000016,-NLINE*07
          .WORD N****07
         DO 9901 II=1,NLINE                                              00044200
          LDA  #0
          STA  II****07
          LDA  #1
          STA  II****07+1
          JMP  .L000267
.L000265  EQU  *
          LDA  II****07+1
          CLC
          ADC  #1
          STA  II****07+1
          LDA  II****07
          ADC  #0
          STA  II****07
          LDY  #1
          LDA  (NLINE*07),Y
          CMP  II****07+1
          LDA  (NLINE*07)
          SBC  II****07
          BMI  .L000266
.L000267  EQU  *
            CALL READ(5,3,TITLE(1),TITLE(2),TITLE(3),TITLE(4),TITLE(5)   00044300
     *      ,TITLE(6),TITLE(7),TITLE(8),TITLE(9),TITLE(10),TITLE(11)     00044400
     *      ,TITLE(12),TITLE(13),TITLE(14),TITLE(15),TITLE(16),          00044500
     *      TITLE(17),TITLE(18),TITLE(19),TITLE(20) )                    00044600
          LDA  #20
          SEC
          SBC  #1
          ASL  A
          ASL  A
          ADC  TITLE*07
          STA  READ.022
          LDA  #0
          ADC  TITLE*07+1
          STA  READ.022+1
          LDA  #19
          SEC
          SBC  #1
          ASL  A
          ASL  A
          ADC  TITLE*07
          STA  READ.021
          LDA  #0
          ADC  TITLE*07+1
          STA  READ.021+1
          LDA  #18
          SEC
          SBC  #1
          ASL  A
          ASL  A
          ADC  TITLE*07
          STA  READ.020
          LDA  #0
          ADC  TITLE*07+1
          STA  READ.029+1
          LDA  #17
          SEC
          SBC  #1
          ASL  A
          ASL  A
          ADC  TITLE*07
          STA  READ.019
          LDA  #0
          ADC  TITLE*07+1
          STA  READ.019+1
          LDA  #16
          SEC
          SBC  #1
          ASL  A
          ASL  A
          ADC  TITLE*07
          STA  READ.018
          LDA  #0
          ADC  TITLE*07+1
          STA  READ.018+1
          LDA  #15
          SEC
          SBC  #1
          ASL  A
          ASL  A
          ADC  TITLE*07
          STA  READ.017
          LDA  #0
          ADC  TITLE*07+1
          STA  READ.017+1
```

```
LDA  #14
SEC
SBC  #1
ASL  A
ASL  A
ADC  TITLE^07
STA  HEAD.016
LDA  #0
ADC  TITLE^07+1
STA  HEAD.016+1
LDA  #13
SEC
SBC  #1
ASL  A
ASL  A
ADC  TITLE^07
STA  HEAD.015
LDA  #0
ADC  TITLE^07+1
STA  HEAD.015+1
LDA  #12
SEC
SBC  #1
ASL  A
ASL  A
ADC  TITLE^07
STA  HEAD.014
LDA  #0
ADC  TITLE^07+1
STA  HEAD.014+1
LDA  #11
SEC
SBC  #1
ASL  A
ASL  A
ADC  TITLE^07
STA  HEAD.013
LDA  #0
ADC  TITLE^07+1
STA  HEAD.013+1
LDA  #10
SEC
SBC  #1
ASL  A
ASL  A
ADC  TITLE^07
STA  HEAD.012
LDA  #0
ADC  TITLE^07+1
STA  HEAD.012+1
LDA  #9
SEC
SBC  #1
ASL  A
ASL  A
ADC  TITLE^07
STA  HEAD.011
LDA  #0
ADC  TITLE^07+1
STA  HEAD.011+1
LDA  #8
SEC
SBC  #1
ASL  A
ASL  A
ADC  TITLE^07
STA  HEAD.010
LDA  #0
ADC  TITLE^07+1
STA  HEAD.010+1
LDA  #7
SEC
SBC  #1
ASL  A
ASL  A
ADC  TITLE^07
STA  HEAD.009
LDA  #0
ADC  TITLE^07+1
STA  HEAD.009+1
LDA  #6
SEC
SBC  #1
ASL  A
ASL  A
ADC  TITLE^07
STA  HEAD.008
LDA  #0
```

```
 :          ADC   TITLE*07+1
 :          STA   READ.008+1
 :          LDA   #5
 :          SEC
 :          SBC   #1
 :          ASL   A
 :          ASL   A
 :          ADC   TITLE*07
 :          STA   READ.007
 :          LDA   #0
 :          ADC   TITLE*07+1
 :          STA   READ.007+1
 :          LDA   #4
 :          SEC
 :          SBC   #1
 :          ASL   A
 :          ASL   A
 :          ADC   TITLE*07
 :          STA   READ.006
 :          LDA   #0
 :          ADC   TITLE*07+1
 :          STA   READ.006+1
 :          LDA   #3
 :          SEC
 :          SBC   #1
 :          ASL   A
 :          ASL   A
 :          ADC   TITLE*07
 :          STA   READ.005
 :          LDA   #0
 :          ADC   TITLE*07+1
 :          STA   READ.005+1
 :          LDA   #2
 :          SEC
 :          SBC   #1
 :          ASL   A
 :          ASL   A
 :          ADC   TITLE*07
 :          STA   READ.004
 :          LDA   #0
 :          ADC   TITLE*07+1
 :          STA   READ.004+1
 :          LDA   #1
 :          SEC
 :          SBC   #1
 :          ASL   A
 :          ASL   A
 :          ADC   TITLE*07
 :          STA   READ.003
 :          LDA   #0
 :          ADC   TITLE*07+1
 :          STA   READ.003+1
 :          LDA   #.C000007 MOD .M
 :          STA   READ.002
 :          LDA   #.C000007/256
 :          STA   READ.002+1
 :          LDA   #.C000009 MOD .M
 :          STA   READ.001
 :          LDA   #.C000009/256
 :          STA   READ.001+1
 :          JSR   READ
 ::  9901   CONTINUE                                               00044700
 :.L000269 EQU  *
 :          JMP   .L000265
 :.L000266 EQU  *
 :: C    3 FORMAT(20A4)                                             00044800
 ::                                                                 00044900
 :          LDY   #1
 :          LDA   (NC****07),Y
 :          CMP   #0
 :          LDA   (NC****07)
 :          SBC   #0
 :          BMI   .L000272
 :          JMP   .L000271
 :.L000272 EQU  *
 :          JMP   .L000273
 :.L000271 EQU  *
 ::         CALL WRITE (6,1)                                        00045000
 :          LDA   #.C000002 MOD .M
 :          STA   WRITE.02
 :          LDA   #.C000002/256
 :          STA   WRITE.02+1
 :          LDA   #.C000010 MOD .M
 :          STA   WRITE.01
 :          LDA   #.C000010/256
 :          STA   WRITE.01+1
 :          JSR   WRITE
 :: C    1 FORMAT(1H1 ///)                                          00045100
```

```
::         CALL WRITE (6,2)                                               00045200
:           LDA   =.C000006 MOD .M
:           STA   WRITE.02
:           LDA   =.C000006/256
:           STA   WRITE.02+1
:           LDA   =.C000010 MOD .M
:           STA   WRITE.01
:           LDA   =.C000010/256
:           STA   WRITE.01+1
:           JSR   WRITE
:: C   2  FORMAT('          CHEVRON OIL FIELD RESEARCH CO.  LA HABRA,     00045300
:: C      & CALIFORNIA     90631     '    ////)                           00045400
:: C  75 CALL WRITE (6,4)(TITLE(J),J=1,P)                                  00045500
::    75  CALL WRITE(6,4,TITLE(1),TITLE(2),TITLE(3),TITLE(4),TITLE(5))    00045600
:.L000273 EQU   *
:           LDA   =5
:           SEC
:           SBC   =1
:           ASL   A
:           ASL   A
:           ADC   TITLE-07
:           STA   WRITE.07
:           LDA   =0
:           ADC   TITLE-07+1
:           STA   WRITE.07+1
:           LDA   =4
:           SEC
:           SBC   =1
:           ASL   A
:           ASL   A
:           ADC   TITLE-07
:           STA   WRITE.06
:           LDA   =0
:           ADC   TITLE-07+1
:           STA   WRITE.06+1
:           LDA   =3
:           SEC
:           SBC   =1
:           ASL   A
:           ASL   A
:           ADC   TITLE-07
:           STA   WRITE.05
:           LDA   =0
:           ADC   TITLE-07+1
:           STA   WRITE.05+1
:           LDA   =2
:           SEC
:           SBC   =1
:           ASL   A
:           ASL   A
:           ADC   TITLE-07
:           STA   WRITE.04
:           LDA   =0
:           ADC   TITLE-07+1
:           STA   WRITE.04+1
:           LDA   =1
:           SEC
:           SBC   =1
:           ASL   A
:           ASL   A
:           ADC   TITLE-07
:           STA   WRITE.03
:           LDA   =0
:           ADC   TITLE-07+1
:           STA   WRITE.03+1
:           LDA   =.C000008 MOD .M
:           STA   WRITE.02
:           LDA   =.C000008/256
:           STA   WRITE.02+1
:           LDA   =.C000010 MOD .M
:           STA   WRITE.01
:           LDA   =.C000010/256
:           STA   WRITE.01+1
:           JSR   WRITE
::          CALL READ(5,3,TITLE(1),TITLE(2),TITLE(3),TITLE(4),TITLE(5)   00045700
::       &  ,TITLE(6),TITLE(7),TITLE(8),TITLE(9),TITLE(10),TITLE(11)     00045800
::       &  ,TITLE(12),TITLE(13),TITLE(14),TITLE(15),TITLE(16),          00045900
::       &  TITLE(17),TITLE(18),TITLE(19),TITLE(20) )                    00046000
:           LDA   =20
:           SEC
:           SBC   =1
:           ASL   A
:           ASL   A
:           ADC   TITLE-07
:           STA   READ.022
:           LDA   =0
:           ADC   TITLE-07+1
:           STA   READ.022+1
```

```
LDA #19
SEC
SBC #1
ASL A
ASL A
ADC TITLE-07
STA HEAD.021
LDA #0
ADC TITLE-07+1
STA HEAD.021+1
LDA #18
SEC
SBC #1
ASL A
ASL A
ADC TITLE-07
STA HEAD.020
LDA #0
ADC TITLE-07+1
STA HEAD.020+1
LDA #17
SEC
SBC #1
ASL A
ASL A
ADC TITLE-07
STA HEAD.019
LDA #0
ADC TITLE-07+1
STA HEAD.019+1
LDA #16
SEC
SBC #1
ASL A
ASL A
ADC TITLE-07
STA HEAD.018
LDA #0
ADC TITLE-07+1
STA HEAD.018+1
LDA #15
SEC
SBC #1
ASL A
ASL A
ADC TITLE-07
STA HEAD.017
LDA #0
ADC TITLE-07+1
STA HEAD.017+1
LDA #14
SEC
SBC #1
ASL A
ASL A
ADC TITLE-07
STA HEAD.016
LDA #0
ADC TITLE-07+1
STA HEAD.016+1
LDA #13
SEC
SBC #1
ASL A
ASL A
ADC TITLE-07
STA HEAD.015
LDA #0
ADC TITLE-07+1
STA HEAD.015+1
LDA #12
SEC
SBC #1
ASL A
ASL A
ADC TITLE-07
STA HEAD.014
LDA #0
ADC TITLE-07+1
STA HEAD.014+1
LDA #11
SEC
SBC #1
ASL A
ASL A
ADC TITLE-07
STA HEAD.013
LDA #0
```

```
05902 :        ADC     TITLE-07+1
05903 :        STA     HEAD.013+1
05904 :        LDA     #10
05905 :        SEC
05906 :        SBC     #1
05907 :        ASL     A
05908 :        ASL     A
05909 :        ADC     TITLE-07
05970 :        STA     HEAD.012
05971 :        LDA     #0
05972 :        ADC     TITLE-07+1
05973 :        STA     HEAD.012+1
05974 :        LDA     #9
05975 :        SEC
05976 :        SBC     #1
05977 :        ASL     A
05978 :        ASL     A
05979 :        ADC     TITLE-07
05980 :        STA     HEAD.011
05981 :        LDA     #0
05982 :        ADC     TITLE-07+1
05983 :        STA     HEAD.011+1
05984 :        LDA     #8
05985 :        SEC
05986 :        SBC     #1
05987 :        ASL     A
05988 :        ASL     A
05989 :        ADC     TITLE-07
05990 :        STA     HEAD.010
05991 :        LDA     #0
05992 :        ADC     TITLE-07+1
05993 :        STA     HEAD.010+1
05994 :        LDA     #7
05995 :        SEC
05996 :        SBC     #1
05997 :        ASL     A
05998 :        ASL     A
05999 :        ADC     TITLE-07
06000 :        STA     HEAD.009
06001 :        LDA     #0
06002 :        ADC     TITLE-07+1
06003 :        STA     HEAD.009+1
06004 :        LDA     #6
06005 :        SEC
06006 :        SBC     #1
06007 :        ASL     A
06008 :        ASL     A
06009 :        ADC     TITLE-07
06010 :        STA     HEAD.008
06011 :        LDA     #0
06012 :        ADC     TITLE-07+1
06013 :        STA     HEAD.008+1
06014 :        LDA     #5
06015 :        SEC
06016 :        SBC     #1
06017 :        ASL     A
06018 :        ASL     A
06019 :        ADC     TITLE-07
06020 :        STA     HEAD.007
06021 :        LDA     #0
06022 :        ADC     TITLE-07+1
06023 :        STA     HEAD.007+1
06024 :        LDA     #4
06025 :        SEC
06026 :        SBC     #1
06027 :        ASL     A
06028 :        ASL     A
06029 :        ADC     TITLE-07
06030 :        STA     HEAD.006
06031 :        LDA     #0
06032 :        ADC     TITLE-07+1
06033 :        STA     HEAD.006+1
06034 :        LDA     #3
06035 :        SEC
06036 :        SBC     #1
06037 :        ASL     A
06038 :        ASL     A
06039 :        ADC     TITLE-07
06040 :        STA     HEAD.005
06041 :        LDA     #0
06042 :        ADC     TITLE-07+1
06043 :        STA     HEAD.005+1
06044 :        LDA     #2
06045 :        SEC
06046 :        SBC     #1
06047 :        ASL     A
06048 :        ASL     A
06049 :        ADC     TITLE-07
```

```
:              STA   HEAD.004
:              LDA   #6
:              ADC   TITLE+07+1
:              STA   HEAD.004+1
:              LDA   #1
:              SEC
:              SBC   #1
:              ASL   A
:              ASL   A
:              ADC   TITLE+07
:              STA   HEAD.003
:              LDA   #0
:              ADC   TITLE+07+1
:              STA   HEAD.003+1
:              LDA   #.L000007 MOD .M
:              STA   HEAD.002
:              LDA   #.C000007/256
:              STA   HEAD.002+1
:              LDA   #.C000009 MOD .M
:              STA   HEAD.001
:              LDA   #.L000009/256
:              STA   HEAD.001+1
:              JSR   HEAD
:: C    8 FORMAT(1H 20A4)
::             CALL WRITE(6,9)                                                    00046200
:              LDA   #.L000015 MOD .M
:              STA   WRITE.02
:              LDA   #.C000015/256
:              STA   WRITE.02+1
:              LDA   #.L000010 MOD .M
:              STA   WRITE.01
:              LDA   #.L000010/256
:              STA   WRITE.01+1
:              JSR   WRITE
:: C    9 FORMAT(//' * * '//)                                                     00046300
::     10 RETURN                                                                  00046400
:.L000274 EQU   *
:              JMP   .R000261
::     15 CALL WRITE(6,16)                                                        00046500
:.L000275 EQU   *
:              LDA   #.C000027 MOD .M
:              STA   WRITE.02
:              LDA   #.C000027/256
:              STA   WRITE.02+1
:              LDA   #.L000010 MOD .M
:              STA   WRITE.01
:              LDA   #.C000010/256
:              STA   WRITE.01+1
:              JSR   WRITE
:: C   16 FORMAT(///'  * * * END OF PROBLEMS * * *    '  /////)                   00046600
::             STOP                                                               00046700
:.MSTOP        SEI   1
:              JSR   .STOP
:              .BYTE 0
::             END                                                                00046800
:.R000261 RTS
::             SUBROUTINE HEAD                                                    00046900
:HEAD          EQU   *
::             END                                                                00047000
:.R000276 RTS
::             SUBROUTINE WRITE                                                   00047100
:WRITE         EQU   *
::             END                                                                00047200
:.R000277 RTS
```

CONCLUSION

Diagnostic capability of the method of the present invention can be perhaps better illustrated by an example of actual use.

Seismic data were obtained in a field environment and are depicted in FIG. 7. The geologic section was limestone embedded in shale. The gas-related anomaly is located over the indicated area.

From well logging and geologic data, the method of the present invention was used to provide the synthetic depthogram of FIG. 8. Note the close similarity of relative amplitudes for the events of interest. From FIG. 8, it was determined that the area of interest was 70% gas-saturated. Field data affirmed the estimate.

From the above, it is apparent that the method of the present invention as described hereinbefore provides a geophysicist with a strong tool for determining amounts of gas/oil-filled reservoirs in a variety of structural combinations, e.g., in sand, limestone, etc. However, the invention is not limited to the above structural combinations but is applicable to other anomalous circumstances as known to those skilled in the art. E.g., while the above presentations were directed in the most part to creating synthetic gas/oil-indicating characteristics for sandstones at different saturations, other strata can be used, as previously indicated, e.g., limestone. Other additional strata could be mapped in similar fashion, viz. dolostone, without departing from the intended scope of the claims appended hereto. Additionally, while gas-brine characteristics were mentioned in some detail in the specification, multi-phase systems would also be implemented, i.e., a mixture of brine, oil and gas. In such case, the factor Kf can be adjusted to take into account such combinations by noting that compressibility of any fluid mixture is the volume-weight average of the compressibilities of the components. Similarly, such characteristics could relate to estimations of oil-brine mixtures or to oil alone without departing from the intended scope of the present invention. Still further, actual data from logged wells (as provided, e.g., by acoustic well-logging tools) may serve as the actual data base to which the synthetic information as set forth herein can be compared. It should thus be understood that the invention is not limited to any specific embodiments set forth herein, as variations are readily apparent, and thus the invention is to be given the broadest possible interpretation within the terms of the following claims.

We claim:

1. System for resolving event characteristics of an acoustic log of a first well so as to determine gas/oil fractions in a selected zone of an earth formation by creating synthetic gas-indicating characteristics from petrophysical parameters corresponding to each selected zone of interest, comprising:

(A) a digital programmable computer for:

(i) predicting brine-saturated bulk and shear moduli (Kw* and Gw*) using empirical equations containing coefficients and a P-wave modulus value (Pw*), said coefficients varying in empirical fashion as a function of at least porosity, pressure and temperature, said P-wave modulus value (Pw*) being a P-wave modulus value which corresponds to said zone of interest based on well logging geologic data;

(ii) estimating a frame modulus value (Ka) of said zone of interest using a relationship involving Kw*, Kb, Km and $\phi$, where Kw* is brine-saturated bulk density of the aggregate, Kb is the bulk modulus of brine, and Km is the bulk modulus of the solid material making up the zone of interest and $\phi$ is porosity;

(iii) predicting bulk modulus values Kg* with the gas/oil present in differing amounts in said zone of interest using a relationship involving Ka of step (ii), Km, $\phi$, Kfg, where Kfg is the bulk modulus of a gas/oil mixture;

(iv) assuming Gw* is equal to Ggas/oil*, predicting P-wave modulus of the zone with gas/oil present (Pgas/oil*) in differing amounts based on the relationship $$P_{gas/oil}^* = K_{gas/oil}^* + (4/3)G_w^*$$

(v) predicting at least acoustic velocities within said zone from said P-wave modulus values (Pgas/oil*) of step (iv) as a function of gas/oil saturation; and (B) comparator means comparing said predicted velocities or derivations thereof with actual velocities or derivations thereof, from said acoustic record to predict presence and amounts of gas/oil fractions in said zone of interest.

2. System of claim 1 in which (B) repeats in sequence velocity comparisons for different zones of said earth formation and at different depths within said formation so as to provide a multiplicity of compared and predicted gas/oil-saturated zones of said formation as a function of depth.

3. System of claims 1 in which said empirical equations of (i) are o the form $$\hat{K}_w^* = f_1(P_{ol}^*)$$

$$\hat{G}_w^* = f_2(P_{ol}^*)$$

where Kw* is the brine-saturated bulk modulus of said zone of interest; Gw* is the brine-saturated shear modulus of said zone of interest; Pol is P-wave modulus observed in a laboratory environment; and $f_1$ and $f_2$ describe operators which relate the variables of interest.

4. System of claim 1 in which said frame modulus Ka of (i) is estimated based on the relationship $$K_a = K^* - K_f \frac{(1 - K^*/K_m)^2}{(1 - K_f/K_m)\phi - (K_f/K_m)(1 - K^*/K_m)}$$

where Ka is the frame modulus; Km is the bulk modulus of solid material; Kf is the bulk modulus of the fluid and $\phi$ is the porosity.

5. System for resolving event characteristics of a seismic record so as to determine gas/oil fractions in a selected zone of an earth formation by creating synthetic gas-indicating characteristics from brine-saturated petrophysical parameters corresponding to each selected zone of interest, comprising a programmable digital computer including a CPU-control means, program and data memories connected to said CPU-control means and display-storage means also connected to said CPU-control means, said CPU-control means operating on petrophysical data within said data memory control of program statements initially held in said program memory but sequentially fetched to said CPU-control means so as:

(i) from brine-saturated bulk and shear moduli (Kw* and Gw*), calculated by empirical equations including a P-wave modulus value (Pw*) which corresponds to said zone of interest based on well logging geologic data and estimated frame modulus values (Ka) of said zone of interest, to predict bulk modulus values Kg* with the gas/oil present in differing amounts in said zone of interest;

(ii) to determine P-wave modulus values of the zone with gas/oil present (Pgas/oil*) in differing amounts based on the relationship $$\hat{P}_{gas/oil}^* = \hat{K}_{gas/oil}^* + (4/3)G_w^*$$

(iii) to predict from seismic velocities within said zone (Pgas/oil*) calculated from step (B) as a function of gas/oil saturation;

(iv) to compare said predicted seismic velocities or derivations thereof with actual velocities or similar derivatives thereof from said seismic record to predict amounts of gas/oil fractions in said zone of interest.

6. System of claim 5 whereby (iv) is an indexable multi-dimensional array whereby said actual velocities are sequentially matched with said predicted velocity values as a function of gas/oil saturation until a best match is obtained.

7. System of claim 5 in which said CPU-control means additionally operates to provide:

amplitude reflection values calculated based on a relationship involving velocity and density of said zone of interest and incident amplitude information (Ai) and in which (iv) is an indexable multi-dimensional array whereby said actual reflection values from said seismic record are sequentially matched with said predicted reflection values as a function of gas/oil saturation until a best match is obtained.

8. System of claim 7 in which (iv) includes first means for providing a plurality of synthetic amplitude-v.-time seismic traces from said synthetic reflection data as a function of gas/oil saturation and second means operatively connected to said first means for cross-correlating said synthetic traces with actual traces of said record until a best match is obtained.

9. System of claim 7 in which said estimated amplitude reflection values of (iv) are estimated in accordance with $$Ar = \left[ \frac{V_2d_2 - V_1d_1}{V_2d_2 + V_1d_1} \right] Ai$$

where Ar is the amplitude from the reflected signal at said zone of interest and Ai is the amplitude of the incident signal; $V_1$ is the compressional velocity of the wave in an overlying medium 1; $V_2$ is the compressional velocity in the zone of interest below the contact line; $d_1$ is the density of the overlying medium 1; and $d_2$ is the density of the underlying medium 2.

10. System for resolving event characteristics of a seismic record so as to determine gas/oil fractions in a selected zone of an earth formation by creating synthetic gas/oil-indicating characteristics from brine-saturated petrophysical parameters corresponding to each selected zone of interest, comprising:

(A) a programmable digital computer for:

(i) from calculated normalized brine-saturated petrophysical parameters involving a laboratory and/or well-log generated brine-saturated P-wave modulus value for a brine-saturated rock corresponding to said zone of interest, predicting compressional velocities of said zone with gas-/oil in differing amounts present in said zone, in accordance with the relationship $$V_p = \left[ 1/\rho_b \left( \hat{K}_a + \frac{(1 - \hat{K}_a/K_m)^2}{\phi/K_f + (1 - \phi)K_m - \hat{K}_a/K_m^2} + (4/3)\hat{G}^* \right) \right]^{\frac{1}{2}}$$

where ρb is the bulk density, φ is the porosity, G* is the shear modulus at the saturations of interest, Kfg equals the bulk modulus for the liquid-gas mixture, Ka is the frame modulus, Km is the bulk modulus of a hypothetical rock, i.e., same composition but perfectly cemented with zero porosity;

(ii) from seismic velocities of said zone calculated from (i), predicting synthetic seismic amplitude information with gas/oil present in said zone; and (iii) comparing said predicted amplitude information with gas/oil present with actual field-acquired amplitude data associated with said seismic record so as to determine both presence and amounts of gas/oil within said zone of interest.

11. System of claim 10 in which (i) is further characterized by:

simultaneously solving through iteration the following equations:

$$\rho_B V_p^2 = P^* = K^* + (4/3)G^* \quad (1)$$

$$(K^* - K_a)/K_m = K_{fc}/K_m = b - a = \quad (2)$$

$$\frac{(1 - a)^2}{f\phi + (1 - a)} = \frac{(1 - b)^2}{f\phi - (1 - b)}$$

$$a - g = f_3[c, (a + g)] \quad (3)$$

to provide estimations of Ka and G* as a function of fluid saturation, where:

ρb is the bulk density of the zone of interest,

Vp is the compressional velocity,

P* is the P-wave modulus at said saturations of interest,

K* is the bulk modulus at said saturations of interest,

G* is the shear modulus at said saturations of interest,

Ka and Ga are frame moduli,

Kfc is the fluid correction equal to K*−Ka,

Km and Gm are the bulk and shear moduli of a hypothetical rock (i.e., same composition but perfectly cemented with zero porosity), φ=porosity a=Ka/Km b=K*/Km g=G*/Gm=Ga/Gm f=(Km/Kf)−1

C is an empirical parameter and $f_3$ describes a functional operator which relates to the variables of interest of Equation (3).

12. System of claim 11 in which said simultaneous iteration involves:

(i)′ predicting brine-saturated bulk and shear moduli (K̂w* and Ĝw*) using empirical equations containing coefficients and a P-wave modulus value (P̂w*), said coefficients varying in empirical fashion as a function of at least porosity, pressure and temperature, said P-wave modulus value (P̂w*) being a P-wave modulus value for a brine-saturated rock which corresponds to said zone of interest based on well logging geologic data, said shear modulus Ĝw* being equal to Ĝgas/oil* where Ĝgas/oil* is the shear modulus of said zone with gas/oil present;

(ii)′ estimating frame modulus values (Ka) of said zone of interest using a relationship involving Kw*, Kb, Km and φ, where Kw* is brine-saturated bulk density of the aggregate, Kb is the bulk modulus of brine, and Km is the bulk modulus of the solid material making up the zone of interest and φ is porosity.

13. System of claim 10 in which (iii) is provided by a separate comparator means connected to said computer.

14. Method for resolving event characteristics of an acoustic record so as to determine gas/oil fractions in a selected zone of an earth formation by creating synthetic gas-indicating characteristics from brine-saturated petrophysical parameters corresponding to each selected zone of interest, comprising:

(a) predicting brine-saturated bulk and shear moduli (Kw* and Gw*) using empirical equations containing coefficients and a P-wave modulus value (Pw*), said coefficients varying in empirical fashion as a function of at least porosity, pressure and temperature, said P-wave modulus value (Pw*) being a P-wave modulus value which corresponds to said zone of interest based on well logging geologic data;

(b) estimating a frame modulus value (Ka) of said zone of interest using a relationship involving Kw*, Kb, Km and φ, where Kw* is brine-saturated bulk density of the aggregate, Kb is the bulk modulus of brine, and Km is the bulk modulus of the solid material making up the zone of interest and φ is porosity;

(c) predicting a bulk modulus value Kg* with the gas/oil present in said zone of interest in a predetermined amount using a relationship involving Ka of step (b), km, $\phi$, Kfg, where Kfg is the bulk modulus of a gas/oil mixture;

(d) assuming Gw* is equal to Ggas/oil*, predicting P-wave modulus value of the zone with gas/oil present (Pgas/oil*) in said predetermined amount based on the relationship $$\hat{P}_{gas/oil}* = \hat{K}_{gas/oil}* + (4/3)\hat{G}_w*$$

(e) predicting at least an acoustic velocity within said zone from said P-wave modulus value (Pgas/oil*) of step (d);

(f) repeating steps (c)-(e) for gas/oil-brine mixtures of different gas/oil saturations to provide a suite of synthetic acoustic velocities for said zone of interest as the function of a plurality of gas/oil saturations; and (g) comparing said suite of predicted velocities with actual velocity information produced from said actual acoustic record to determine presence and amounts of gas/oil fractions in said zone of interest.

15. Method of claim 14 in which steps (a)-(g) are repeated in sequence for different zones of said earth formation and at different depths within said formation so as to provide a multiplicity of compared and predicted gas/oil-saturated zones of said formation as a function of depth.

16. Method of claim 14 in which step (g) is further characterized by (i) indexing predicted and actual velocity values as a function of gas/oil saturations and (ii) determining best match of all indexed values so as to accurately determine amounts of gas/oil within said zone of interest.

17. Method for resolving event characteristics of an acoustic record so as to determine gas/oil fractions in a selected zone of an earth formation by creating synthetic gas/oil-indicating characteristics from brine-saturated petrophysical parameters corresponding to each selected zone of interest, comprising the steps of:

(a) from calculated normalized brine-saturated petrophysical parameters involving a laboratory or otherwise annotated brine-saturated P-wave modulus value corresponding to said zone of interest, predicting P-wave modulus values with gas/oil in differing amounts present in said zone, in accordance with the relationship $$\hat{P}_{gas/oil}* = \hat{K}_{gas/oil}* + (4/3)\hat{G}_w*$$

where Pgas/oil* is the predicted P-wave modulus with gas/oil present in predetermined amounts;

$\hat{K}$gas/oil* is the predicted bulk modulus of said zone with gas/oil present in said predetermined amounts;

$\hat{G}$w* is the brine-saturated shear modulus of said zone;

(b) from acoustic velocities of said zone calculated from (a), predicting synthetic acoustic values associated with different gas/oil fractions present in said zone; and (c) comparing said synthetic acoustic values with actual field-acquired values so as to determine both presence and amounts of gas/oil within said zone of interest.

18. Method of claim 17 in which said resolution of said acoustic record is limited to estimations of gas fractions only.

19. Method of claim 17 in which said resolution of said acoustic record is limited to estimations of oil fractions only.

20. Method for resolving event characteristics of an acoustic record so as to determine gas/oil fractions in a selected zone of an earth formation by creating synthetic gas/oil indicating characteristics from brine-saturated petrophysical parameters corresponding to each selected zone of interest, comprising the steps of:

(a) from calculated normalized brine-saturated petrophysical parameters involving laboratory and/or well-log generated brine-saturated P-wave modulus values corresponding to said zone of interest, predicting velocities of said zone with gas/oil in differing amounts present in said zone, in accordance with the relationship $$V_p = \left[ 1/\rho_b \hat{K}_a + \frac{(1 - \hat{K}_a/K_m)^2}{\phi/K_f + (1 - \phi)K_m - \hat{K}_a/K_m^2} + (4/3)\hat{G}^* \right]^{\frac{1}{2}}$$

where $\rho$b is the bulk density, $\phi$ is the porosity, G* is the shear modulus at the saturations of interest, Ka is the frame modulus, Kfg equals the bulk modulus for the liquid-gas mixture, Km is the bulk modulus of a hypothetical rock, i.e., same composition but perfectly cemented with zero porosity;

(b) from velocities calculated from (a), predicting synthetic acoustic information as a function of gas/oil present in said zone; and (c) comparing said predicted acoustic information with actual field-acquired data of said acoustic record so as to determine both presence and amounts of gas/oil within said zone of interest.

21. Method of claim 20 in which said frame modulus Ka of step (a) is estimated based on the relationship $$K_a = K^* - K_f \frac{(1 - K^*/K_m)^2}{(1 - K_f/K_m)\phi - (K_f/K_m)(1 - K^*/K_m)}$$

where Ka is the frame modulus; Km is the bulk modulus of solid material; Kf is the bulk modulus of the fluid and $\phi$ is the porosity.

22. Method of claim 21 in which bulk modulus Kfc is equal to the second term of said relationship whereby said relationship becomes $$K^* = K_a + K_{fc}$$

23. Method of claim 20 in which step (a) is further characterized by:

simultaneously solving through iteration the following equations:

$$\rho_b V_p^2 = P^* = K^* + (4/3)G^* \quad (1)$$

$$(K^* - K_a)/K_m = K_{fc}/K_m = b - a = \quad (2)$$

$$\frac{(1 - a)^2}{f\phi + (1 - a)} = \frac{(1 - b)^2}{f\phi - (1 - b)}$$

$$a - g = f_3[c, (a + g)] \quad (3)$$

to provide estimations of Ka and G* as a function of fluid saturation, where:

ρb is the bulk density of the zone of interest,

Vp is the compressional velocity,

P* is the P-wave modulus at said saturations of interest,

K* is the bulk modulus at said saturations of interest,

G* is the shear modulus at said saturations of interest,

Ka and Ga are frame moduli,

Kfc is the fluid correction equal to K* − Ka,

Km and Gm are the bulk and shear moduli of a hypothetical rock (i.e., same composition but perfectly cemented with zero porosity), $\phi$ = porosity a = Ka/Km b = K*/Km g = G*/Gm = Ga/Gm f = (Km/Kf) − 1

C is an empirical parameter and $f_3$ describes a functional operator which relates to the variables of interest of Equation (3).

24. Method for resolving events of a seismic record associated with a selected zone of an earth formation so as to determine gas/oil fractions therein by creating synthetic gas/oil indicating characteristics from brine-saturated petrophysical parameters corresponding to said selected zone of interest, comprising the steps of:

(a) from calculated normalized brine-saturated petrophysical parameters involving a laboratory or otherwise annotated brine-saturated P-wave modulus value corresponding to said zone of interest, predicting P-wave modulus values of said zone with gas/oil present in differing amounts in said zone in accordance with the relationship $$\hat{P}_{gas/oil}^* = \hat{K}_{gas/oil}^* + (4/3)\hat{G}_w^*$$

where Pgas/oil* is a predicted P-wave modulus with gas/oil present in said predetermined amounts;

$\hat{K}$gas/oil* is a predicted bulk modulus of said zone with gas/oil present in said predetermined amounts;

$\hat{G}$w* is the brine-saturated shear modulus of said zone;

(b) from seismic velocities calculated from (a), predicting synthetic seismic amplitude values with gas/oil present in said zone in said predetermined amounts, and (c) comparing predicted amplitude values with actual values of said seismic record whereby amounts of gas/oil within said zone of interest can be accurately estimated.

25. Method of claim 24 in which said predicted amplitude values of step (b) are determined in accordance with $$Ar = \left[ \frac{V_2 d_2 - V_1 d_1}{V_2 d_2 + V_1 d_1} \right] Ai$$

where Ar is the amplitude from the reflected signal at said zone of interest and Ai is the amplitude of the incident signal; $V_1$ is the compressional velocity of the wave in an overlying medium 1; $V_2$ is the compressional velocity in the zone of interest below the contact line; $d_1$ is the density of the overlying medium 1; and $d_2$ is the density of the underlying medium 2.

* * * * *